(12) United States Patent
Hunter et al.

(10) Patent No.: US 11,928,733 B2
(45) Date of Patent: *Mar. 12, 2024

(54) SYSTEMS AND USER INTERFACES FOR HOLISTIC, DATA-DRIVEN INVESTIGATION OF BAD ACTOR BEHAVIOR BASED ON CLUSTERING AND SCORING OF RELATED DATA

(71) Applicant: Palantir Technologies Inc., Denver, CO (US)

(72) Inventors: Sean Hunter, London (GB); Aditya Kumar, New York, NY (US); Jacob Albertson, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,694

(22) Filed: Oct. 3, 2022

(65) Prior Publication Data

US 2023/0034113 A1 Feb. 2, 2023

Related U.S. Application Data

(63) Continuation of application No. 16/264,983, filed on Feb. 1, 2019, now Pat. No. 11,501,369, which is a
(Continued)

(51) Int. Cl.
*G06Q 40/00* (2023.01)
*G06F 3/0482* (2013.01)
(Continued)

(52) U.S. Cl.
CPC .......... *G06Q 40/04* (2013.01); *G06F 3/0482* (2013.01); *G06F 16/2457* (2019.01); *G06F 16/285* (2019.01); *G06Q 40/00* (2013.01)

(58) Field of Classification Search
None
See application file for complete search history.

(56) References Cited

U.S. PATENT DOCUMENTS 9,454,785 B1 9/2016 Hunter et al.
10,223,748 B2 * 3/2019 Hunter ................. G06F 3/0482
(Continued)

*Primary Examiner* — Olabode Akintola
(74) *Attorney, Agent, or Firm* — Knobbe, Martens, Olson & Bear, LLP

(57) ABSTRACT

Embodiments of the present disclosure relate to a data analysis system that may automatically generate memory-efficient clustered data structures, automatically analyze those clustered data structures, automatically tag and group those clustered data structures, and provide results of the automated analysis and grouping in an optimized way to an analyst. The automated analysis of the clustered data structures (also referred to herein as data clusters) may include an automated application of various criteria, rules, indicators, or scenarios so as to generate scores, reports, alerts, or conclusions that the analyst may quickly and efficiently use to evaluate the groups of data clusters. In particular, the groups of data clusters may be dynamically re-grouped and/or filtered in an interactive user interface so as to enable an analyst to quickly navigate among information associated with various groups of data clusters and efficiently evaluate those data clusters in the context of, for example, a risky trading investigation.

20 Claims, 32 Drawing Sheets

Related U.S. Application Data continuation of application No. 15/239,482, filed on Aug. 17, 2016, now Pat. No. 10,223,748, which is a continuation of application No. 14/857,071, filed on Sep. 17, 2015, now Pat. No. 9,454,785.

(60) Provisional application No. 62/198,918, filed on Jul. 30, 2015.

(51) Int. Cl.
*G06F 16/2457* (2019.01)
*G06F 16/28* (2019.01)
*G06Q 40/04* (2012.01)

(56) References Cited

U.S. PATENT DOCUMENTS

| | | | |
|---|---|---|---|
| 11,501,369 B2 * | 11/2022 | Hunter | G06Q 40/00 |
| 2011/0225650 A1 * | 9/2011 | Margolies | G06F 21/554 |
| | | | 726/22 |
| 2013/0197925 A1 * | 8/2013 | Blue | G06F 19/32 |
| | | | 705/2 |
| 2014/0200958 A1 * | 7/2014 | Wagenblatt | G06Q 30/0202 |
| | | | 705/7.31 |
| 2015/0178825 A1 * | 6/2015 | Huerta | G06Q 40/00 |
| | | | 705/35 |

\* cited by examiner

FIG. 25

SYSTEMS AND USER INTERFACES FOR HOLISTIC, DATA-DRIVEN INVESTIGATION OF BAD ACTOR BEHAVIOR BASED ON CLUSTERING AND SCORING OF RELATED DATA

CROSS-REFERENCE TO RELATED APPLICATIONS

This application is a continuation of U.S. patent application Ser. No. 16/264,983, filed Feb. 1, 2019, and titled "SYSTEMS AND USER INTERFACES FOR HOLISTIC, DATA-DRIVEN INVESTIGATION OF BAD ACTOR BEHAVIOR BASED ON CLUSTERING AND SCORING OF RELATED DATA," which is a continuation of U.S. patent application Ser. No. 15/239,482, filed Aug. 17, 2016, and titled "SYSTEMS AND USER INTERFACES FOR HOLISTIC, DATA-DRIVEN INVESTIGATION OF BAD ACTOR BEHAVIOR BASED ON CLUSTERING AND SCORING OF RELATED DATA," (issued as U.S. Pat. No. 10,223,748 on Mar. 5, 2019), which is a continuation of U.S. patent application Ser. No. 14/857,071, filed Sep. 17, 2015, and titled "SYSTEMS AND USER INTERFACES FOR HOLISTIC, DATA-DRIVEN INVESTIGATION OF BAD ACTOR BEHAVIOR BASED ON CLUSTERING AND SCORING OF RELATED DATA," (issued as U.S. Pat. No. 9,454,785 on Sep. 27, 2016), which claims the benefit of U.S. Provisional Patent Application No. 62/198,918, filed Jul. 30, 2015, and titled "SYSTEMS AND USER INTERFACES FOR HOLISTIC, DATA-DRIVEN INVESTIGATION OF BAD ACTOR BEHAVIOR BASED ON CLUSTERING AND SCORING OF RELATED DATA." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

BACKGROUND

Embodiments of the present disclosure generally relate to data item clustering.

In a trader oversight, or risky trading, investigation an analyst may have to make decisions regarding selection of electronic data items within an electronic collection of data. Such a collection of data may include a large number of data items that may or may not be related to one another, and which may be stored in an electronic data store or memory. For example, such a collection of data may include hundreds of thousands, millions, tens of millions, hundreds of millions, or even billions of data items, and may consume significant storage and/or memory. Determination and selection of relevant data items within such a collection of data may be extremely difficult for the analyst. Further, processing of such a large collection of data (for example, as an analyst uses a computer to sift and/or search through huge numbers of data items) may be extremely inefficient and consume significant processing and/or memory resources.

In some instances related electronic data items may be clustered and stored in an electronic data store. Even when electronic data items are clustered, however, the electronic collection of data may include hundreds of thousands, millions, tens of millions, hundreds of millions, or even billions of clusters of data items. As with individual data items, determination and selection of relevant clusters of data items within such a collection of data may be extremely difficult for the analyst. Further, processing, analyzing, and presenting such clusters of data items in an efficient way to an analyst may be a very challenging task.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to a data analysis system that may automatically generate memory-efficient clustered data structures, automatically analyze those clustered data structures, automatically tag and group those clustered data structures, and provide results of the automated analysis and grouping in an optimized way to an analyst. The automated analysis of the clustered data structures (also referred to herein as "data item clusters," "data clusters," or simply "clusters") may include an automated application of various criteria or rules so as to generate a tiled display of the groups of related data clusters such that the analyst may quickly and efficiently evaluate the groups of data clusters. In particular, the groups of data clusters (referred to herein as "dossiers") may be dynamically re-grouped and/or filtered in an interactive user interface so as to enable an analyst to quickly navigate among information associated with various dossiers and efficiently evaluate the groups of data clusters in the context of, for example, a risky trading investigation. Embodiments of the present disclosure also relate to automated scoring of the groups of clustered data structures. The interactive user interface may be updated based on the scoring, directing the human analyst to more dossiers (for example, groups of data clusters more likely to be associated with risky activity) in response to the analyst's inputs.

As described below, groups of data clusters may include one or more data items. A data item may include any data, information, or things, such as a person, a place, an organization, an account, a computer, an activity, and event, and/or the like. In an example application, a human analyst may be tasked with deciding whether a trader or person data item represents a trader conducting risky or unauthorized trades. However, an individual data item oftentimes includes insufficient information for the analyst to make such decisions. Rather, the analyst may make better decisions based upon a collection of related data items. For instance, two trades or financial transactions may be related by an identical trader identifier. Or two accounts belonging to one trader may be related by an identical trader identifier or other attribute (e.g., a shared ID number, address, etc). Some currently available systems assist the analyst by identifying data items that are directly related to an initial data item. For example, the analyst could initiate an investigation with a single suspicious data item or "seed," such as a trader data item possessing the name of a trader or some other identifier for a trader. If the analyst examined this data item by itself, then the analyst would not observe any suspicious characteristics. However, the analyst could request a list of data items related to the seed by a shared attribute, such as a trader identifier. In doing so, the analyst could discover an additional data item, such as trading accounts, which relate to the original trader because of a shared trader identifier. Through the trader identifier, or the attached trading accounts, an analyst could also uncover additional data items related to the seed. For example, the analyst could discover trades or financial transactions, linked to the trader based on a shared trader identifier or linked to the one or more trading accounts based on a shared trader identifier or account identifier. The analyst could then perform risk analysis on all of these trades or transactions and mark individual trades as potentially risky, or even mark the trader associated with the shared trader identifier as a potentially risky trader.

Although these currently available systems can be helpful in discovering related data items, they typically require the analyst to manually repeat the same series of searches for many investigations. Repeating the same investigation process consumes time and resources, such that there are oftentimes more investigations than can be performed. Thus, analysts typically prioritize investigations based upon the characteristics of the seeds. However, there may be insignificant differences between the seeds, so the analyst may not be able to determine the correct priority for investigations. For instance, the analyst could have to choose between two potential investigations based upon separate traders. One investigation could reveal more potentially risky behavior or transactions than the other, and therefore could be more important to perform. Yet, the characteristics of the two traders could be similar, so the analyst would not be able to choose the more important investigation. Without more information, prioritizing investigations, and evaluating data items, is difficult and error prone.

In contrast with these currently available systems, and as described above, according to various embodiments the data analysis system of the present disclosure automatically creates clusters of related data items, scores those clusters, tags and groups the clusters, and generates an interactive user interface in which, in response to inputs from the analyst, information related to the groups of clusters may be efficiently provided to the analyst. Accordingly, the analyst may be enabled to efficiently evaluate the groups of clusters.

Generation of the memory-efficient clustered data structures may be accomplished by automatic selection of an initial data item of interest (also referred to herein as a "seed"), adding of the initial data item to the memory-efficient clustered data structure (or, alternatively, designating the initial data item as the clustered data structure, or an initial iteration of the clustered data structure), and determining and adding one or more related data items to the cluster. In various embodiments, a generated cluster may include far fewer data items than the collection of data described above, and the data items included in the cluster may only include those data items that are relevant to a particular investigation (for example, a risky trading investigation). Accordingly, in an embodiment, processing of the generated cluster may be highly efficient as compared to the collection of data described above. This may be because, for example, a given risky trading investigation by an analyst (for example, as the analyst sifts and/or searches through data items of one or more grouped clusters) may only require storage in memory of a single set of grouped cluster data structures. Further, a number of data items in the group of clusters may be several orders of magnitude smaller than in the entire electronic collection of data described above because only data items related to each other are included in the clusters.

Additionally, the automated analysis and scoring of clusters (as mentioned above) may enable highly efficient evaluation of the various data clusters by a human analyst. For example, the interactive user interface is generated so as to enable an analyst to quickly view critical groups of data clusters (as determined by the automated scoring), and then in response to analyst inputs, view and interact with the generated information (including, for example, time-based charts and/or other information) associated with the clusters. In response to user inputs the user interface may be updated to display raw data associated with each of the generated groups of clusters if the analyst desires to dive deeper into data associated with a given group of clusters.

In various embodiments, seeds may be automatically selected/generated according to various seed determination strategies, and clusters of related data items may be generated based on those seeds and according to cluster generation strategies (also referred to herein as "cluster strategies"). Also, as mentioned above, the system may generate a score, multiple scores, and/or metascores for each generated cluster, and may optionally rank or prioritize the generated clusters based on the generated scores and/or metascores. High priority clusters may be of greater interest to an analyst as they may contain related data items that meet particular criteria related to the analyst's investigation. In an embodiment, the system may enable an analyst to advantageously start an investigation with a prioritized cluster, or group of clusters, including many related data items rather than a single randomly selected data item. Further, as described above, the cluster prioritization may enable the processing requirements of the analyst's investigation to be highly efficient as compared to processing of the huge collection of data described above. As mentioned above, this is because, for example, a given investigation by an analyst may only require storage in memory of a limited number of data items associated with a small number of clusters, and further, a number of data items in a cluster may be several orders of magnitude smaller than in the entire electronic collection of data described above because only data items related to each other are included in the cluster. Further, an analyst may not need to view many (or, alternatively, any) data items associated with a cluster to evaluate the cluster, but rather may evaluate the cluster based on the automatically generated cluster information.

In various embodiments, grouping of related data clusters enables an analyst to review the data in a logical way. For example, the data clusters may be tagged and grouped according to a person, a type of event, and/or the like. Accordingly, the analyst may be enabled to evaluate all data related to a person in the context of a particular investigation, further increasing the efficiency of the analyst. Additionally, the same data clusters may be dynamically grouped a re-grouped in different ways, and filtered based on various criteria, enabling the analyst to even more efficiently evaluate the various data items. Further, when a group of related data clusters is determined by the analyst to not be important, the analyst may quickly dismiss all data items of that group of clusters, rather than each data item separately.

In various embodiments, a single master instance of each data item is stored by the system. The master instance of each data item includes all metadata and other information associated with the data item, as well as a unique data item identifier. When generating clusters and groups of clusters, in some embodiments, the master instances of the data items are referenced by their data item identifiers rather than making copies of the data items in each cluster. This advantageously enables memory savings and the data items do not have to be copied multiple times. Additionally, any updates to a master data item may be rapidly propagated to all references of the data item in each cluster, thus reducing processing requirements.

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for an analyst user.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components (for example, retrieval of data item clusters), automatic and dynamic execution of complex processes in response to the input delivery (for example, grouping and filtering of data item clusters), automatic interaction among various components and processes of the system, and/or automatic and dynamic updating of the user interfaces. The interactions and presentation of data via the interactive user interfaces described herein may accordingly provide cognitive and ergonomic efficiencies and advantages over previous systems.

Advantageously, according to various embodiments, the disclosed techniques provide a more effective starting point and user interface for an investigation of data items of various types. An analyst may be able to start an investigation from a group of clusters of related data items instead of an individual data item, which may reduce the amount of time and effort required to perform the investigation. The disclosed techniques may also, according to various embodiments, provide a prioritization of multiple clusters, and dynamic re-grouping of related clusters and cluster filtering. For example, the analyst may also be able to start the investigation from a high priority group of clusters, which may allow the analyst to focus on the most important investigations, and may quickly evaluate that group of clusters based on the efficient user interface generated by the system. In each case, the processing and memory requirements of such an investigation may be significantly reduced due to the creation and use of highly efficient cluster data structures of related data items.

In various embodiments, a computer system is disclosed that comprises one or more computer readable storage devices configured to store: a plurality of computer executable instructions; at least one data cluster, wherein the at least one data cluster is associated with a data clustering strategy and is generated according to the data clustering strategy, the data cluster including at least: a plurality of trade data items including information associated with trades of a trader, and a plurality of external event data items including information associated with at least one of a trade confirmation, a trade settlement, an exchange margining, or a cash flow associated with a trade; and a plurality of trading risk indicators, wherein at least one of the plurality of trading risk indicators is a control timing arbitrage indicator for detecting whether a trader is routinely cancelling or amending trades prior to an external event to create a positive change to the trader's PNL. The one or more computer readable storage devices are also configured to store: one or more hardware computer processors in communication with the one or more computer readable storage devices and configured to execute the plurality of computer executable instructions in order to cause the computer system to: access the data cluster, including the plurality of trade data items and the plurality of external event data items, from the one or more computer readable storage devices; access the control timing arbitrage indicator from the one or more computer readable storage devices; and apply the control timing arbitrage indicator to the data cluster by: analyzing the plurality of trade data items to identify cancelled or amended trades of the trader; determining a cancellation or amendment time associated with each cancelled or amended trade of the trader; analyzing the plurality of external event data items to identify a subset of external event data items, wherein each external event data item of the subset of external event data items is associated with a respective one of the cancelled or amended trades of the trader and a time that is after the cancelation or amendment time associated with the respective one of the cancelled or amended trades of the trader; and generating an alert in response to determining that the subset of external event data items includes more external event data items than a threshold number of external event data items.

In some embodiments, the at least one data cluster is further associated with data cluster analysis rules and/or data cluster scoring rules that comprise: the at least one of the plurality of trading risk indicators, wherein the trading risk indicator is configured for indicating at least one of heightened risk or reduced risk, and wherein the trading risk indicator is observable or computable from the data items in the particular data cluster.

In some embodiments, the plurality of computer executable instructions further cause the computer system to generate user interface data for rendering an interactive user interface on a computing device, the interactive user interface including one or more selectable elements useable by a user for indicating the generated alert.

In some embodiments, the plurality of computer executable instructions further cause the computer system to use at least the generated alert to generate a summary report based on the data cluster analysis rules and/or the data cluster scoring rules.

In some embodiments, the plurality of computer executable instructions further cause the computer system to receive feedback from the user through the interactive user interface, the feedback containing a suggestion for improving the summary report generated based on the data cluster analysis rules and/or the data cluster scoring rules.

In some embodiments, the plurality of computer executable instructions further cause the computer system to update the data cluster analysis rules and/or data cluster scoring rules based on the feedback received from the user for improving the generated summary report.

In some embodiments, at least one of the plurality of trading risk indicators is a possible dummy trade indicator for identifying when a trade is cancelled or amended before an external event that might affirm the trade is real, and wherein the one or more hardware computer processors are configured to execute the plurality of computer executable instructions in order to further cause the computer system to: access the possible dummy trade indicator from the one or more computer readable storage devices; and apply the control timing arbitrage indicator to the data cluster by: analyzing the plurality of trade data items to identify cancelled or amended trades of the trader; determining a cancellation or amendment time associated with each cancelled or amended trade of the trader; analyzing the plurality of external event data items to identify an external event associated with each cancelled or amended trade; determining the time associated with the external event associated with each cancelled or amended trade; and generating an alert in response to determining that the cancellation or amendment time for each cancelled or amended trade is prior to the external event time associated with the cancelled or amended trade.

In various embodiments, a computer system is disclosed that comprises one or more computer readable storage devices configured to store: a plurality of computer executable instructions; at least one data cluster, wherein the at least one data cluster is associated with a data clustering strategy and is generated according to the data clustering strategy, the data cluster including at least: a plurality of trade data items including information associated with trades of a trader, and a plurality of external event data items including information associated with the trader's security badge usage data for a building; a plurality of trading risk indicators, wherein at least one of the plurality of trading risk indicators is part of a trading when absent scenario for detecting whether a person's trading activity coincides with unusual patterns in security badge data. The one or more computer readable storage devices are also configured to store: one or more hardware computer processors in communication with the one or more computer readable storage devices and configured to execute the plurality of computer executable instructions in order to cause the computer system to: access the data cluster, including the plurality of trade data items and the plurality of external event data items, from the one or more computer readable storage devices; access the trading when absent scenario from the one or more computer readable storage devices; and apply the trading when absent scenario to the data cluster by: analyzing the plurality of trade data items to identify the trades performed by the trader; determining an execution time associated with each trade performed by the trader; analyzing the plurality of external event data items to identify time windows the trader is not in the building from the trader's security badge usage data for the building; determining a subset of external event data items, wherein each external event data item of the subset of external data items is associated with a respective execution time of one of the trades performed by the trader and a time window for which the trader is not in the building; and generating an alert in response to determining that the subset of external event data items includes more external event data items than a threshold number of external event data items.

In some embodiments, the security badge usage data comprises at least of: time windows the trader is in the building; time windows the trader is not in the building; times the trader used a security badge to enter the building; and times the trader used a security badge to leave the building.

In some embodiments, at least one of the plurality of trading risk indicators is part of a suspicious badge activity scenario for detecting whether a trader's trading activity coincides with unusual patterns in security badge data, and wherein the one or more hardware computer processors are configured to execute the plurality of computer executable instructions in order to further cause the computer system to: access the suspicious badge activity scenario from the one or more computer readable storage devices; and apply the suspicious badge activity scenario to the data cluster by: analyzing the plurality of trade data items to identify the trades performed by the trader; determining an execution time associated with each trade performed by the trader; analyzing the plurality of external event data items to identify time windows the trader is not in the building from the trader's security badge usage data for the building; determining unusual time windows from the time windows the trader is in the building based on unusual security badge usage patterns; determining a subset of external event data items, wherein each external event data item of the subset of external data items is associated with a respective execution time of one of the trades performed by the trader and an unusual time window for which the trader is in the building; and generating an alert in response to determining that the subset of external event data items includes more external event data items than a threshold number of external event data items.

In various embodiments, a computer system is disclosed that comprises one or more computer readable storage devices configured to store: a plurality of computer executable instructions; at least one data cluster, wherein the at least one data cluster is associated with a data clustering strategy and is generated according to the data clustering strategy, the data cluster including at least: a plurality of trade data items including information associated with trades of a trader, and a plurality of profit and loss (PNL) data items including information associated with the trader's PNL over a time period; and a plurality of trading risk indicators, wherein at least one of the plurality of trading risk indicators is a PNL smoothing indicator for detecting whether a trader's PNL has an unreasonably smooth volatility profile given price volatility of asset classes traded and reflected in the PNL. The one or more computer readable storage devices are also configured to store: one or more hardware computer processors in communication with the one or more computer readable storage devices and configured to execute the plurality of computer executable instructions in order to cause the computer system to: access the data cluster, including the plurality of trade data items and the plurality of PNL data items, from the one or more computer readable storage devices; access the PNL smoothing indicator from the one or more computer readable storage devices; and apply the PNL smoothing indicator to the data cluster by: analyzing the plurality of PNL data items to identify the asset classes traded by the trader and reflected in the trader's PNL over the time period; analyzing the plurality of trade data items to determine volatility of each of the asset classes traded by the trader and reflected in the trader's PNL over the time period; determining volatility of the trader's PNL over the time period; determining a volatility discrepancy between the trader's PNL and the asset classes by comparing the volatility of the trader's PNL over the time period to the volatility of each of the asset classes traded by the trader and reflected in the trader's PNL over the time period; and generating an alert in response to determining the volatility discrepancy between the trader's PNL and the asset classes is greater than a threshold of volatility discrepancy between the trader's PNL and the asset classes.

In some embodiments, the one or more computer readable storage devices are further configured to store a plurality of trading risk scenarios for detecting, confirming, or denying a particular hypothesis, and wherein each trading risk scenario comprises one or more trading indicators.

In some embodiments, the at least one data cluster is further associated with data cluster analysis rules and/or data cluster scoring rules that comprise at least one of the plurality of trading risk indicators, wherein at least one of the plurality of trading risk indicators is further configured for indicating at least one of heightened risk or reduced risk, and wherein at least one of the plurality of trading risk indicators is observable or computable from the data items in the particular data cluster.

In some embodiments, the data cluster further includes a plurality of account data items including information associated with trading accounts associated with the trades of the trader. At least one of the plurality of trading risk indicators comprises an internal transfer with non-zero PNL indicator for identifying trades performed by a trader that are internal trades between internal trading books or internal trading accounts and also associated with a non-zero PNL. The one or more hardware computer processors are also configured to execute the plurality of computer executable instructions in order to further cause the computer system to: access the internal transfer with non-zero PNL indicator from the one or more computer readable storage devices; apply the internal transfer with non-zero PNL indicator to the data cluster by: analyzing the plurality of trade data items to identify trades of the trader; analyzing the plurality of account data items to identify trading accounts associated with the trades of the trader; determining which trades of the trader has an internal counterparty using the identified trading accounts associated with each trade of the trader; for each trade determined to have an internal counterparty, determining whether that trade has a non-zero PNL using the plurality of trade data items; and generating an alert in response to determining that a trade has both an internal counterparty and a non-zero PNL.

In some embodiments, the data cluster further includes a plurality of account data items including information associated with trading accounts associated with the trades of the trader. At least one of the plurality of trading risk indicators comprises a mark arbitrage indicator for identifying trades performed by a trader that are internal trades between internal counterparties that have different accounting regions, wherein the internal counterparties comprise internal trading books or internal trading accounts. The one or more hardware computer processors are also configured to execute the plurality of computer executable instructions in order to further cause the computer system to: access the mark arbitrage indicator from the one or more computer readable storage devices; apply the mark arbitrage indicator to the data cluster by: analyzing the plurality of trade data items to identify trades of the trader; analyzing the plurality of account data items to identify trading accounts associated with the trades of the trader; determining which trades of the trader has internal counterparties using the identified trading accounts associated with each trade of the trader; for each trade determined to have internal counterparties, determining whether the internal counterparties have different accounting regimes using the plurality of account data items; and generating an alert in response to determining that a trade has internal counterparties with different account regimes.

In some embodiments, the data cluster further includes a plurality of external event data items including information associated with a compensation cycle for the trader. At least one of the plurality of trading risk indicators comprises a PNL jump in line with compensation cycle indicator for identifying big, positive PNL changes highly correlated to timing of a compensation cycle. The one or more hardware computer processors are configured to execute the plurality of computer executable instructions in order to further cause the computer system to: access the PNL jump in line with compensation cycle indicator from the one or more computer readable storage devices; apply the PNL jump in line with compensation cycle indicator to the data cluster by: analyzing the plurality of PNL data items to identify a big, positive change to the trader's PNL; determining a time associated with the big, positive change to the trader's PNL; analyzing the plurality of external event data items to identify a compensation cycle; determining a time associated with a change in the compensation cycle; and generating an alert in response to determining that the time associated with the big, positive change to the trader's PNL is within a threshold time period right before the time associated with a change in the compensation cycle.

In some embodiments, at least one of the plurality of trading risk indicators comprises an adverse execution selection indicator for identifying trades booked away from the market in order to create PNL or cash. The one or more hardware computer processors are also configured to execute the plurality of computer executable instructions in order to further cause the computer system to: access the adverse execution selection indicator from the one or more computer readable storage devices; apply the adverse execution selection indicator to the data cluster by: analyzing the plurality of trade data items to identify trades of the trader; determining an actual execution cost associated with each trade of the trader; determining an expected execution cost associated with each trade of the trader; and generating an alert in response to determining the deviation between the expected transaction cost and the actual execution cost of each trade of the trader is above a threshold.

In some embodiments, at least one of the plurality of trading risk indicators comprises a trading away from bucket VWAP indicator for identifying trades that are executed at a price which should on average be attainable by a trader. The one or more hardware computer processors are also configured to execute the plurality of computer executable instructions in order to further cause the computer system to: access the trading away from bucket VWAP indicator from the one or more computer readable storage devices; apply the trading away from bucket VWAP indicator to the data cluster by: analyzing the plurality of trade data items to identify all trades by the trader over a time period; determining a traded product associated with a trade by the trader over the time period; determining an execution price associated with a trade by the trader over the time period; analyzing the plurality of trade data items to identify all trades in a firm over the time period associated with the traded product or a similarly traded product, wherein the similarly traded product has a higher than average correlation to the traded product; determining an execution price associated with each trade in the firm over the time period associated with the traded product or a similarly traded product; determining the volume weighted average price (VWAP) of the execution prices associated with all trades in a firm over the time period associated with the traded product or the similarly traded product; and generating an alert in response to determining the execution price associated with a trade by the trader over the time period deviates from the VWAP by a threshold.

In some embodiments, the data cluster further includes a plurality of account data items including information associated with trading accounts associated with the trades of the trader. At least one of the plurality of trading risk indicators comprises an unexpected correlation indicator for identifying trades that are executed at a price which should on average be attainable by a trader. The one or more hardware computer processors are also configured to execute the plurality of computer executable instructions in order to further cause the computer system to: access the unexpected correlation indicator from the one or more computer readable storage devices; apply the unexpected correlation indicator to the data cluster by: analyzing the plurality of PNL data items to identify the PNL associated with the trader over a time period; determining the price or variance of the PNL associated with the trader over the time period; analyzing the plurality of account data items to identify trading accounts or books associated with the trader's PNL over the time period; determining the trades by the trader made in the trading accounts or book associated with the trader's PNL over the time period; analyzing the plurality of trade data items to identify trading products associated with the trades by the trader made in the trading accounts or book associated with the trader's PNL over the time period; determining the price or variance of the trading products associated with the trades by the trader made in the trading accounts or book associated with the trader's PNL over the time period; and generating an alert in response to determining that either correlation or cointegration between the price or variance of the trading products and the price or variance of the PNL associated with the trader over the time period is below a threshold.

In various embodiments, computer-implemented methods are disclosed in which, under control of one or more hardware computing devices configured with specific computer executable instructions, one or more aspects of the above-described embodiments are implemented and/or performed.

In various embodiments, a non-transitory computer-readable storage medium storing software instructions is disclosed that, in response to execution by a computer system having one or more hardware processors, configure the computer system to perform operations comprising one or more aspects of the above-described embodiments.

Further, as described herein, a data analysis system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

Cluster Analysis

Figure 10A:
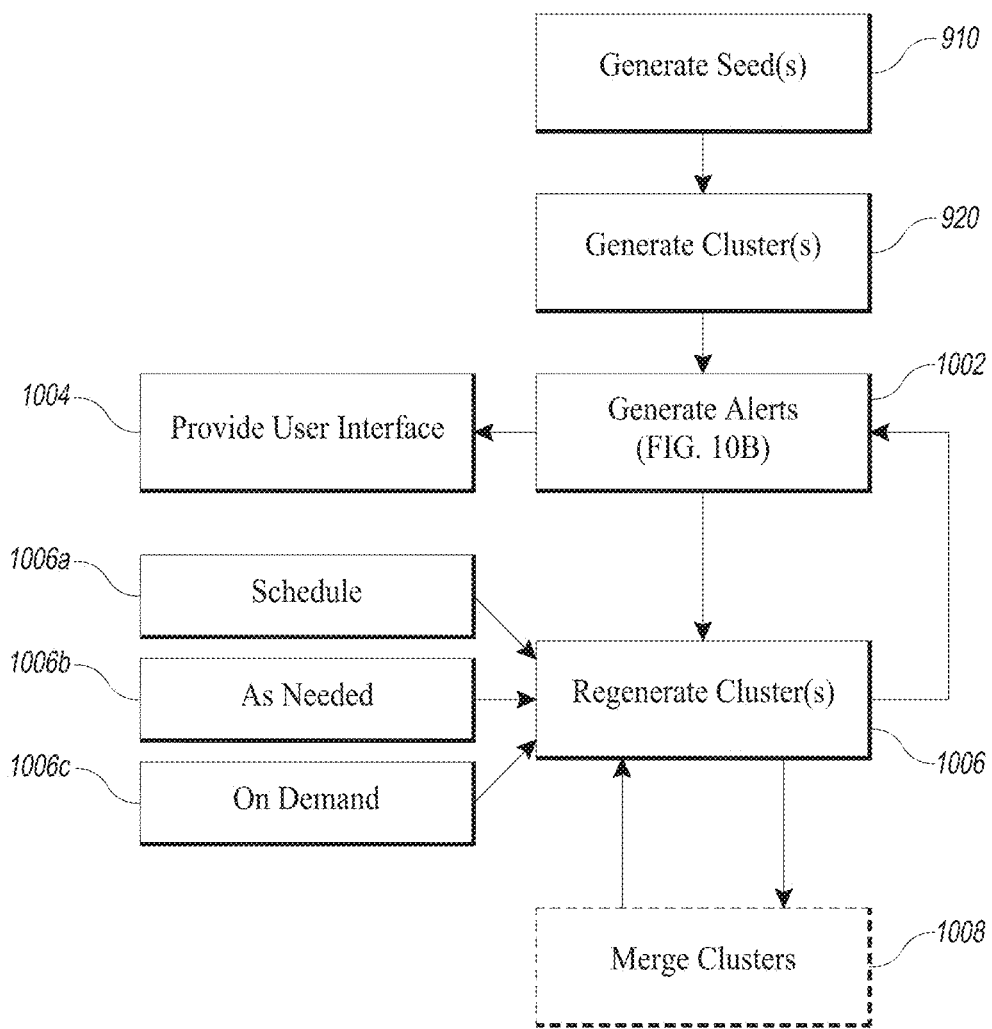

FIG. 10A is a flowchart for an example method of data cluster analysis, according to an embodiment of the present disclosure.

Figure 10B:
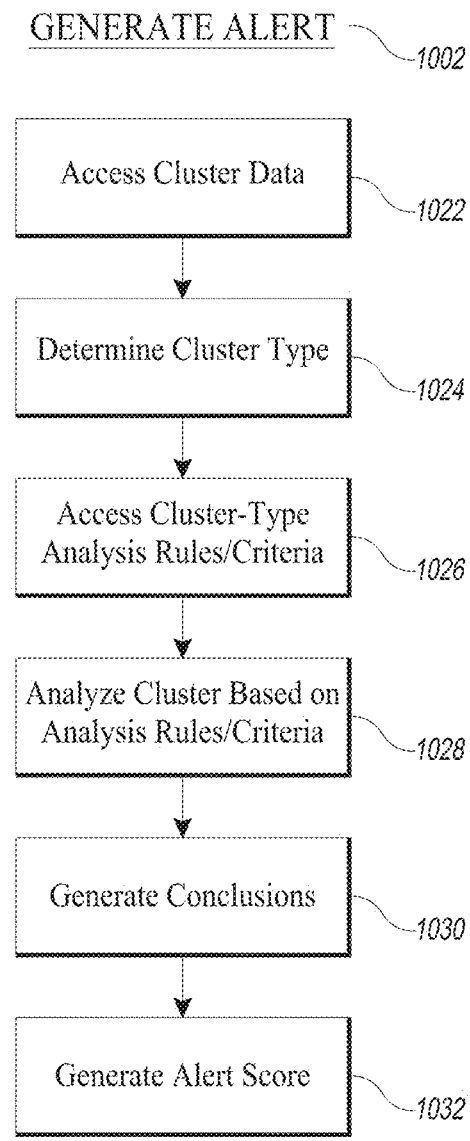

FIG. 10B is a flowchart of an example method of alert generation, according to an embodiment of the present disclosure.

Figure 11:
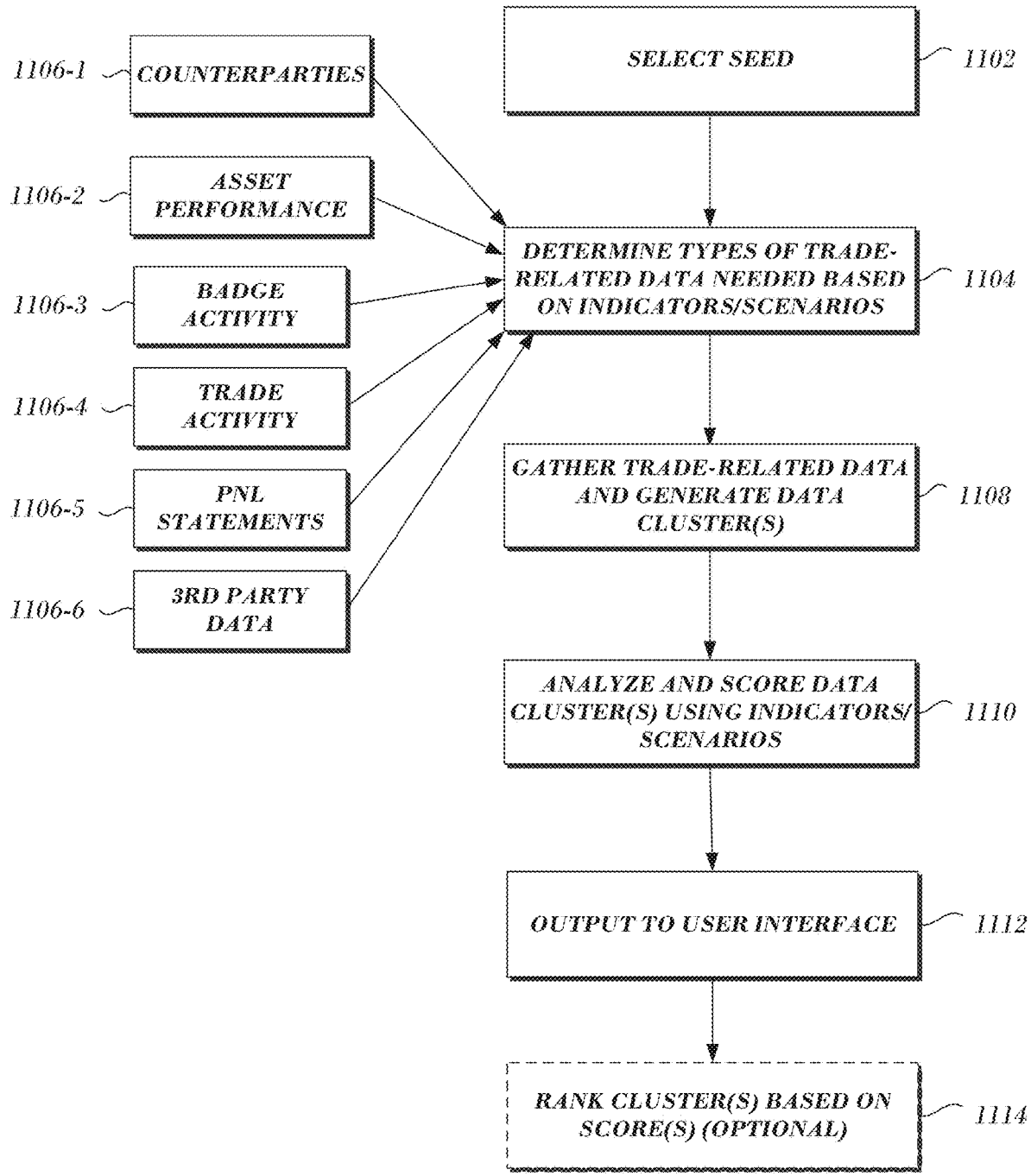

FIG. 11 is a flowchart for an example method of data cluster generation and analysis, according to an embodiment of the present disclosure.

Figure 12A:
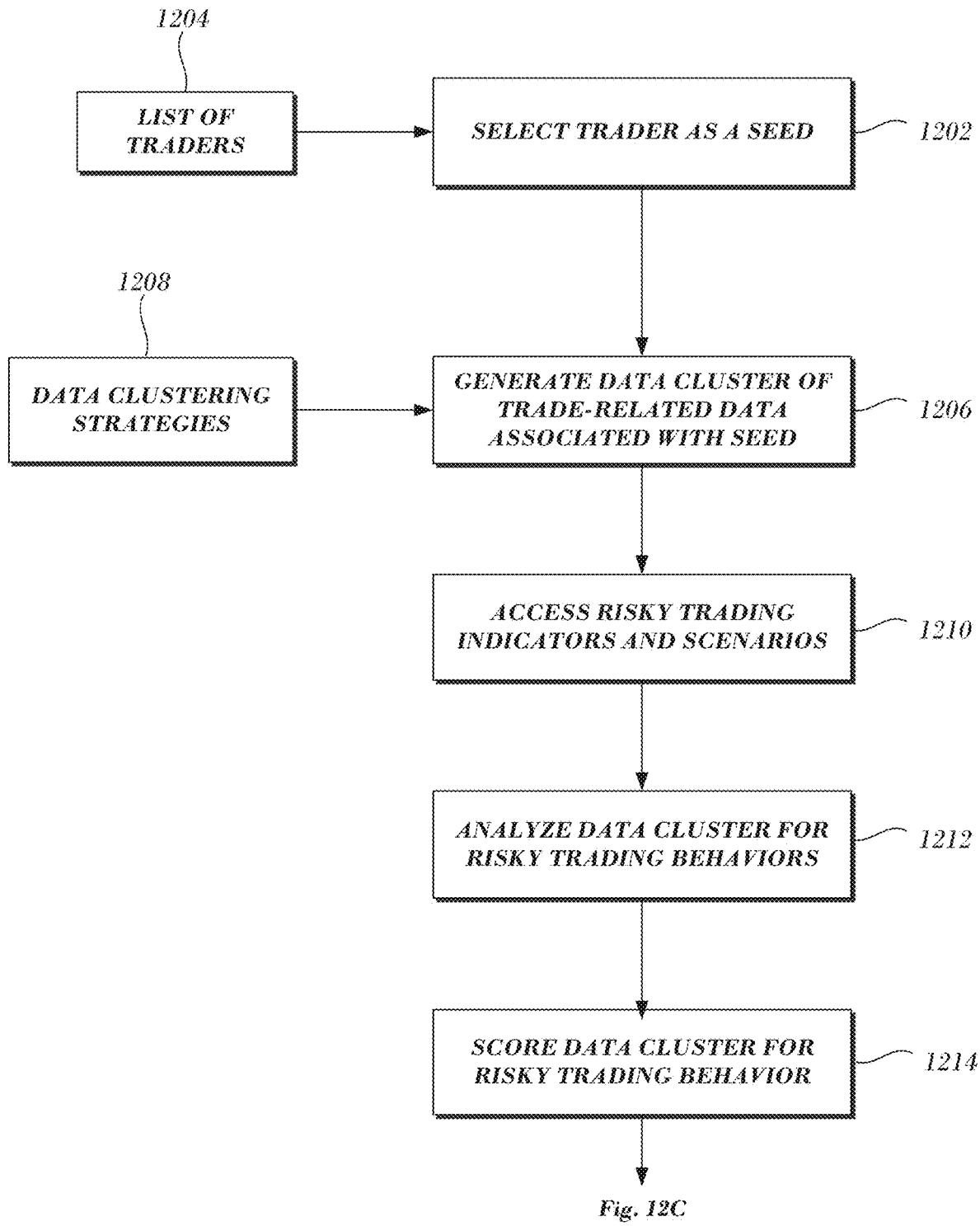

FIG. 12A is a flowchart for an example method of data cluster generation and analysis, according to an embodiment of the present disclosure.

Figure 12B:
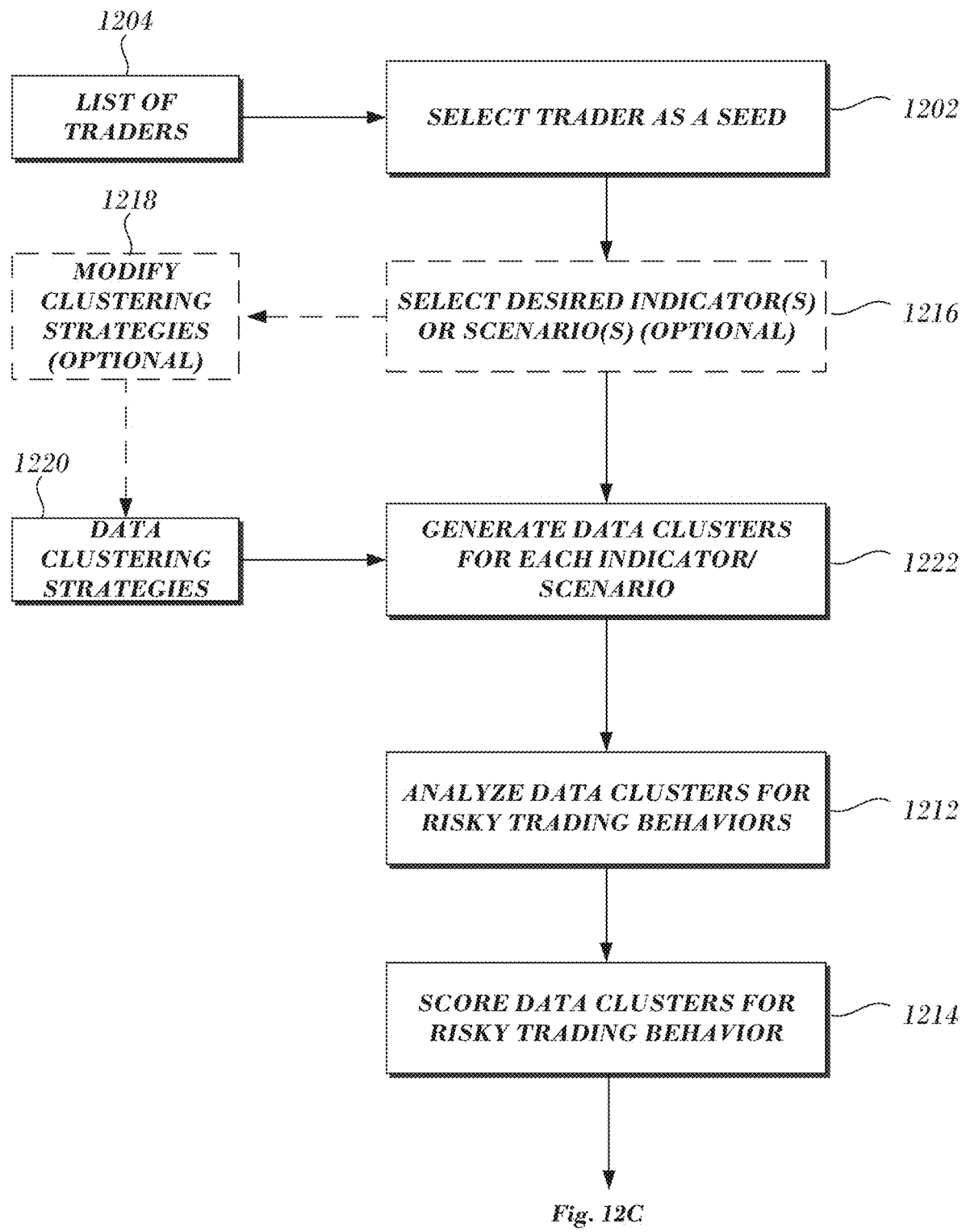

FIG. 12B is a flowchart for an example method of data cluster generation and analysis, according to an embodiment of the present disclosure.

Figure 12C:
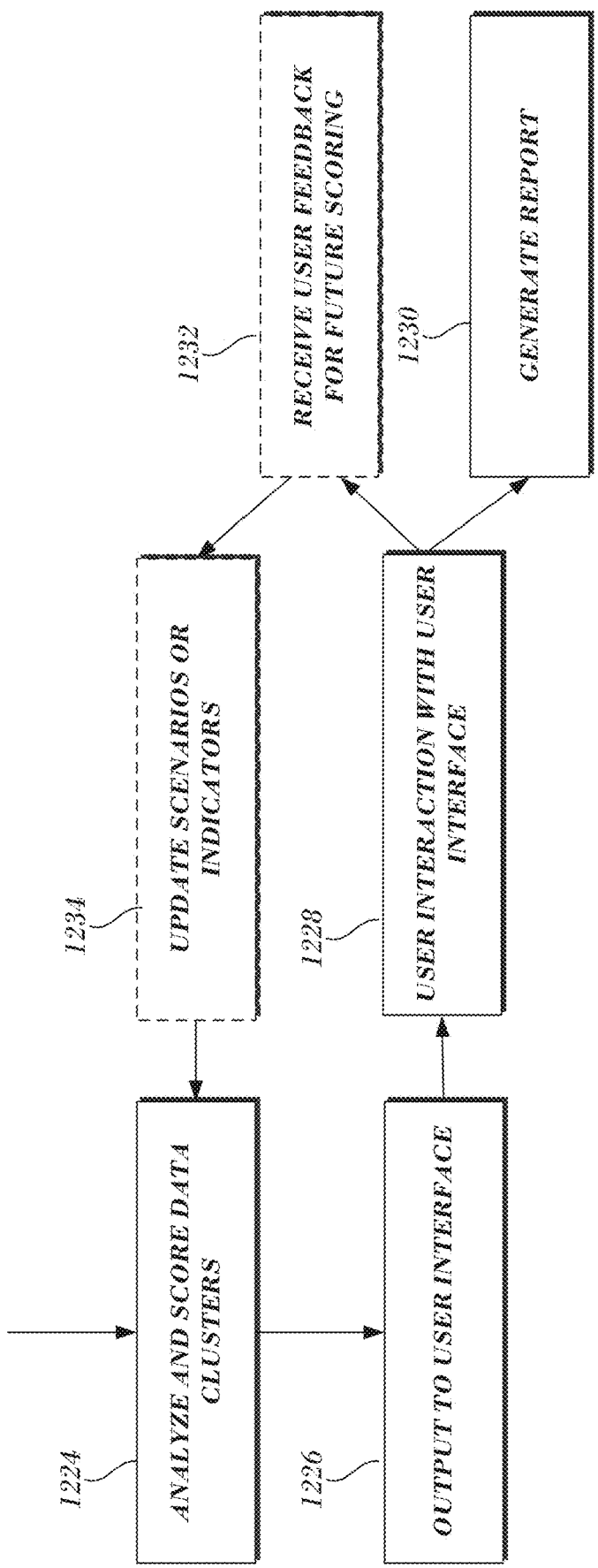

FIG. 12C is a flowchart for an example method of utilizing a user interface of a data analysis system in a holistic, data-driven approach, according to an embodiment of the present disclosure.

Figure 13:
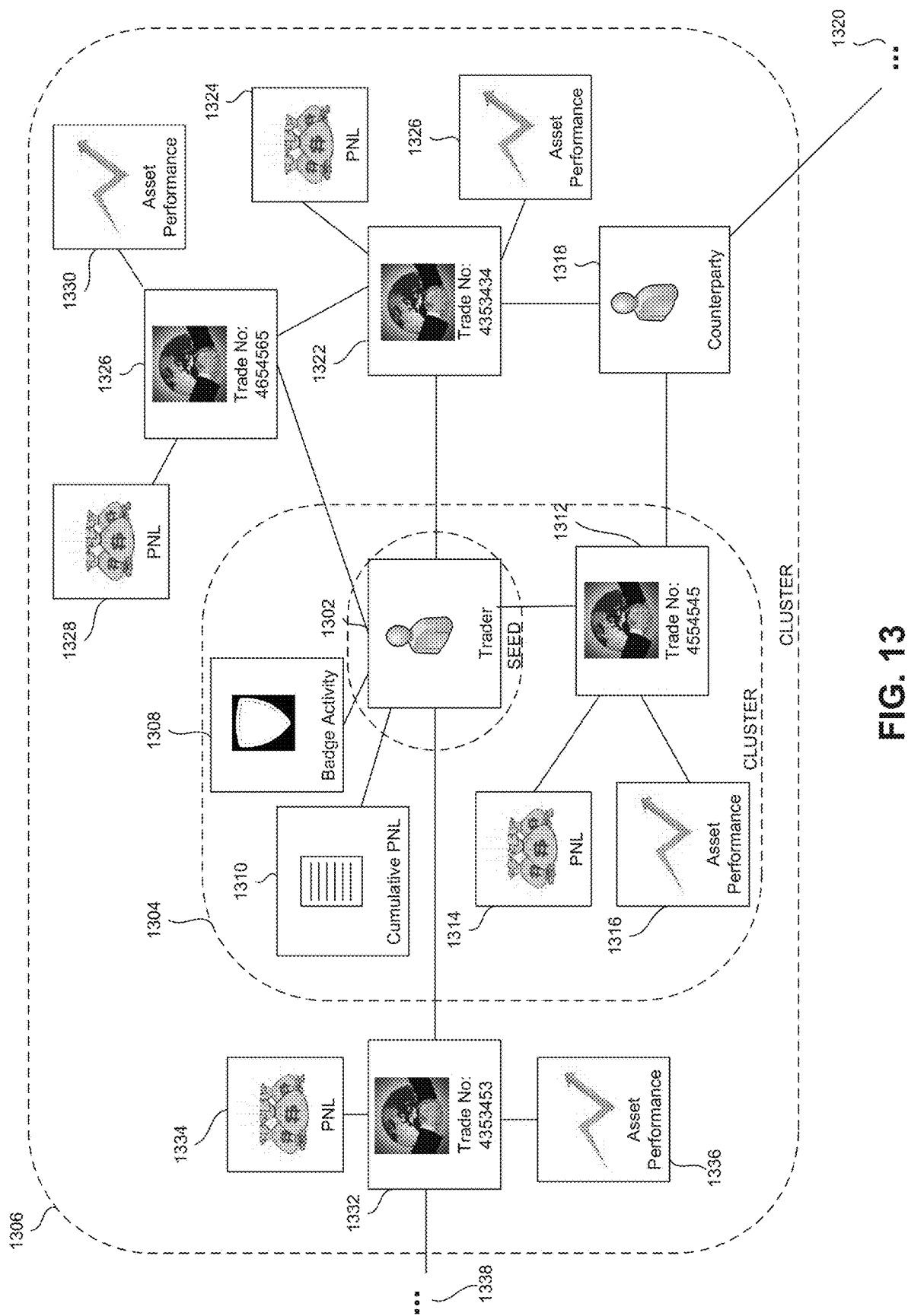

FIG. 13 is a diagram of example data clusters that can be generated for analysis, according to an embodiment of the present disclosure.

Figure 14:
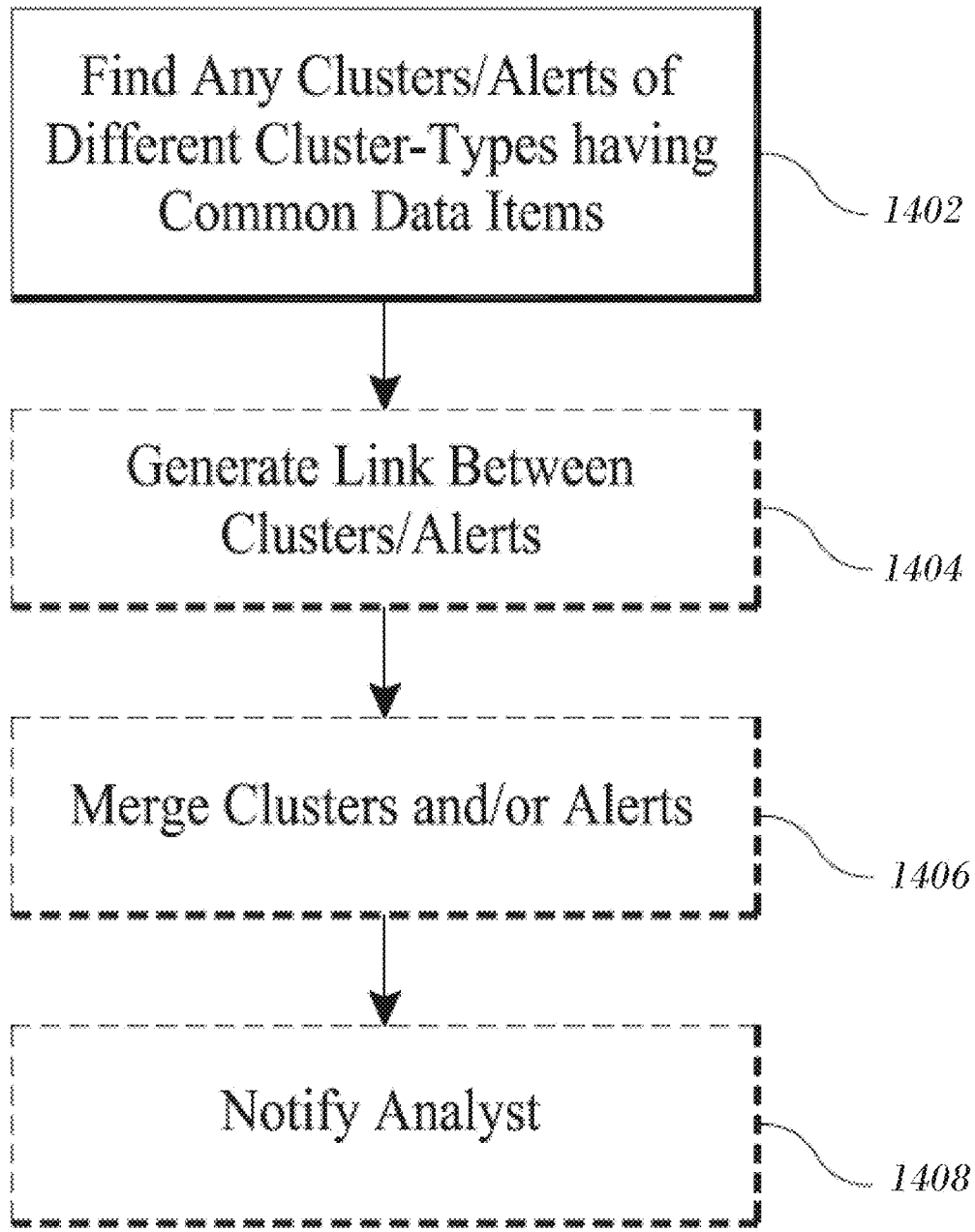

FIG. 14 is a flowchart of an example method of linking related alerts or data clusters, according to an embodiment of the present disclosure.

Figure 15:
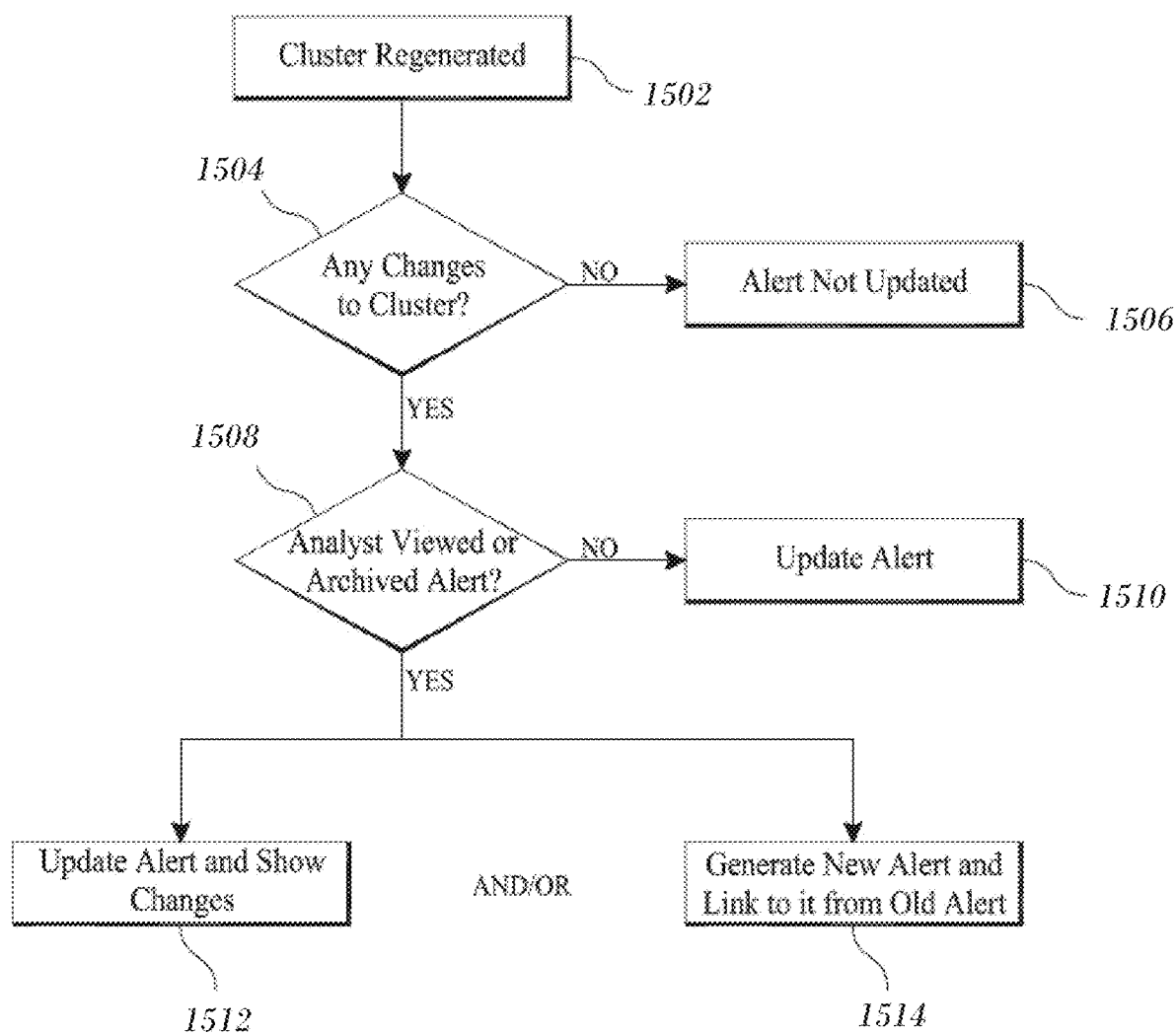

FIG. 15 is a flowchart of an example method of updating alerts in response to cluster regeneration, according to an embodiment of the present disclosure.

Cluster Tagging and Grouping

Figure 16:
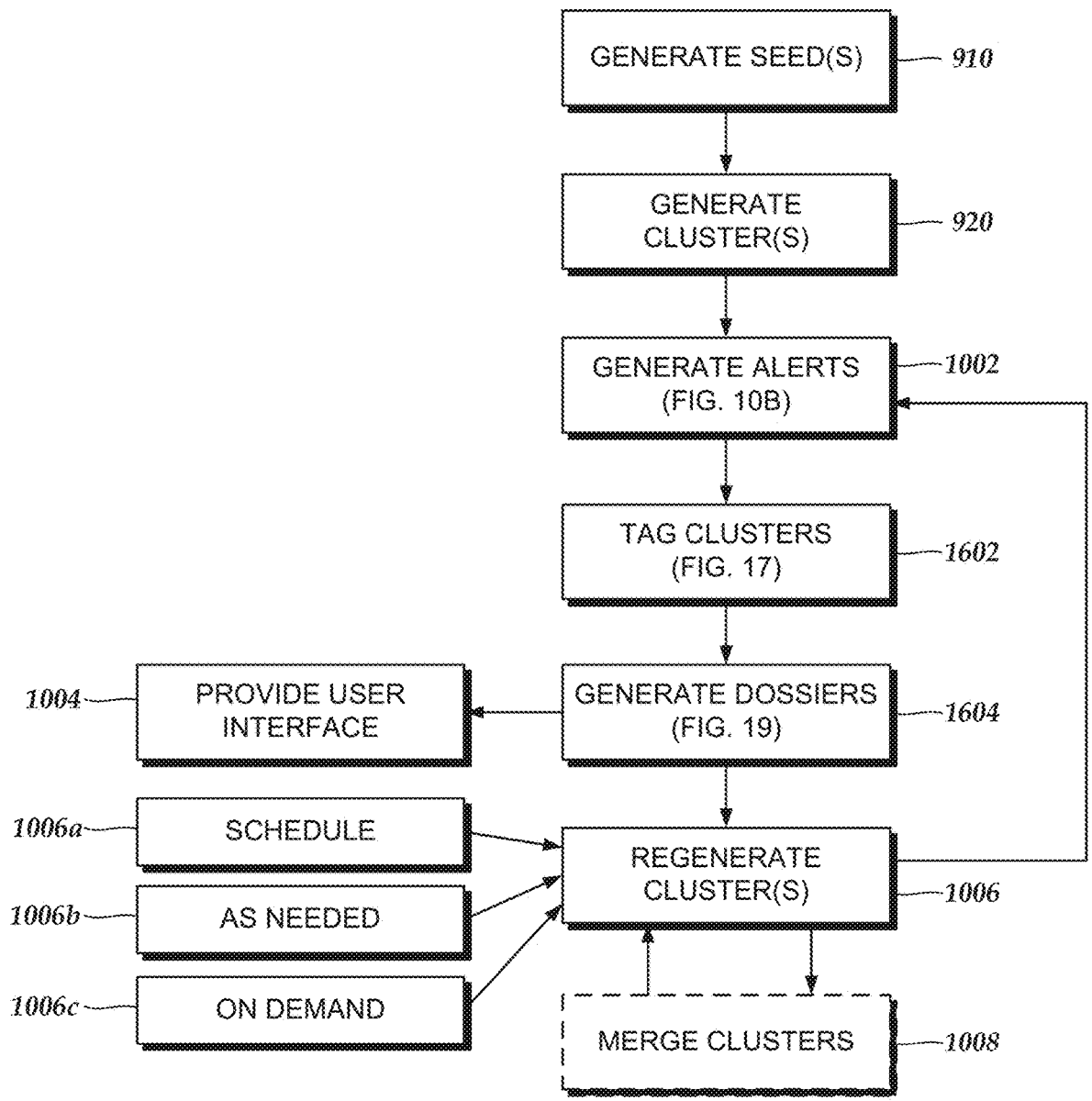

FIG. 16 is another flowchart of an example method of data cluster analysis, according to an embodiment of the present disclosure.

Figure 17:
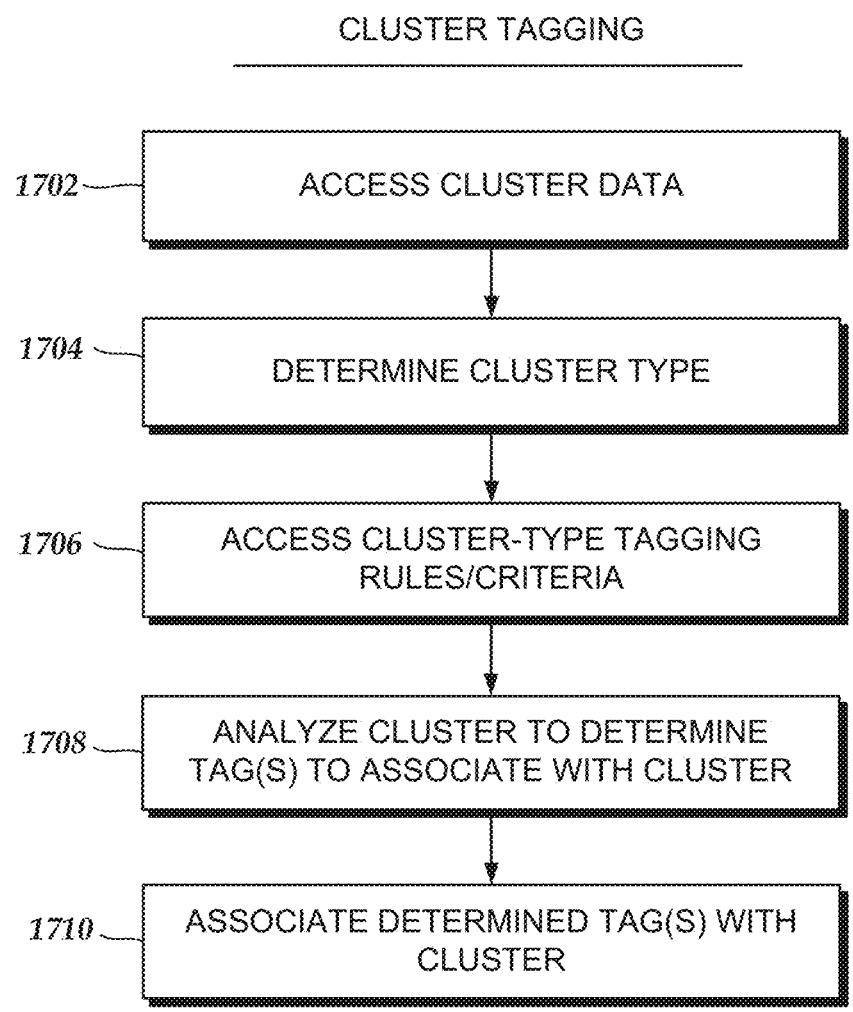

FIG. 17 is a flowchart of an example method of cluster tagging, according to an embodiment of the present disclosure.

Figure 18:
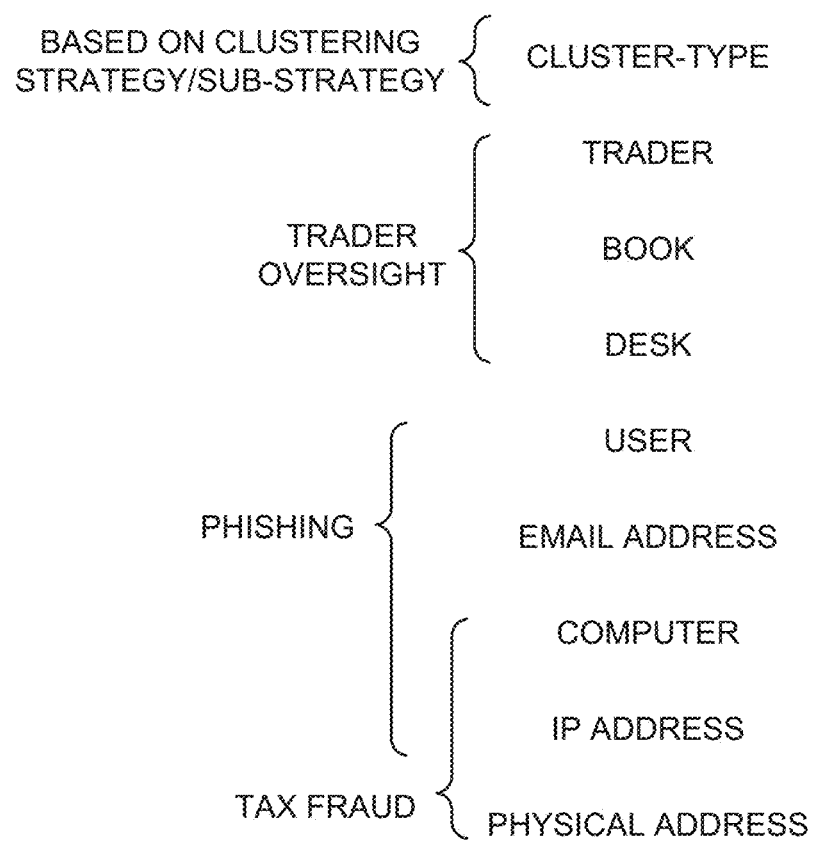

FIG. 18 shows examples of cluster tag types.

Figure 19:
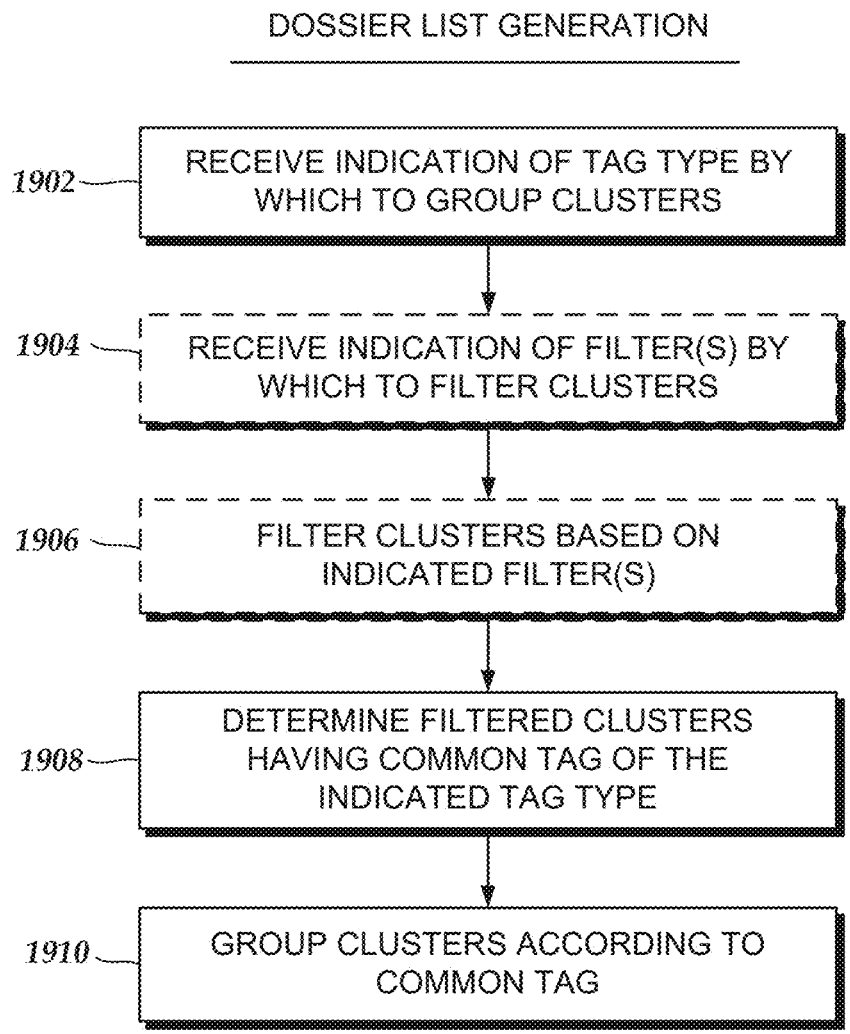

FIG. 19 is a flowchart of an example method of dossier list generation, according to an embodiment of the present disclosure.

FIGS. 20-27 illustrate example dossier analysis user interfaces of the data analysis system, according to embodiments of the present disclosure.

DETAILED DESCRIPTION

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

In order to facilitate an understanding of the systems and methods discussed herein, a number of terms are defined below. The terms defined below, as well as other terms used herein, should be construed broadly to include, without limitation, the provided definitions, the ordinary and customary meanings of the terms, and/or any other implied meanings for the respective terms. Thus, the definitions below do not limit the meaning of these terms, but only provide example definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (for example, Oracle database, mySQL database, and the like), spreadsheets, XML files, and text file, among others. The various terms "database," "data store," and "data source" may be used interchangeably in the present disclosure.

Data Item (Item), Data Object (Object), or Data Entity (Entity): A data container for information representing a specific thing, or a group of things, in the world. A data item may be associated with a number of definable properties (as described below). For example, a data item may represent an item such as a person, a place, an organization, an account, a computer, an activity, a market instrument, or other noun. A data item may represent an event that happens at a point in time or for a duration. A data item may represent a document or other unstructured data source such as an e-mail message, a news report, or a written paper or article. Each data item may be associated with a unique identifier that uniquely identifies the data item. The terms "data item," "data object," "data entity," "item," "object," and "entity" may be used interchangeably and/or synonymously in the present disclosure.

Item (or Entity or Object) Type: Type of a data item (for example, Person, Event, or Document). Data item types may be defined by an ontology and may be modified or updated to include additional data item types. An data item definition (for example, in an ontology) may include how the data item is related to other data items, such as being a sub-data item type of another data item type (for example, an agent may be a sub-data item of a person data item type), and the properties the data item type may have.

Properties: Also referred to herein as "attributes" or "metadata" of data items. A property of a data item may include any item of information associated with, and/or relevant to, the data item. At a minimum, each property of a data item has a property type and a value or values. For example, properties associated with a person data item may include a name (for example, John Doe), an address (for example, 123 S. Orange Street), and/or a phone number (for example, 800-0000), among other properties. In another example, properties associated with a computer data item may include a list of users (for example, user1, user 2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Seed: One or more data items that may be used as a basis, or starting point, for generating a cluster. A seed may be generated, determined, and/or selected from one or more sets of data items according to a seed generation strategy. For example, seeds may be generated from data items accessed from various databases and data sources including, for example, databases maintained by financial institutions, government items, private items, public items, and/or publicly available data sources.

Cluster: A group or set of one or more related data items/objects/items. A cluster may be generated, determined, and/or selected from one or more sets of data items according to a cluster generation strategy. A cluster may further be generated, determined, and/or selected based on a seed. For example, a seed may comprise an initial data item of a cluster. Data items related to the seed may be determined and added to the cluster. Further, additional data items related to any clustered data item may also be added to the cluster iteratively as indicated by a cluster generation strategy. Data items may be related by any common and/or similar properties, metadata, types, relationships, and/or the like. Clusters may also be referred to herein as "clustered data structures," "data item clusters," and "data clusters."

Seed/Cluster Generation Strategy (also referred to herein as Seed/Cluster Generation Rule(s)): Seed and cluster generation strategies/rules indicate processes, methods, and/or strategies for generating seeds and generating clusters, respectively. For example, a seed generation strategy may indicate that data items having a particular property (for example, traders selected from a list of traders) are to be designated as seeds. In another example, a cluster generation strategy may indicate that data items having particular properties in common with (or similar to) a seed or other data item in a cluster are to be added to the cluster. Seed and/or cluster generation strategies may specify particular searches and/or rule matches to perform on one or more sets of data items. Execution of a seed and/or cluster generation strategy may produce layers of related data items. Additionally, a seed/cluster generation strategy/rule may include multiple strategies, sub-strategies, rules, and/or sub-rules.

Dossier: A group of clusters and/or a user interface for displaying information associated with a group of clusters.

In various embodiments, as described below, clusters of data items may be grouped together according to similar tags applied to those clusters. For example, two clusters may both be tagged "trader 1." Accordingly, the two clusters may be grouped together and designated a "dossier" or "trader 1 dossier." A user interface displaying information associated with data items from the two grouped clusters may also be referred to as a "dossier" or a "dossier user interface."

Overview

This disclosure relates to a data analysis system (also referred to herein as the "system") in which memory-efficient clustered data structures (also referred to herein as "clusters") of related data items may be automatically generated and analyzed, tagged, grouped, and results may be provided for interaction from an analyst, for example. Generation of clusters may begin by automatic generation, determination, and/or selection of an initial data item of interest, called a "seed." As mentioned above, a data item may include any data, information, or things, such as a person, a place, an organization, an account, a computer, an activity, and event, and/or the like. Seeds may be automatically selected/generated according to various seed determination strategies, and clusters of related data items may be generated based on those seeds and according to cluster generation strategies (also referred to herein as "cluster strategies," "clustering strategies," and/or "cluster generation rules"). Seeds and related data items may be accessed from various databases and data sources including, for example, databases maintained by financial institutions, government entities, private entities, public entities, and/or publicly available data sources. Such databases and data sources may include a variety of information and data, such as, for example, personal information, financial information (including financial transactions or financial instrument information), tax-related information, computer network-related data, and/or computer-related activity data, among others. Further, the databases and data sources may include various relationships that link and/or associate data items with one another. Various data items and relationships may be stored across different systems controlled by different items and/or institutions. According to various embodiments, the data analysis system may bring together data from multiple data sources in order to build clusters.

The automated analysis of the clusters may include an automated tagging of the clusters based on a type of each cluster and data associated with the cluster, and grouping of clusters that are similarly tagged. Via a user interface of the system, an analyst may select criteria for grouping and re-grouping of clusters. Accordingly, the system enables dynamic grouping of clusters in various ways to make an investigation more efficient. Further, the system enables filtering of the clusters according to various criteria in response to the analyst's inputs, and dynamic and interactive updating of the user interfaces in response to the grouping and/or filtering. The automated analysis may also include generation of time-based charts showing information associated with the groups of data clusters.

The automated analysis of the clusters may further include an automated application of various criteria, rules, indicators, or scenarios so as to generate a compact, human-readable analysis of the data clusters. The human-readable analyses (also referred to herein as "summaries" or "conclusions") of the data clusters may be organized into an interactive user interface so as to enable an analyst to quickly navigate among information associated with various data clusters and efficiently evaluate those data clusters in the context of, for example, a fraud investigation. Embodiments of the present disclosure also disclose automated scoring of the clustered data structures by the data analysis system. The interactive user interface may be updated based on the scoring, directing the human analyst to more critical data clusters (for example, data clusters more likely to be associated with a certain type of risky behavior) in response to the analyst's inputs.

In various embodiments, the data analysis system may enable an analyst (and/or other user) to efficiently perform analysis and investigations of various data clusters and related data items. For example, the system may enable an analyst to perform various financial and security investigations of data clusters of related data items. In such an investigation, the system may automatically create clusters of related data items, generate human-readable conclusions of the clusters, score those clusters, and generate an interactive user interface in which, in response to inputs from the analyst, information related to the clusters may be efficiently provided to the analyst. For example, a trader may be a seed that is linked by the system to various data items including, for example, trader identifiers, trade-related data, trading accounts and/or trading books associated with the trader. Further, the system may link, for example, various other traders and counterparties that transacted with the trader identifier, to the seed trader. Accordingly, in various embodiments, the system may automatically cluster of various layers of data items related to the seed trader. One or more rules or criteria may then automatically be applied to the cluster so as to generate one or more compact, human-readable analyses (also referred to herein as "summaries" or "conclusions") of the data clusters. The human-readable analyses may comprise phrases or sentences that provide highly relevant, and easily evaluated (by a human), information regarding the data in the cluster (for example, data items and metadata). For example, a conclusion in the current example may be "4 traders are associated with the current cluster," or "The 2 trading accounts in the cluster have been used in 30 different trades." Such conclusions in an investigation may, in an embodiment, enable the analyst to determine a likelihood of risky activity associated with the cluster. Further, the data items of the cluster may then be linked to possible risky activity. For example, the seed trader, linked trading accounts, and associated trade-related data may all be linked to the potentially risky activity. As mentioned above, in such an investigation the analyst may efficiently determine likely risky behavior, as well as discover relationships between trades, trade-related data, and the seed trader through several layers of related data items. Such techniques, enabled by various embodiments of the data analysis system, may be particularly valuable for investigations in which relationships between data items may include several layers, and in which such relationships may be otherwise very difficult or impossible to manually identify.

In various embodiments, the data analysis system may automatically generate, or determine, seeds based on a seed generation strategy (also referred to as "seed generation rules"). For example, for a particular set of data items, the data analysis system may automatically generate, based on a seed generation strategy, seeds by designating particular data items (and/or groups of data items) as seeds. Examples of various seed generation strategies are described below.

Further, in various embodiments, the data analysis system may automatically discover data items related to a seed, and store the resulting relationships and related data items together in a "cluster" (or, alternatively, designating the seed as the initial cluster (or initial data item of the cluster) and adding the discovered data items of the cluster). A cluster generation strategy may specify particular searches to perform at each step of an investigation, or cluster generation, process. Such searches may produce layers of related data items to add to the cluster. Further, according to an embodiment, multiple clusters may be merged and/or collapsed into a single cluster when the multiple clusters share one or more common data items and/or properties. Thus, according to an embodiment, an analyst may start an investigation with the resulting cluster, rather than the seed alone. Starting with the cluster, and associated human-readable conclusions, the analyst may form opinions regarding the related data items, conduct further analysis of the related data items, and/or may query for additional related data items.

According to various embodiments, the data analysis system may further generate various "cluster scores." Cluster scores may include scores based on various characteristics and/or attributes associated with the cluster and/or the various data items of the cluster. In various embodiments, the data analysis system may also generate "cluster metascores" which may include, for example, an overall cluster score. Cluster metascores may, for example, be based on a combination of cluster scores of a cluster associated with a seed. In an embodiment, the system may further generate "alert scores." Alert scores may be the same as, similar to, and/or based on any of the cluster scores, metascores, and/or conclusions described herein. In an embodiment, the alert score may be a metascore, and may be one of multiple values corresponding to, for example, a high alert, a medium alert, or a low alert. The alert score is described in further detail below. Further, cluster scores may be based on one or more generated conclusions related to the cluster, and/or the conclusions may be generated based on cluster scores.

According to various embodiments, the data analysis system may perform analysis on the data clusters and generate cluster scores and/or flag data clusters based on indicators or scenarios. Indicators may be pre-defined rules, strategies, or criteria for analyzing relationships between data in a data cluster. Indicators may be a data cluster scoring strategy. For example, one indicator may be a method for detecting the presence of PNL smoothing, a situation which may be associated with risky trading behavior. PNL or P&L is a financial term for a profit and loss statement. It may include the day-over-day change in the value of a portfolio of trades typically calculated using the following formula: value today—value from prior day. However, PNL may also be associated with the change of a portfolio of trades over a different time period, such as a year, or it may even be associated with a trade or group of related trades (rather than an entire account or portfolio). The data cluster may include the PNL data or account equity data over time for a given trader serving as the seed. That indicator may calculate the variation of that data over a time frame in order to spot artificial smoothing in the curve, and then either flag the data cluster for the presence of PNL smoothing or generate a cluster score associated with PNL smoothing that represents the likelihood that PNL smoothing occurred. Scenarios may be pre-defined rules, strategies, or criteria for analyzing combinations of indicators and/or their associated cluster scores—also for the purpose of analyzing relationships between data in a data cluster. For example, one indicator may compare the trade time for a given trade conducted by a trader seed against a building's security badge activity of that trader. If the trade did not occur during the time when the trader was physically badged-in at a secure trading location, that may indicate suspicious trading activity. One scenario may be a method of analyzing patterns or recurring suspicious trading activity of this sort, in order to more definitively determine whether a trader is actively engaging in trading without being badged-in or sharing their trading account.

Further, in various embodiments, for a particular set of data items, multiple clusters may be generated by the data analysis system. For example, the data analysis system may generate multiple seeds according to a seed generation strategy, and then multiple clusters based on those seeds (and based on a cluster generation strategy). In such embodiments, the data analysis system may prioritize the multiple generated clusters based upon cluster scores and/or cluster metascores. In an embodiment, the data analysis system may provide a user interface including a display of human-readable conclusions of the clusters, cluster scores, cluster metascores, and/or various other cluster information. Such a user interface may be organized according to a prioritization of clusters. In various embodiments, cluster prioritization may assist an analyst in selecting particular clusters to investigate.

In various embodiments, the interactive user interface generated by the system may provide a list of clusters according to one or more alert scores (as mentioned above and described in detail below). Further, in response to an analyst selecting a cluster, information associated with the cluster may be provided to the analyst. For example, the analyst may be provided with a name of the cluster, a cluster strategy by which the cluster was generated, a list of generated conclusions, and/or one or more lists or tables of data related to the cluster. For example, the one or more lists or tables of data related to the cluster may be drawn from the data items of the cluster, and may be filtered by the analyst according to time and/or type of data. In an embodiment, various generated clusters in the interactive user interface may be organized according to clustering strategies whereby each of the clusters were generated. In an embodiment, a cluster type may be associated with each cluster, and may be determined according to the cluster strategy that generated the cluster.

As mentioned above, in various embodiments, a generated cluster may include far fewer data items than are included in a full source database and/or references to master instances of data items, and the data items included in the cluster may only include those data items that are relevant to a particular investigation (for example, a fraud investigation). Accordingly, in an embodiment, processing of the generated cluster may be highly efficient as compared to the collection of data described above. This may be because, for example, a given risky investigation by an analyst (for example, as the analyst sifts and/or searches through data items of a cluster) may only require storage in memory of a single cluster data structure. Further, a number of data items in a cluster may be several orders of magnitude smaller than in the entire electronic collection of data described above because only data items related to each other are included in the cluster.

Additionally, the automated analysis and scoring of clusters (as mentioned above) may enable highly efficient evaluation of the various data clusters by a human analyst. For example, the interactive user interface us generated so as to enable an analyst to quickly view critical data clusters (as determined by the automated scoring), and then in response to analyst inputs, view and interact with the generated information (including, for example, the human-readable conclusions) associated with the clusters. In response to user inputs the user interface may be updated to display raw data associated with each of the generated clusters if the analyst desires to dive deeper into data associated with a given cluster.

In various embodiments, the data analysis system may be used in various data analysis applications. Such applications may include, for example, trader oversight, financial fraud detection, tax fraud detection, beaconing malware detection, malware user-agent detection, other types of malware detection, activity trend detection, health insurance fraud detection, financial account fraud detection, detection of activity by networks of individuals, criminal activity detection, network intrusion detection, detection of phishing efforts, money laundering detection, and/or financial malfeasance detection. Examples of many of the above-mentioned data analysis applications, including methods and systems for identifying data items, generating data clusters, and analyzing/scoring clusters, are disclosed in the various related applications listed above and previously incorporated by reference herein.

As mentioned in reference to various features of the disclosure below, this application is related to U.S. patent application Ser. No. 14/139,628, titled "TAX DATA CLUSTERING," and filed Dec. 23, 2013; U.S. patent application Ser. No. 14/139,603, titled "MALWARE DATA CLUSTERING," and filed Dec. 23, 2013; U.S. patent application Ser. No. 14/139,713, titled "USER-AGENT DATA CLUSTERING," and filed Dec. 23, 2013; U.S. patent application Ser. No. 14/139,640, titled "TREND DATA CLUSTERING," and filed Dec. 23, 2013; U.S. patent application Ser. No. 14/251,485, titled "FRAUD DETECTION AND SCORING," and filed Apr. 11, 2014; U.S. patent application Ser. No. 14/278,963, titled "CLUSTERING DATA BASED ON INDICATIONS OF FINANCIAL MALFEASANCE," and filed May 15, 2014; U.S. Provisional patent application Ser. No. 14/639,606, titled "AUTOMATED DATABASE ANALYSIS TO DETECT MALFEASANCE," and filed Mar. 5, 2015; U.S. Provisional patent application Ser. No. 14/616,080, titled "MALICIOUS SOFTWARE DETECTION IN A COMPUTING SYSTEM," and filed Feb. 6, 2015; U.S. patent application Ser. No. 14/473,552, titled "DATA ITEM CLUSTERING AND ANALYSIS," and filed Aug. 29, 2014; U.S. patent application Ser. No. 14/473,920, titled "EXTERNAL MALWARE DATA ITEM CLUSTERING AND ANALYSIS," and filed Aug. 29, 2014; U.S. patent application Ser. No. 14/473,860, titled "MALWARE DATA ITEM ANALYSIS," and filed Aug. 29, 2014; and U.S. Provisional Patent Application No. 62/135,448, titled "SYSTEM FOR PROVIDING DYNAMIC LINKED PANELS IN USER INTERFACE," and filed Mar. 19, 2015; U.S. patent application Ser. No. 14/579,752, titled "SYSTEMS AND USER INTERFACES FOR DYNAMIC AND INTERACTIVE INVESTIGATION OF BAD ACTOR BEHAVIOR BASED ON AUTOMATIC CLUSTERING OF RELATED DATA IN VARIOUS DATA STRUCTURES," and filed Dec. 22, 2014. The entire disclosure of each of the above items is hereby made part of this specification as if set forth fully herein and incorporated by reference for all purposes, for all that it contains.

In the following description, numerous specific details are set forth to provide a more thorough understanding of various embodiments of the present disclosure. However, it will be apparent to one of skill in the art that the systems and methods of the present disclosure may be practiced without one or more of these specific details.

Examples of Data Items, Properties, and Links

In various embodiments, different types of data items may have different property types. For example, a "Person" data item may have an "Eye Color" property type and an "Event" data item may have a "Date" property type. Each property as represented by data in a database may have a property type defined by an ontology used by the database. Further, data items may be instantiated in a database in accordance with a corresponding object definition for the particular data item in the ontology. For example, a specific monetary payment (for example, an item of type "event") of US$30.00 (for example, a property of type "currency" having a property value of "US$30.00") taking place on Mar. 27, 2009 (for example, a property of type "date" having a property value of "Mar. 27, 2009") may be stored in the database as an event object with associated currency and date properties as defined within the ontology.

Data objects defined in an ontology may support property multiplicity. In particular, a data item may be allowed to have more than one property of the same property type. For example, a "Person" data object may have multiple "Address" properties or multiple "Name" properties or multiple "Account" properties.

A link represents a connection between two data items and may be through any of a relationship, an event, and/or matching properties. A link may be asymmetrical or symmetrical. For example, "Person" data item A may be connected to "Person" data item B by a "Child Of" relationship (where "Person" data item B has an asymmetric "Parent Of" relationship to "Person" data item A), a "Kin Of" symmetric relationship to "Person" data item C, and an asymmetric "Member Of" relationship to "Organization" data item X. As an another example, "Person" or "Trader" data item A may be connected to a "Person" or "Trader" data item B by a "Counterparty" relationship (as a result of Person A and Person B having been counterparties to a trade). The type of relationship between two data items may vary depending on the types of the data items. For example, "Person" data item A may have an "Appears In" relationship with "Document" data item Y or have a "Participate In" relationship with "Event" data item E. As an example of an event connection, two "Person" data items may be connected by an "Airline Flight" data item representing a particular airline flight if they traveled together on that flight, or by a "Meeting" data item representing a particular meeting if they both attended that meeting. In one embodiment, when two data items are connected by an event, they are also connected by relationships, in which each data item has a specific relationship to the event, such as, for example, an "Appears In" relationship.

As an example of a matching properties connection, two "Person" data items representing a brother and a sister may both have an "Address" property that indicates where they live. If the brother and the sister live in the same home, then their "Address" properties likely contain similar, if not identical property values. In one embodiment, a link between two data item may be established based on similar or matching properties (for example, property types and/or property values) of the data item. These are just some examples of the types of connections that may be represented by a link and other types of connections may be represented; embodiments are not limited to any particular types of connections between data items. For example, a document may contain references to two different items. For example, a document may contain a reference to a payment (one data item), and a person (a second data item). A link between these two data items may represent a connection between these two items through their co-occurrence within the same document.

Each data item may have multiple links with another data item to form a link set. For example, two "Person" data items representing a husband and a wife may be linked through a "Spouse Of" relationship, a matching "Address" property, and/or one or more matching "Event" properties (for example, a wedding). Each link, as represented by data in a database, may have a link type defined by the database ontology used by the database.

In various embodiments, the data analysis system may access various data items and associated properties from various databases and data sources. Such databases and data sources may include a variety of information and data, such as, for example, personal information (for example, names, addresses, phone numbers, personal identifiers, and the like), financial information (for example, financial account information, transaction information, balance information, and the like), tax-related information (for example, tax return data, and the like), computer network-related data (for example, network traffic information, IP (Internet Protocol) addresses, user account information, domain information, network connection information, and the like), and/or computer-related activity data (for example, computer events, user actions, and the like), among others.

Description of the Figures

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure described above and/or below may include several novel features, no single one of which is solely responsible for its desirable attributes or which is essential to practicing the embodiments of the disclosure herein described.

I. Example Data Analysis System

Figure 1:
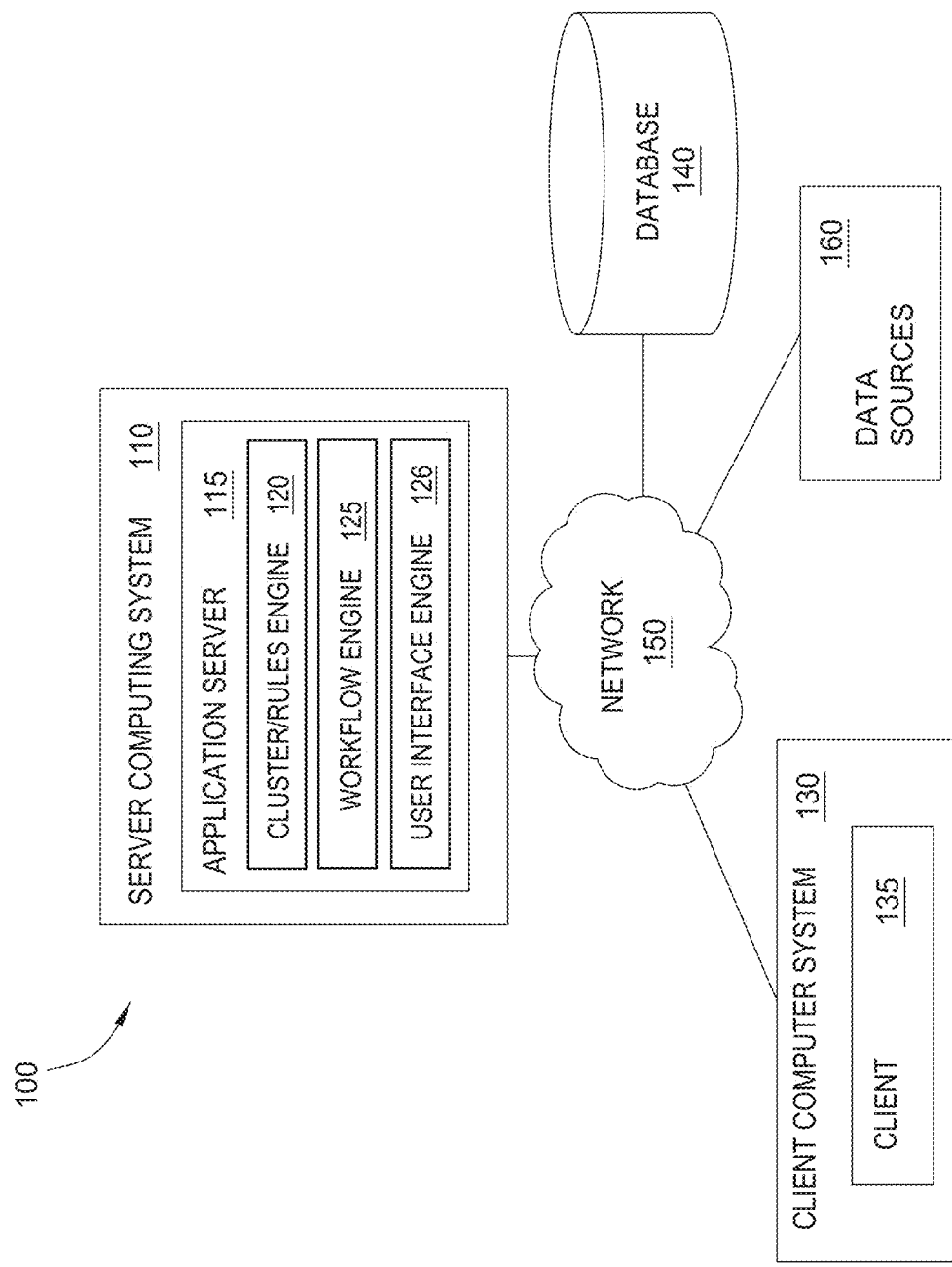
FIG. 1 is a block diagram illustrating an example data analysis system, according to an embodiment of the present disclosure.

FIG. 1 is a block diagram illustrating an example data analysis system 100, according to one embodiment. As shown in the embodiment of FIG. 1, the data analysis system 100 includes an application server 115 running on a server computing system 110, a client 135 running on a client computer system 130, and at least one database 140. Further, the client 135, application server 115, and database 140 may communicate over a network 150, for example, to access data sources 160.

The application server 115 may include a cluster engine (also referred to as a "rules engine") 120, a workflow engine 125, and a user interface engine 126. The cluster engine 120, a workflow engine 125, and user interface engine 126 may be software modules as described below in reference to FIG. 8. According to an embodiment, the cluster/rules engine 120 is configured to build one or more clusters of related data items according to a defined cluster generation strategy (including generating seeds according to seed generation strategies/rules), score clusters according to a scoring strategy, and/or analyze clusters including generating human-readable conclusions according to analysis rules/criteria. The cluster/rules engine 120 may read data from a variety of data sources 160 to generate seeds, generate clusters from seeds, score clusters, and analyze clusters. Once created, the resulting clusters may be stored on the server computing system 110 and/or on the database 140. The operations of the cluster/rules engine 120 are discussed in detail below.

As mentioned, in an embodiment, the cluster/rules engine 120 is configured to score the clusters, according to a defined scoring strategy. The score may indicate the importance of analyzing the cluster. For instance, in the context of detecting credit card fraud, the cluster/rules engine 120 may execute a scoring strategy that aggregates the account balances of credit card accounts within the cluster. Because, for example, a large aggregated total balance may indicate a large liability for a financial institution, a cluster with such a large total balance may be considered to have a higher score relative to other clusters with lower aggregated total balances (and, therefore, lower scores). Thus, a cluster with a higher score relative to a cluster with a lower score may be considered more important to analyze. An alternative example, in the context of detecting risky trading behavior, may involve cluster/rules engine 120 executing a scoring strategy that may take into consideration all the scores and/or flags from indicators and scenarios, where each indicator or scenario is a strategy or rule executed by the system for the purpose of detecting a specific risky trading behavior. Thus, the scoring strategy may aggregate the results from all the indicators and scenarios in order to determine the overall riskiness of a trader. A trader that is engaging in various types of risky activity, engaging in risky activity on a more frequent basis, or handling larger amounts of money in their trading accounts may trigger more indicators or scenarios. That trader may be considered to have a higher score relative to other traders engaging with less risky activity (and, therefore, lower scores) and may be prioritized for analysis by the analyst.

As described below, in an embodiment the cluster/rules engine 120 is configured to apply one or more analysis rules or criteria to the generated cluster to generate one or more human-readable conclusions (as mentioned above, also referred to herein as "summaries"). In various embodiments the one or more analysis rules/criteria may be based on one or more scoring strategies. Also, in various embodiments the scoring strategies may be based on one or more analysis rules/criteria. As described below, the cluster/rules engine 120 may generate an "alert score" for a given cluster. The alert score may be the same as, similar to, and/or based on any of the cluster scores, metascores, and/or conclusions described herein. In an embodiment, the alert score may be a metascore, and may be one of multiple values corresponding to, for example, a high alert, a medium alert, or a low alert. The alert score is described in further detail below.

In an embodiment, the user interface engine 126 generates various user interfaces of the data analysis system as described below. In one embodiment, the cluster engine 120, in conjunction with the user interface engine 126, organizes and presents the clusters and/or groups of clusters according to the assigned scores. The cluster engine 120 and the user interface engine 126 may present information associated with the clusters and/or interactive representations of the clusters within a user interface presented to the analyst, as described below. For example, the representations may provide visual indications (e.g., graphs or other visualizations) of the related data items within the clusters and/or groups of clusters. The cluster engine 120 and/or the user interface engine 126 may be configured and/or designed to generate user interface data useable for rendering the interactive user interfaces described herein, such as a web application and/or a dynamic web page displayed within the client 135. In various embodiments the user interface data may be transmitted to the client 135, and/or any other computing device, such that the example user interfaces are displayed to the analyst (and/or other users of the system). The cluster engine 120 and/or the user interface engine 126 may also allow an analyst to create tasks associated with the clusters. Example operations of the cluster engine 120 and/or the user interface engine 126 are discussed in detail below in conjunction with various figures. In one embodiment, the cluster engine 120 generates clusters automatically, for example, for subsequent review by analysts.

Analysts may also assign tasks to themselves or one another via a workflow user interface generated by the workflow engine 125 and/or the user interface engine 126, for example. The workflow engine 125 and/or the user interface engine 126 may consume scores generated by the cluster engine 120. For example, the workflow engine 125 and/or the user interface engine 126 may present an analyst with clusters generated, scored, and ordered by the cluster engine 120.

The client 135 may represent one or more software applications or modules configured to present data and translate input, from the analyst, into requests for data analyses by the application server 115. In one embodiment, the client 135 and the application server 115 may be embodied in the same software module and/or may be included in the same computing system. However, several clients 135 may execute on the client computer 130, and/or several clients 135 on several client computers 130 may interact with the application server 115. In one embodiment, the client 135 may be a browser (and/or other software program) accessing a web service and configured to render the user interfaces based on the user interface data.

While the client 135 and application server 115 are shown running on distinct computing systems, the client 135 and application server 115 may run on the same computing system. Further, the cluster engine 120 and the workflow engine 125 may run on separate applications servers 115, on separate server computing systems, or some combination thereof. Additionally, a history service may store the results generated by an analyst relative to a given cluster.

In one embodiment, the data sources 160 provide data available to the cluster engine to create or generate seeds and/or to create or generate clusters from a seed or a set of seeds. Such data sources may include relational data sources, web services data, XML data, and the like. Further, such data sources may include a variety of information and data, for example, personal information, financial information, tax-related information, computer network-related data, and/or computer-related activity data, among others. For example, the data sources may be related to trader account records stored by a financial institution. In such a case, the data sources may include a trading account data, trade book data, trade-related data, financial asset data, financial transaction data, PNL data, badge activity data, and/or compensation data. The data may include data attributes such as trader names, trader identifiers, trader account numbers, trading account balances or performance, trading account PNL statements, trades, transaction amounts, trade performance, asset characteristics, asset price or performance, asset market volume or volatility, counterparty names, counterparty identifiers, daily badge-in and badge-out activity, and the like. Of course, data sources 160 is included to be representative of a variety of data available to the server computer system 110 over network 150, as well as locally available data sources.

The database 140 may be a Relational Database Management System (RDBMS) that stores the data as rows in relational tables. The term "database," as used herein, may refer to an database (e.g., RDBMS or SQL database), or may refer to any other data structure, such as, for example a comma separated values (CSV), extensible markup language (XML), text (TXT) file, flat file, spreadsheet file, and/or any other widely used or proprietary format. While the database 140 is shown as a distinct computing system, the database 140 may operate on the same server computing system 110 as the application server 115.

II. Example Cluster Generation

Figure 2:
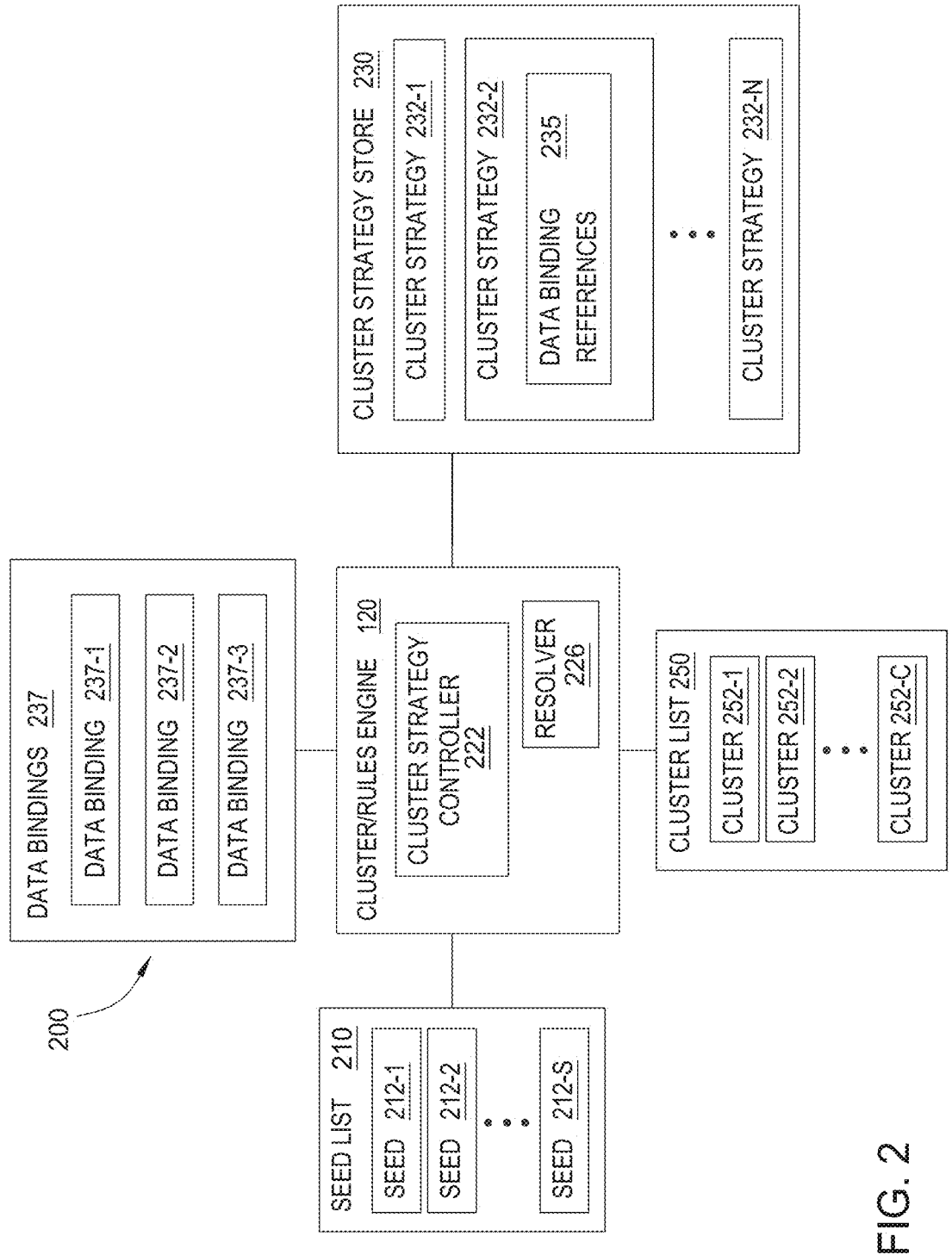
FIG. 2 is a block diagram illustrating an example generation of clusters by the data analysis system, according to an embodiment of the present disclosure.

FIG. 2 is a block diagram illustrating an example generation of clusters by data analysis system 200, according to an embodiment. As shown, in an embodiment the cluster engine 120 (FIG. 1) interacts with a seed list 210, a cluster list 250, a cluster strategy store 230, and data bindings 237. The seed list 210 may include seeds 212-1, 212-2 . . . 212-S, and the cluster list 250 may include clusters 252-1, 252-2 . . . 252-C. The cluster engine 120 may be configured as a software application, module, or thread that generates the clusters 252-1, 252-2 . . . 252-C from the seeds 212-1, 212-2 . . . 212-S.

Seeds 212 (including one, some, or all of seeds 212-1 through 212-S) may be generated by the cluster engine 120 according to various seed generation strategies/rules. Examples of seed generation are described below in reference to various example applications of the data analysis system. According to an embodiment, once generated, seeds 212 may be the starting point for generating a cluster 252. To generate a cluster, the cluster engine 120 may retrieve a given seed 212 from the seed list 210. The seed 212 may be a data item or group of data items within the database 140, such as a trader name, a trader identifier number, a trading account number, and/or a trade identifier.

The cluster engine 120 may generate the cluster 252 from the seed 212. In one embodiment, the cluster engine 120 generates the cluster 252 as a collection of data items and the relationships between the various data items. As noted above, the cluster strategy may execute data bindings in order to add each additional layer of data items to the cluster. For example, the cluster engine 120 may generate the cluster 252-1 from a seed trader or trading account. The cluster engine 120 may first add the trader to the cluster 252-1. The cluster engine 120 may then add trading accounts related to the trader to the cluster 252-1. The cluster engine 120 may complete the cluster 252-1 by adding trades related to, or performed within, those trading accounts. As the cluster engine 120 generates the cluster 252-1, the cluster engine 120 may store the cluster 252-1 within the cluster list 250. The cluster 252-1 may be stored as a graph data structure or other appropriate data structure.

The cluster list 250 may be a collection of tables in the database 140. In such a case, there may be a table for the data items of each cluster 252, such as those of example cluster 252-1 discussed above, a table for the relationships between the various data items, a table for the attributes of the data items, and a table for scores of the clusters. The cluster list 250 may include clusters 252 from multiple investigations. Note that the cluster engine 120 may store portions of clusters 252 in the cluster list 250 as the cluster engine 120 generates the clusters 252. Persons skilled in the art will recognize that many technically feasible techniques exist for creating and storing data structures that may be used to implement the systems and methods of the data analysis system.

The cluster strategy store 230 may include cluster strategies 232-1, 232-2 . . . 232-N. Each cluster strategy may include data binding references 235 to one or more data bindings 237. As noted, each data binding may be used to identify data that may grow a cluster (as determined by the given search strategy 232). For example, the cluster engine 120 may execute a cluster strategy 232-1 to generate the cluster 252-1. Specifically, the cluster engine 120 may execute the cluster strategy 232-1 in response to selection of that cluster strategy by an analyst. The analyst may submit a selection of one or more cluster strategies to perform on a seed or group of seeds to the cluster engine 120 through the client 135. Alternatively, the cluster engine 120 may automatically select one or more cluster strategies, such as based on user preferences or rules.

According to an embodiment, each cluster strategy 232 is configured so as to perform an investigation processes for generating a cluster 252. Again, for example, the cluster strategy 232-2 may include data binding references 235 to a collection of data bindings executed to add layer after layer of data to a cluster. The investigation process may include searches to retrieve data items related to a seed 212 that is selected for clustering using cluster strategy 232-2. For example, the cluster strategy 232-2 may start with a possibly risky trader as the seed 212-2. The cluster strategy 232-2 may search for trading accounts related to the trader, trades related to those accounts, and counterparties in those trades. A different cluster strategy 232-3 may search for trades related to the trader or the trader's trading accounts, and the building security badge activity or status for the trader at the time of those trades. Yet another cluster strategy 232-4 may search for trades related to the trader or the trader's trading accounts, the underlying assets involved in each of those trades, and the historical performance of those underlying assets. Another cluster strategy 232-5 may search for the trader's trading accounts, and then changes in the PNL statements or performance of those accounts over time.

In an embodiment, cluster strategies 232 include references to at least one data binding 237 (such as data bindings 237-1 through 237-3). The cluster engine 120 may execute a search protocol specified by the data binding 237 to retrieve data, and the data returned by a given data binding may form a layer within the cluster 252. For instance, the data binding 237 (and/or the search protocol of the data binding 237) may retrieve sets of customers related to an account by an account owner attribute. The data binding 237 (and/or the search protocol of the data binding 237) may retrieve the set of related data items from a data source. For instance, the data binding 237-1 may specify a database query to perform against a database. Likewise, the data binding 237-2 may define a connection and/or query to a remote relational database system and the data binding 237-3 may define a connection and/or query against a third-party web service. Once retrieved, the cluster strategy 232 may evaluate whether the returned data should be added to a cluster being grown from a given seed 212.

Multiple cluster strategies 232 may reference a given data binding 237. The analyst may update the data binding 237, but typically updates the data binding 237 only if the associated data source changes. A cluster strategy 232 may also include a given data binding 237 multiple times. For example, executing a data binding 237 using one seed 212 may generate additional seeds for that data binding 237 (and/or generate seeds for another data binding 237). More generally, different cluster strategies 232-1, 232-2 . . . 232-N may include different arrangements of various data bindings 237 to generate different types of clusters 252.

The cluster strategies 232 may specify that the cluster engine 120 use an attribute from the related data items retrieved with one data binding 237, as input to a subsequent data binding 237. The cluster engine 120 may use the subsequent data binding 237 to retrieve a subsequent layer of related date items for the cluster 252. For instance, a particular cluster strategy 232 may specify that the cluster engine 120 retrieve a set of trader data items with a first data binding 237-1. That cluster strategy 232 may also specify that the cluster engine 120 then use the trader identifier number attribute from trader data items as input to a subsequent data binding 237-2. The cluster strategy 232 may also specify filters for the cluster engine 120 to apply to the attributes before performing the subsequent data binding 237. For instance, if the first data binding 237-1 were to retrieve a set of trader data items that included both equity and derivatives traders, then the cluster engine 120 could filter out the equity traders before performing the subsequent data binding 237-2.

In operation, according to an embodiment, the cluster engine 120 generates a cluster 252-1 from a seed 212-1 by first retrieving a cluster strategy 232. Assuming the analyst selected a cluster strategy 232-2, the cluster engine 120 would retrieve the cluster strategy 232-2 from the cluster strategy store 230. The cluster engine 120 may then retrieve the seed 212-1 as input to the cluster strategy 232-2. The cluster engine 120 may execute the cluster strategy 232-2 by retrieving sets of data by executing data bindings 237 referenced by the cluster strategy 232-2. For example, the cluster strategy 232-2 may execute data bindings 237-1, 237-2, and 237-3. Accordingly, the cluster engine 120 may evaluate data returned by each data binding 237 to determine whether to use that data to grow the cluster 252-1. The cluster engine 120 may then use elements of the returned data as input to the next data binding 237. Of course, a variety of execution paths are possible for the data bindings 237. For example, assume one data binding 237 returned a set of trades. In such a case, another data binding 237 may evaluate each trade individually. As another example, one data binding 237 may use input parameters obtained by executing multiple, other data bindings 237. More generally, the cluster engine 120 may retrieve data for each data binding referenced by the cluster strategy 232-2. The cluster engine 120 may then store the complete cluster 252-1 in the cluster list 250.

As the cluster engine 120 generates the clusters 252-1, 252-2 . . . 252-C from seeds 212-1, 212-2 . . . 212-S, the cluster list 250 may include overlapping clusters 252. For example, two clusters 252-1 and 252-C may overlap if both clusters 252-1 and 252-C include a common data item. In an example, a larger cluster 252 formed by merging two smaller clusters 252-1 and 252-C may be a better investigation starting point than the smaller clusters 252-1 and 252-C individually. The larger cluster 252 may provide additional insight or relationships, which may not be available if the two clusters 252-1 and 252-C remain separate.

In an embodiment, the cluster engine 120 includes a resolver 226 that is configured to detect and merge two or more overlapping clusters 252 together. For example, the resolver 226 may compare the data items within a cluster 252-1 to the data items within each one of the other clusters 252-2 through 252-C. If the resolver 226 finds the same data item within the cluster 252-1 and a second cluster 252-C, then the resolver 226 may merge the two clusters 252-1 and 252-C into a single larger cluster 252. For example, the cluster 252-1 and cluster 252-C may both include the same trade, along with that trade's trade-related data. The resolver 226 may compare the data items of cluster 252-1 to the data items of cluster 252-C and detect the same trade in both clusters 252. Upon detecting the same trade in both clusters 252, the resolver 226 may merge the cluster 252-1 with cluster 252-C. As an alternative example, the clusters may be merged by resolver 226 if it detects the same trading account in each cluster. The resolver 226 may test each pair of clusters 252 to identify overlapping clusters 252. Although the larger clusters 252 may be better investigation starting points, an analyst may want to understand how the resolver 226 formed the larger clusters 252. Accordingly, the resolver 226, may store a history of each merge.

In various embodiments, clusters may be merged based on various criteria and/or combinations of criteria include, for example, when the clusters include a minimum number of data items that are common among the clusters, when the clusters include a minimum number of data items that are common among the clusters and which data items are within a particular proximity in each cluster to a seed of the cluster, when a particular quantity of properties are common among data items of the clusters even when the data items themselves are not identical, and/or the like.

In an embodiment, cluster merging (for example, by resolver 226) may be optionally disabled for particular types of data items, and/or particular data items. For example, when a particular data item, or type of data item, is so common that it may be included in many different clusters (for example, a counterparty item such as a bank), merging of cluster based on that common item (for example, the particular bank) or common type of item (for example, banks in general) may be disabled. In another embodiment, cluster may be merged only when they share two or more common data items and/or other properties. In an embodiment, when two clusters are determined to share a data item that this very common (such that they cluster may not be merged based on that item) the system may automatically determine whether the two clusters share one or more other data items and/or properties such that they may be merged. In various embodiments, cluster merging may be disabled based on other criteria. For example, cluster merging between two related clusters may be disabled when one or both of the two clusters reach a particular size (for example, include a particular number of data items).

After the cluster engine generates a group of clusters from a given collection of seeds (and after merging or resolving the cluster), the cluster engine 120 may score, rank, and/or otherwise order the clusters relative to a scoring strategy 442. In some embodiments, clusters are scored and provided to the analysis without resolving.

In one embodiment, the analysis system 100, and more specifically, the cluster engine 120, receives a request for cluster generation. In response to the request, a list of seeds may be generated, clusters may be generated based on those seeds, and the clusters may be ranked, ordered, and presented to analysts. In an embodiment, the cluster engine 120 may consume seeds generated by other systems. Alternatively, in other embodiments, cluster engine 120 may generate the seeds 212-1, 212-2 . . . 212-S. For instance, the cluster engine 120 may include a seed generation strategy (also referred to as a "lead generation strategy") that identifies data items, or groups of data items, as potential seeds 212. The seed generation (and/or lead generation) strategy may apply to a particular business type, such as credit cards, stock trading, or insurance claims, and may be run against a cluster data source 160 or an external source of information.

In an embodiment, the analysis system 100 may not include data bindings as described above. Rather, according to an embodiment, the analysis system 100 may include one or more interfaces and/or connections to various internal and/or external data stores of data items and/or other information (for example, data sources(s) 160. According to an embodiment, the system may include a generic interface and/or connection to various internal and/or external data stores of data items and/or other information. For example, the analysis system 100 may include a generic data interface through which the system may search, access, and/or filter various data item information during seed generation, cluster generation, and/or analysis of the clusters. The generic interface may include various aspects that enable searching, accessing, and/or filtering of data. For example, the generic interface may access various data sources that each have differing data formats. The generic interface may accordingly covert and/or filter the accessed data to a common format. Alternatively, the data sources may include functionality through which stored data may be searched and/or converted to a standard format automatically. In an embodiment, the generic interface may enable Federated search of multiple data stores of data item-related information. Accordingly, in various embodiments, the analysis system 100 may access various data sources for data item clustering and seed generation.

Additional details of the server computing system 110, the data sources 160, and other components of the data analysis system are described below in reference to FIG. 8.

Figure 3A:
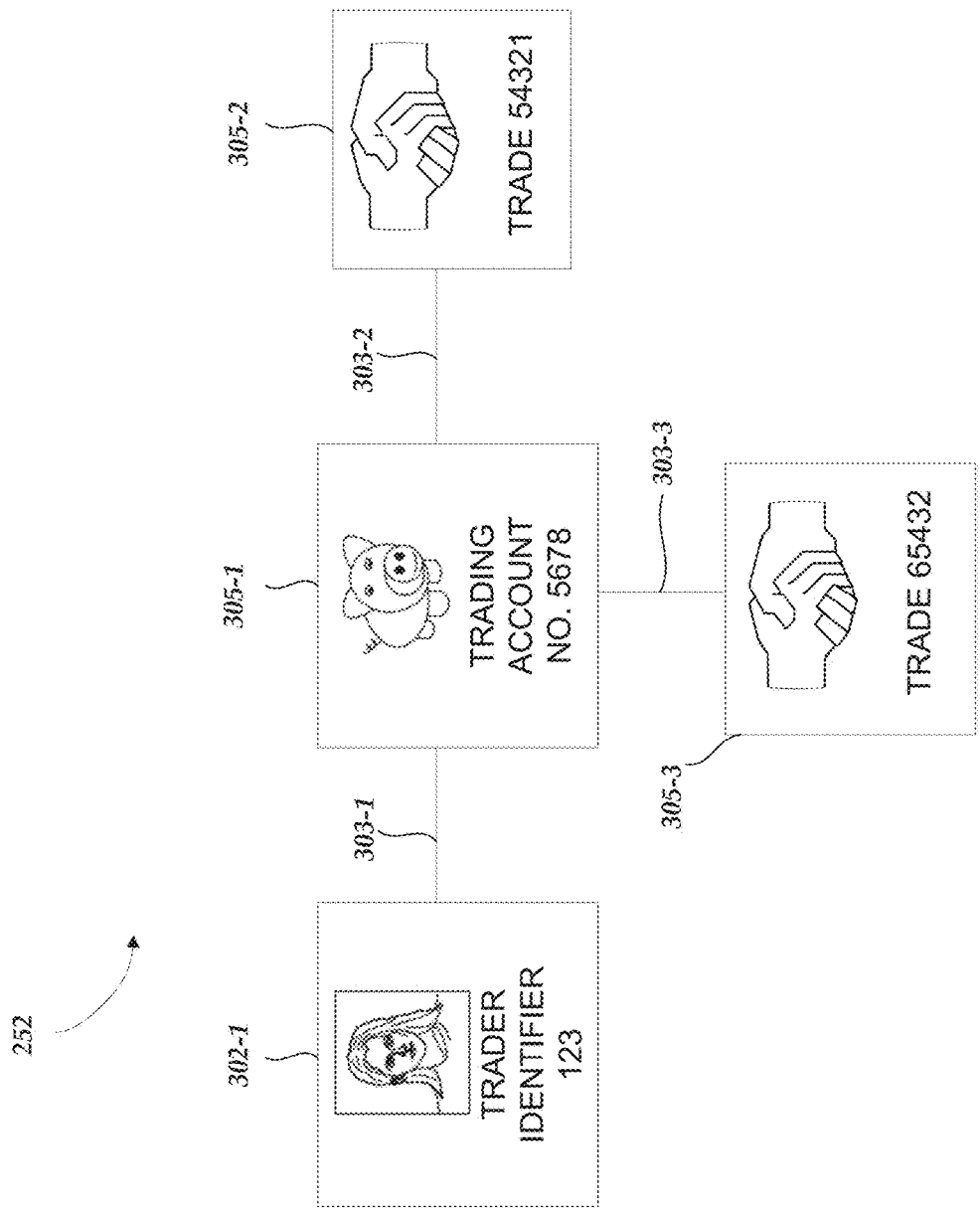
FIGS. 3A-3C illustrate an example growth of a cluster of related data items, according to an embodiment of the present disclosure.
Figure 3B:
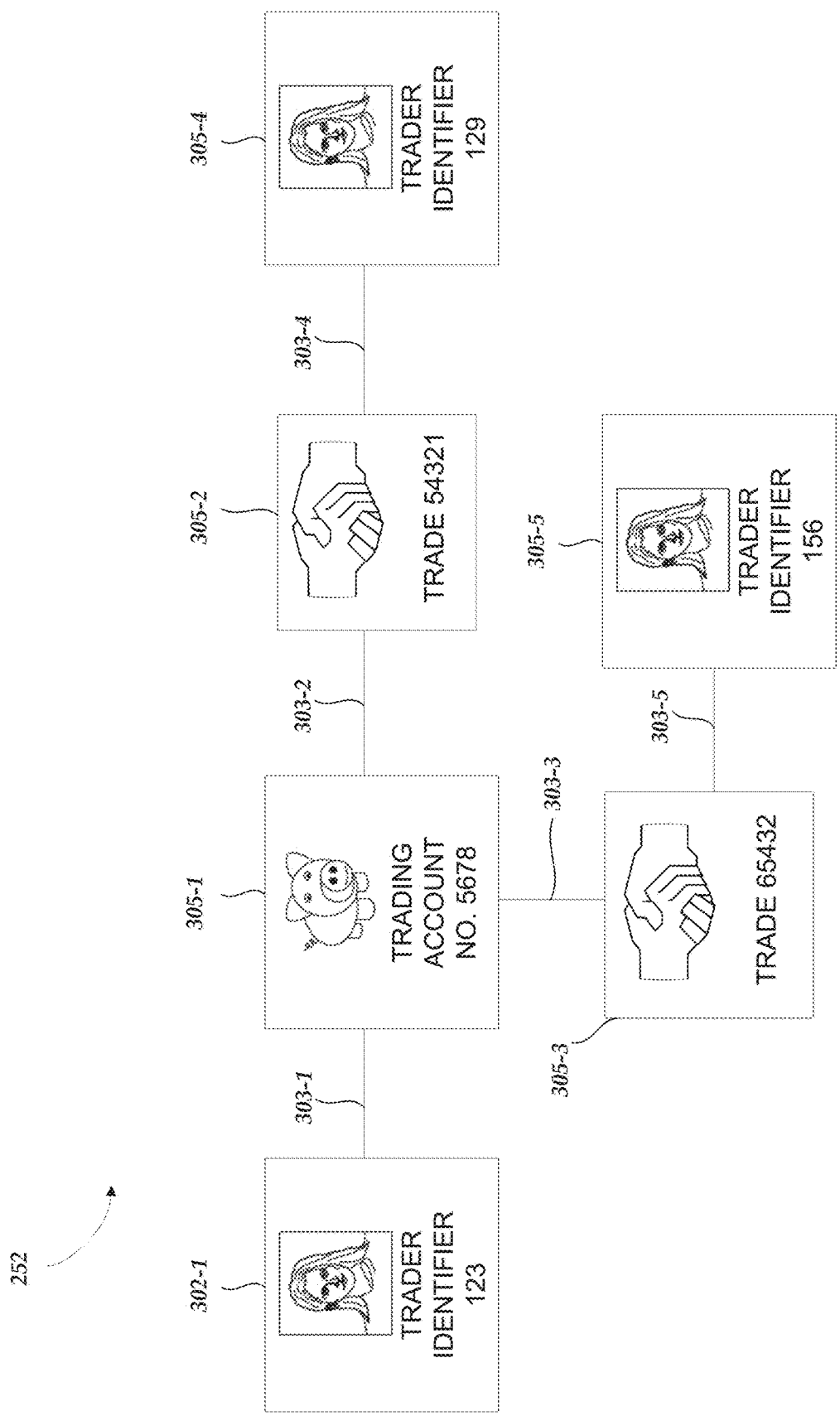
Figure 3C:
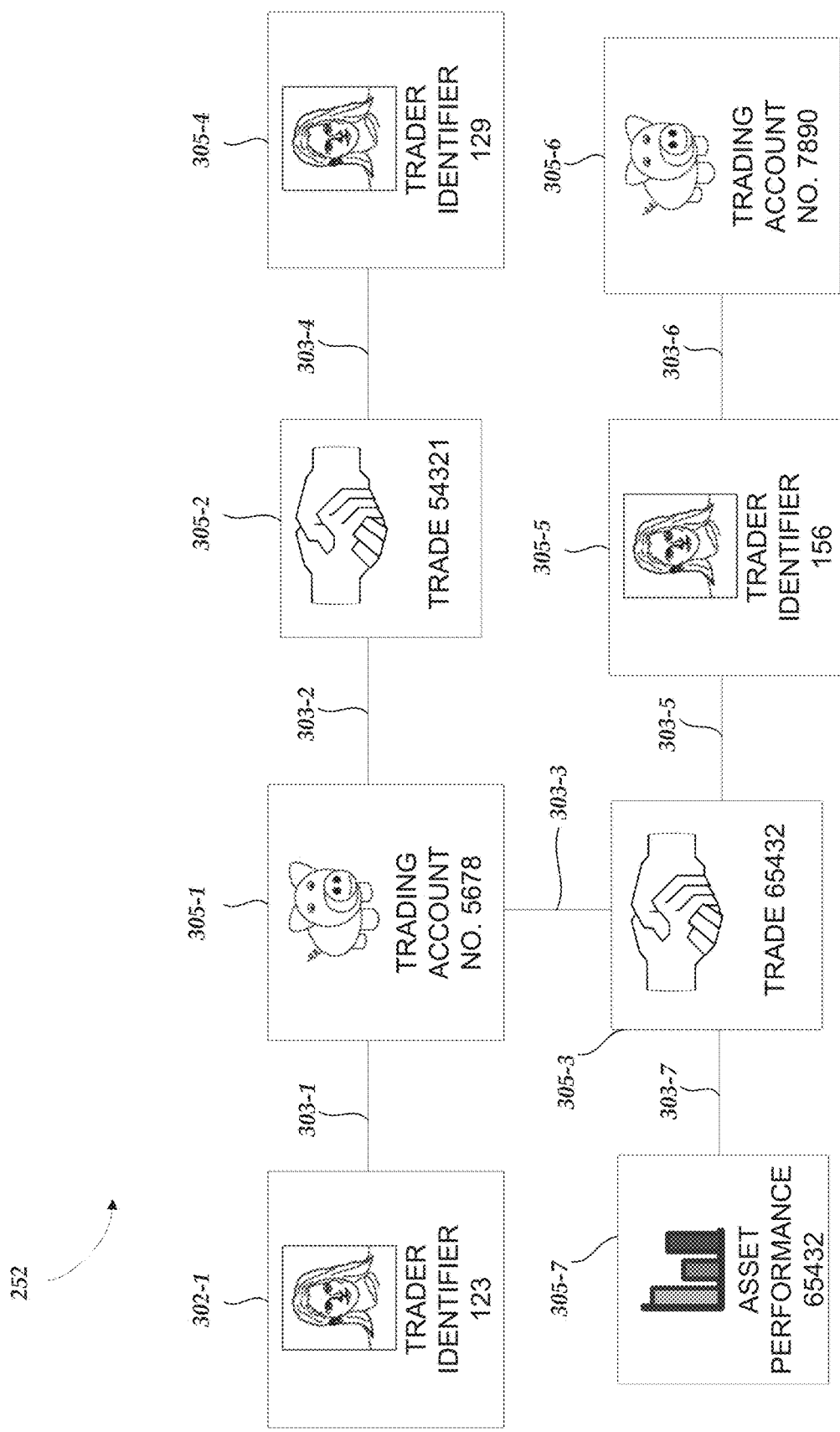

FIGS. 3A-3C illustrate an example growth of a cluster 252 of related data items, according to an embodiment. As shown in FIG. 3A, an example cluster 252 may include a seed item 302; links 303-1, 303-2 and 303-3; and related data items 305-1, 305-2, and 305-3. The cluster 252 may be based upon a seed 212 (for example, data item 302). The cluster engine 120 may build the cluster 252 by executing a cluster strategy 232 with the following searches:
Find trading accounts or trading books associated with the seed
Find all trades or positions associated with the seed
Find all counterparties involved in the trades with the seed
Find all trade-related data associated with the trades
Find all badge activity data for the seed that overlaps with the times of the trades
Find all performance-related data associated with the seed In the example, assuming the seed 212 is a risky trader, the cluster engine 120 would add the trader to the cluster 252 as the seed item 302. The cluster engine 120 may then use the trader name or trader identifier attribute of the trader data item as input to a data binding 237. The cluster engine 120 may execute the search protocol of the data binding 237 to retrieve the trading account with the same trader identifier, or associated with the same trader name, as in the trader data item. The cluster engine 120 would then add the customer data to the cluster 252 as the related data item 305-1. The cluster engine 120 would also add the trading account owner attribute as the link 303-1 that relates the trading account number to the trader identifier data of the trader. The cluster engine 120 would execute the next search of the cluster strategy 232 by inputting the trading account number attribute of the trading account data into a data binding 237 to retrieve associated trade data. The cluster engine 120 would then add the trade data as the related data item 305-2 and 305-3, and the trading account number attribute as the links 303-2 and 303-3 between the trading account data and the trade data. At this point in the investigation process, the cluster 252 would include the seed item 302; three links 303-1, 303-2, and 303-3; and three related data items 305-1, 305-2, and 305-3. That is, the cluster 252 would include the trader, the trading account of the trader, and the trades conducted by that trader in the trading account. By carrying the investigation process further, the cluster engine 120 may reveal further related information, for example, additional persons, accounts, and/or potentially risky activity.

Turning to FIG. 3B, and continuing the example, the cluster engine 120 may continue executing the cluster strategy 232 by searching for additional account data items related to the trades conducted by the trader in the trading account. As discussed, a trade may be stored as related data item 305-2. A trade is also seen stored as related data item 305-3. The cluster engine 120 would input the trade number attribute of both trades for 305-2 and 305-3 to a data binding 237. The cluster engine 120 would execute the search protocol of data binding 237 to retrieve the data of two trade counterparties, which the cluster engine 120 would store as related data items 305-4 and 305-5. The cluster engine 120 would add counterparty or trader identifier attributes as the links 303-4 and 304-5 between the counterparties and their associated trades.

Continuing the example, FIG. 3C shows the cluster 252 after the cluster engine 120 performs the last step of the example cluster strategy 232. For example, the cluster engine 120 would use the counterparty or trader identifier attribute of the related data items 305-4 and 305-5 to retrieve and add additional account data items, such as the related data item 305-6. The cluster engine 120 would couple the related data item 305-6 to the related counterparty item 305-5 and with the trading account number attributes stored as link 303-6. Additionally, cluster engine 120 could use the assets name attributes of the trade item 305-3 to retrieve and add additional data items to the cluster, such as asset performance data 305-7. The cluster engine 120 would then couple the related data item 305-7 to the trade item 305-3 with the asset names stored as link 303-7. Thus, the cluster 252 would include seven related data items 305 related by seven links 303, in addition to the seed item 302.

In an embodiment, the analyst may identify and determine whether the additional data items, stored as related data items 305-6 and 305-7, assist the analyst in uncovering risky trading activity more efficiently than if the analyst started an investigation with only the seed 302. As the foregoing example illustrates, according to various embodiments, the data analysis system may enable an analyst to advantageously start an investigation with a cluster including many related data items (such as the example cluster 252 with the seed item 302 and related data items 305) rather than a single data item.

In various embodiments, clusters may be generated automatically, on a schedule, on demand, and/or as needed, as described below.

III. Example Cluster Scoring/Ranking

Figure 4:
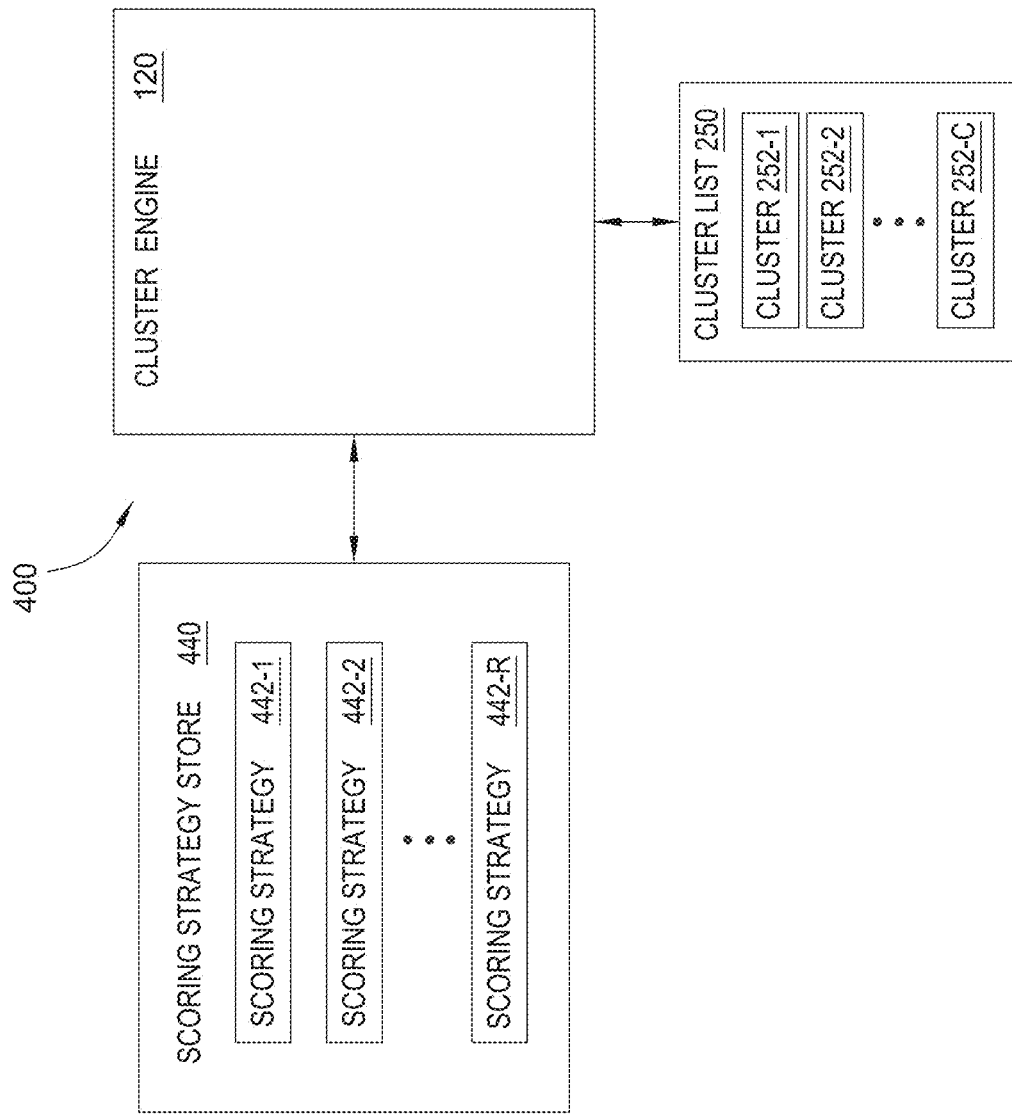
FIG. 4 illustrates an example ranking of clusters by the data analysis system, according to an embodiment of the present disclosure.

FIG. 4 illustrates an example ranking of clusters 252 by the data analysis system 100 shown in FIG. 1, according to an embodiment of the present disclosure. As shown, an example system 400 of FIG. 4 illustrates some of the same elements as shown in FIG. 1 and FIG. 2, including the cluster engine 120 in communication with the cluster list 250. In addition, FIG. 4 illustrates a scoring strategy store 440 in communication with the cluster engine 120. The scoring strategy store 440 includes scoring strategies 442-1, 442-2 . . . 442-R.

In an embodiment, the cluster engine 120 executes a scoring strategy 442 to score a cluster 252. For example, the cluster engine 120 may generate a cluster (for example, via a cluster strategy/data bindings) and attempt to resolve it with existing clusters. Thereafter, the cluster engine 120 may score the resulting cluster with any scoring strategies associated with a given cluster generation strategy. In an embodiment, the multiple scores may be generated for a given cluster. The multiple scores may be based on various aspects, metrics, or data associated with the cluster. In one embodiment, a cluster metascore may be generated based on a combination or aggregation of scores associated with a given cluster. Ordering for a group of clusters, (according to a given scoring strategy) may be performed on demand when requested by a client. Alternatively, the analyst may select a scoring strategy 442 through the client 135 and/or the analyst may include the selection within a script or configuration file. In another alternative, the data analysis system may automatically select a scoring strategy. In other embodiments, the cluster engine 120 may execute several scoring strategies 442 to determine a combined score for the cluster 252.

In an embodiment, a scoring strategy (such as scoring strategy 442) specifies an approach for scoring a cluster (such as cluster 252). A score may indicate a relative importance or significance of a given cluster. For example, the cluster engine 120 may execute a scoring strategy 442-1 to determine a score by counting the number of a particular data item type that are included within the cluster 252. Assume, for example, a data item corresponds with internal trades with non-zero PNL, which is unexpected for a trade that has occurred internally within a financial institution. In such a case, a cluster with a large number of non-zero PNL internal trades conducted by a single individual (possibly within a short time) might correlate with a higher fraud risk. Of course, a cluster score may be related to a high risk of fraud based on the other data in the cluster, as appropriate for a given case. More generally, each scoring strategy 442 may be tailored based on the data in clusters created by a given cluster strategy 230 and a particular type of risk or fraud (and/or amounts at risk) of interest to an analyst.

According to an embodiment, the cluster engine 120 scores a cluster 252-1 by first retrieving a scoring strategy 442. For example, assume an analyst selects scoring strategy 442-1. In response, the cluster engine 120 may retrieve the scoring strategy 442-1. The cluster engine 120 may also retrieve the cluster 252-1 from the cluster list 250. After determining the score of the cluster 252-1, the cluster engine 120 may store the score with the cluster 252-1 in the cluster list 250.

The cluster engine 120 may score multiple clusters 252-1, 252-2 . . . 252-C in the cluster list 250. The cluster engine 120 may also rank the clusters 252-1, 252-2 . . . 252-C based upon the scores. For instance, the cluster engine 120 may rank the cluster 252-1, 252-2 . . . 252-C from highest score to lowest score. In various embodiment, cluster may be ranked according into multiple scores, combinations of scores, and/or metascores.

As mentioned above, the cluster/rules engine 120 may generate an "alert score" for the clusters. The alert score may be the same as, similar to, and/or based on any of the cluster scores, metascores, and/or conclusions described herein. In an embodiment, the alert score may be a metascore, and may be one of multiple values corresponding to, for example, a high alert, a medium alert, or a low alert. The alert score is described in further detail below.

IV. Example User Interface

Figure 5:
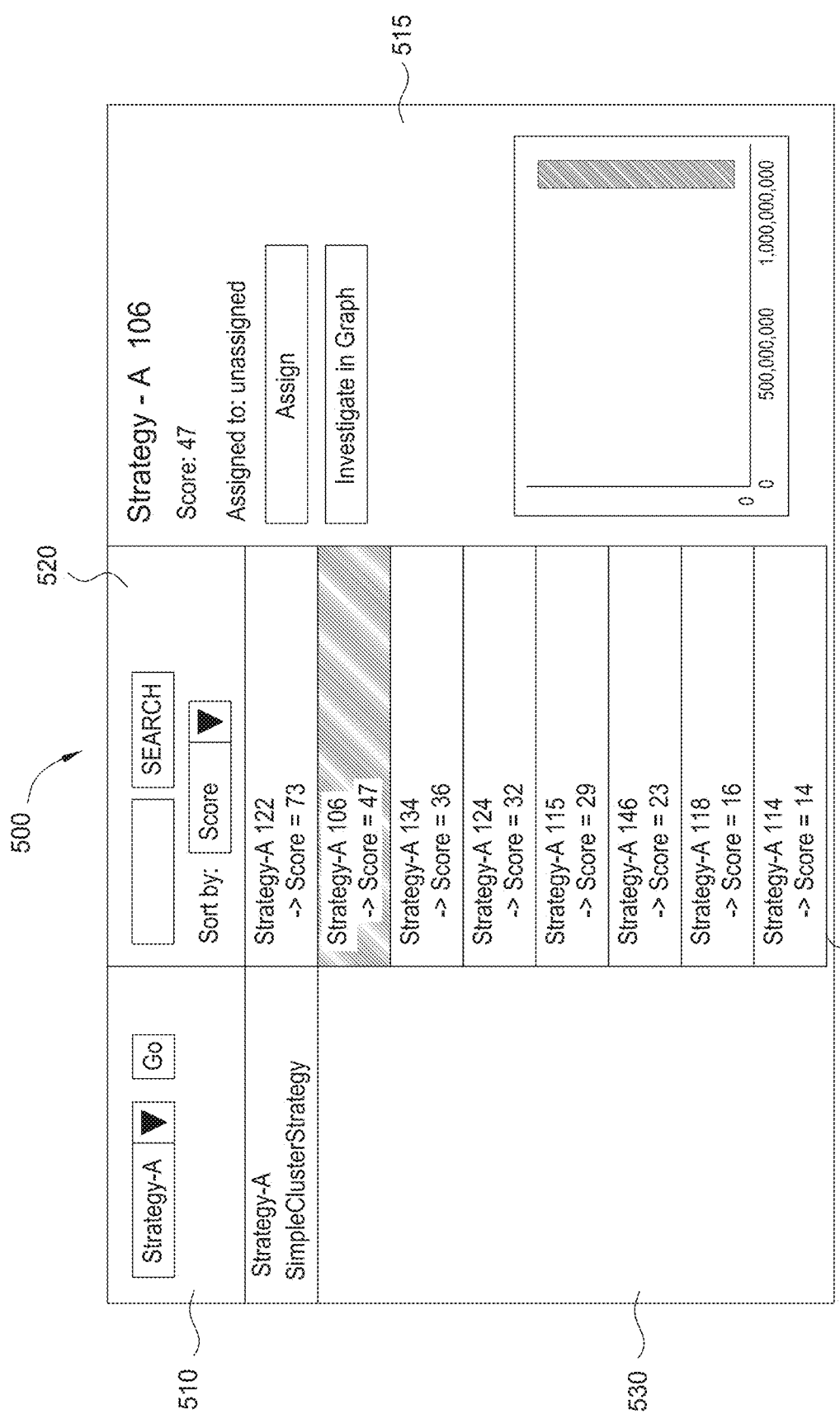
FIG. 5 illustrates an example cluster analysis user interface, according to an embodiment of the present disclosure.

FIG. 5 illustrates an example user interface 500, according to one embodiment. As described above, the cluster engine 120, the workflow engine 125, and/or the user interface engine 126 may be configured to present the user interface 500. As shown, the example user interface 500 includes a selection box 510, a cluster strategy box 530, a cluster summary list 525, a cluster search box 520, and a cluster review window 515. The user interface 500 may be generated as a web application or a dynamic web page displayed within the client 135.

In the example user interface 500 of FIG. 5, the selection box 510 may allow the analyst to select, for example, a seed generation strategy and/or a previously generated seed or seed list (for example, seed list 210). The analyst may select the items (for example, a seed generation strategy) by, for example, entering a name of a particular item into a dropdown box (and/or other interface element) in the selection box 510 (for example, the dropdown box showing a selected strategy "Strategy-A") and selecting a "Go" button (and/or other interface element). Alternatively, the analyst may select a particular item by, for example, expanding the dropdown box and selecting an item from the expanded dropdown box, which may list various seed generation strategies and/or seed lists, for example. In various examples, seed lists and/or seed generation strategies may be selected by the analyst that correspond to a list of traders at a financial institution, suspected risky traders, a list of trading accounts used at a financial institution, suspected risky trading accounts, trades that occurred when the associated trader was not physically present, trading accounts with balances or equity above a particular amount, traders responsible for managing money above a particular amount, and/or any of the other seed generation strategies described below in reference to the various applications of the system.

For example, when the analyst selects a particular seed generation strategy, the system may generate a seed list (for example, seed list 210) and then may generate clusters based on seeds of the seed list. The seed list and/or clusters may, in an embodiment, be generated in response to a selection of a particular seed generation strategy. The seed generation strategy may generate a seed list (for example, seed list 210) and/or clusters (for example, clusters 252-1, 252-2, . . . 252-C of the cluster list 250) from the database 140 and/or an external source of information (for example, a cluster data source 160). Alternatively, when the analyst selects a previously generated seed or seed list (for example, seed list 210), the system may retrieve data related to the selected seed list (for example, the seed items, clusters, and/or related clustered data items) from, for example, database 140 and/or an external source of information (for example, a cluster data source 160). In an embodiment, clusters may be generated in response to a selection of a previously generated seed list (or, alternatively, a previously generated seed). Alternatively, cluster may be been previously generated, and may be retrieved in response to selection of a previously generated seed list (or, alternatively, a previously generated seed). In an embodiment, the analyst may select a particular cluster of interest via the selection box 510.

Further, in the example user interface 500 the cluster strategy box 530 displays the cluster strategies 232 that the cluster engine 120 ran against the seed list 210. The cluster engine 120 may execute multiple cluster strategies 232 against the seed list 210, so there may be multiple cluster strategies 232 listed in the cluster strategy box 530. The analyst may click on the name of a given cluster strategy 232 in the cluster strategy box 530 to review the clusters 252 that the cluster strategy 232 generated.

In an embodiment, the user interface 500 displays information associated with the clusters 252 in the cluster summary list 525. For example, the information associated with the clusters may include characteristics of the clusters 252, such as identifiers, scores, and/or analysts assigned to analyze the clusters 252. The system may select the clusters 252 for display in the cluster summary list 525 according to those or other characteristics. For instance, the system may display the cluster information in the order of the scores of the clusters 252, where a summary of the highest scoring cluster 252 is displayed first.

The system (for example, cluster engine 120, the workflow engine 125, and/or the user interface engine 126) may control the order and selection of the cluster information within the cluster summary list 525 based upon an input from the analyst. The cluster search box 520 may include a search text box coupled to a search button and a pull-down control. The analyst may enter a characteristic of a cluster 252 in the search text box and then instruct the workflow engine 125 to search for and display clusters 252 that include the characteristic by pressing the search button. For example, the analyst may search for clusters with a particular score. The pull-down control may include a list of different characteristics of the clusters 252, such as score, size, assigned analyst, and/or date created. The analyst may select one of the characteristics to instruct the workflow engine 125 to present the information associated with the clusters 252 arranged by that characteristic.

In an embodiment, the system is also configured to present details of a given cluster 252 within the cluster review window 515. The system displays the details of the cluster 252, for example, the score, and/or average account balances within a cluster, when the analyst clicks a mouse pointer on the associated summary within the cluster summary list 525. The system may present details of the cluster 252, such as the name of an analyst assigned to analyze the cluster 252, a score of the cluster 252, and/or statistics or graphs generated from the cluster 252. These details may allow the analyst to determine whether to investigate the cluster 252 further. The cluster review window 515 may also include a button which may be clicked to investigate a cluster 252 within a graph, and an assign button for assigning a cluster to an analyst.

An analyst may click a mouse pointer on an "Investigate in Graph" button representing a cluster to investigate the cluster within an interactive graph. The interactive representation may be a visual graph of the cluster 252, where icons represent the items of the cluster 252 and lines between the icons represent the links between items of the cluster 252. For example, the workflow engine 125 may display the interactive graph of the cluster 252 similar to the representation of the cluster 252 in FIG. 3C. The interactive representation may allow the analyst to review the attributes of the related data items and/or perform queries for additional related data items.

In an embodiment, an administrative user may click a mouse pointer on an assign button to assign the associated cluster 252 to an analyst. The workflow engine 125 may also allow the administrative user to create tasks associated with the clusters 252, while the administrative user assigns the cluster 252. For example, the administrative user may create a task for searching within the three highest scoring clusters 252 for risky trading activity. The system may display the cluster information in the cluster summary list 525 according to the names of the analysts assigned to the clusters 252. Likewise, the system may only display cluster information for the subset of the clusters 252 assigned to an analyst.

The interface shown in FIG. 5 is included to illustrate one example interface useful for navigating and reviewing clusters generated using the cluster engine 120 and the workflow engine 125. In other embodiments, other user interface constructs may be used to allow the analyst to select cluster strategies 232, scoring strategies 242, and/or seed generation strategies, initiate an investigation, and/or review and analyze the clusters 252. For example, the user interface engine 126 may display additional controls within the user interface 500 for controlling the cluster generation process and selecting seed generation strategies, cluster strategies 232, and/or scoring strategies 242. Also, the user interface 500 may be displayed without the selection box 510 or the options to select a seed generation strategy. In addition, although the workflow engine 125 may generate the user interface 500, in various embodiments the user interface 500 may be generated by a software application distinct from the workflow engine 125. Further, in various embodiments, the cluster review window 515 may be configured to display a preview of the cluster 252 and/or additional statistics generated from the cluster 252. As such, an interactive representation of the cluster 252 may be presented in an additional user interface and/or the cluster 252 may be exported to another software application for review by the analyst.

In an alternative embodiment, and as described below in reference to the various figures, various other user interfaces may be generated by the system.

V. Example Operations

Figure 6:
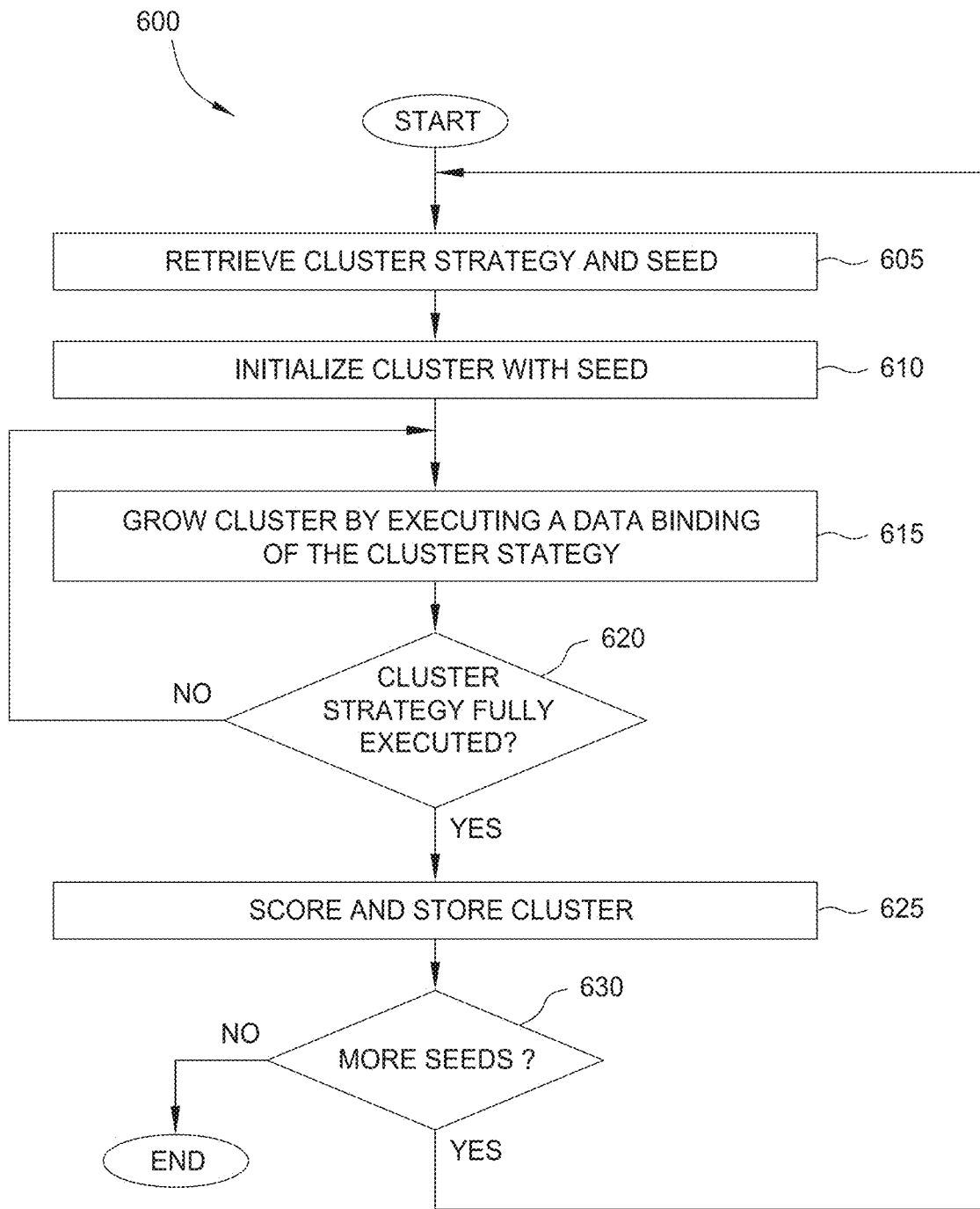
FIG. 6 is a flowchart of an example method of generating clusters, according to an embodiment of the present disclosure.

FIG. 6 is a flowchart of an example method of generating clusters, according to an embodiment. Although the method is described in conjunction with the systems of FIGS. 1 and 2, persons skilled in the art will understand that any system configured to perform the method, in any order, is within the scope of this disclosure. Further, the method 600 may be performed in conjunction with method 700 for scoring a cluster, described below, and the various other methods described below including analyzing a cluster.

As shown, example cluster generation method 600 begins at block 605, where the cluster engine 120 retrieves a cluster strategy (e.g., cluster strategy 232-2) and a seed 212. Once a cluster strategy is selected, the cluster engine 120 may identify a list of seeds from which to build clusters using the selected cluster strategy. At block 610, the cluster engine 120 initializes a cluster 252 with one of the seeds in the list. The cluster 252 may be stored as a graph data structure. The cluster engine 120 may initialize the graph data structure and then add the seed 212-1 to the graph data structure as the first data item.

At block 615, the cluster engine 120 may grow the cluster 252 by executing the search protocol of a data binding 237 from the cluster strategy 232-2. The cluster strategy 232-2 may include a series of data bindings 237 that the cluster engine 120 executes to retrieve related data items. A given data binding 237 may include queries to execute against a cluster data source 160 using the seed as an input parameter. For example, if the seed 212-1 is an account number, then the data binding 237 may retrieve the data identifying the owner of the account with the account number. After retrieving this information, the cluster engine 120 may add the trader data item to the cluster as a related data item and the account owner attribute as the link between the seed 212-1 and the related data item. After retrieving the related data items, the cluster engine 120 may add them to the cluster 252.

At block 620, the cluster engine 120 determines if the cluster strategy 232-2 is fully executed. If not the method 600 returns to block 615 to execute additional data bindings for a given seed. Alternatively, as described above, the cluster engine 120 may grow the cluster by searching for, accessing, and/or filtering various data items through, for example, a generic interface to various internal and/or external data sources. Further, in an embodiment, the cluster engine 120 may determine whether the cluster being generated is to be merged with another cluster, as described above. Once the cluster strategy is executed for that seed, the cluster engine 120 may determine and assign a score (or, alternatively, multiple scores) to that cluster (relative 11a specified scoring strategy). After generating clusters for a group of seeds, such clusters may be ordered or ranked based on the relative scores. Doing so may allow an analyst to rapidly identify and evaluate clusters determined to represent, for example, a high risk of fraud or risky trading activity.

At block 625, the cluster engine 120 may store the cluster 252 in cluster list 250. As mentioned above, the cluster list 250 may be a collection of tables within a relational database, where a table may include the seed and related data items of the cluster 252 and another table may include links between the related data items of the cluster 252.

At block 630, the cluster engine 120 determines if there are more seeds 212 to analyze in the seed list 210. If so, the method 600 returns to block 605 to generate another cluster from the next seed. Otherwise, the method 600 ends. Note, while method 600 describes a single cluster being generated, one of skill in the art will recognize that multiple instances of the cluster generation process illustrated by method 600 may be performed in parallel.

Figure 7:
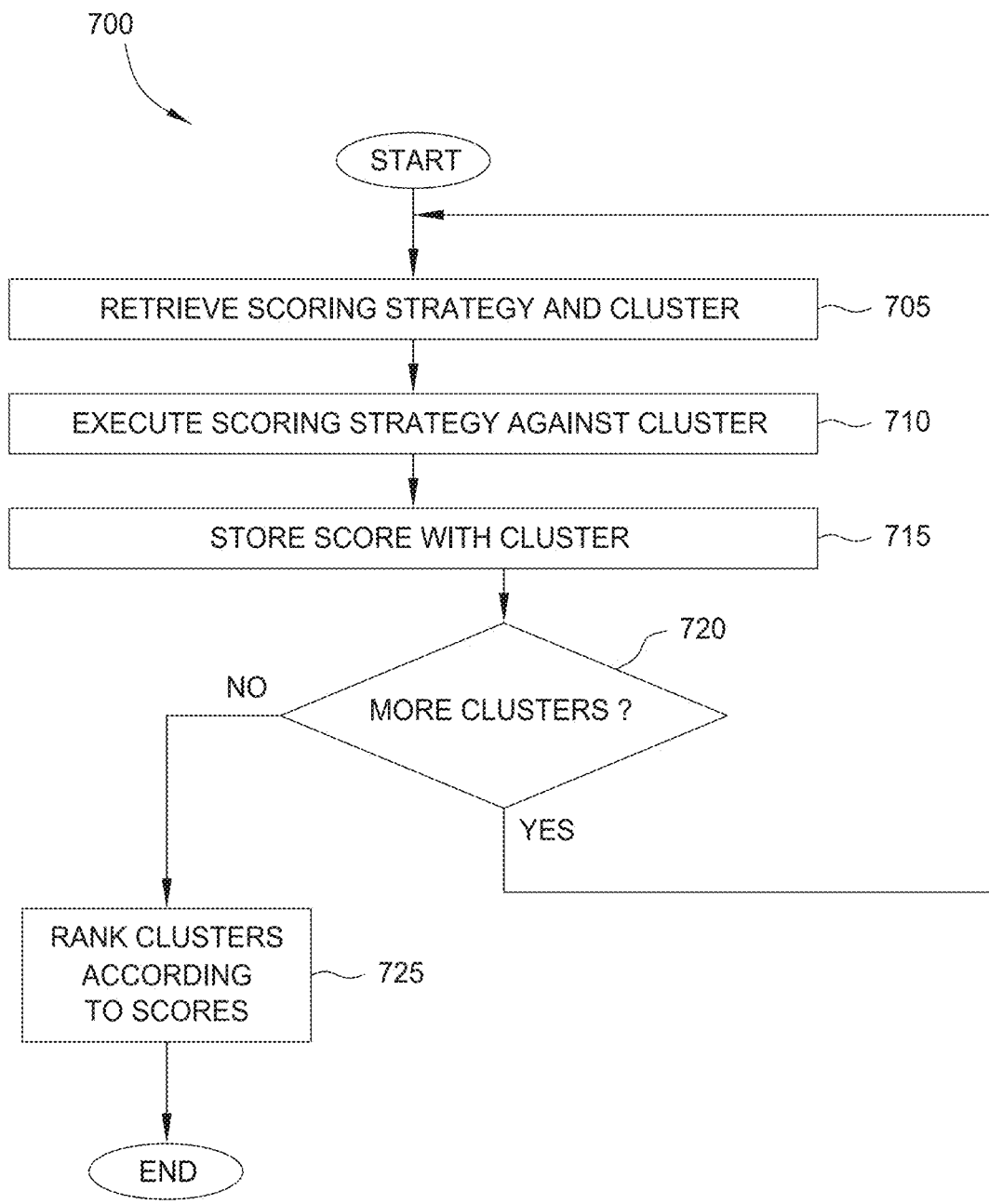
FIG. 7 is a flowchart of an example method of scoring clusters, according to an embodiment of the present disclosure.

FIG. 7 is a flowchart of an example method of scoring clusters, according to an embodiment. Although the method is described in conjunction with the systems of FIGS. 1 and 4, persons skilled in the art will understand that any system configured to perform the method steps, in any order, is within the scope of the present invention.

As shown, the example cluster scoring method 700 begins at block 705, where the cluster engine 120 retrieves a scoring strategy 442 and a cluster 252 (for example, a cluster just created using the method 600 of FIG. 6). In other cases, the cluster engine 120 may retrieve the scoring strategy 442 associated with a stored cluster. Other alternatives include an analyst selecting a scoring strategy 442 through the client 135, the cluster engine 120 via the cluster analysis UI 500, a script, or a configuration file. The cluster engine 120 may retrieve the selected scoring strategy 442 from the scoring strategy store 440, and the cluster 252 from the cluster list 250.

At block 710, the cluster engine 120 executes the scoring strategy 442 against the cluster 252. The scoring strategy 442 may specify characteristics of the related data items within the cluster 252 to aggregate. The cluster engine 120 may execute the scoring strategy 442 by aggregating the specified characteristics together to determine a score. For instance, the cluster engine 120 may aggregate account balances of related data items that are account data items. In such a case, a total amount of dollars (and/or average dollars or any other aggregated, averaged, or normal attribute of the cluster) included within the balances of the account data items of the cluster 252 may be the score of the cluster 252.

At block 715, the cluster engine 120 may store the score with the cluster 252 in the cluster list 250. At step 720, the cluster engine 120 determines if there are more clusters 252 to score. For example, in one embodiment, a set of clusters may be re-scored using an updated scoring strategy. In other cases, the cluster engine may score each cluster when it is created from a seed (based on a given cluster generation and corresponding scoring strategy). If more clusters remain to be scored (and/or re-scored), the method 700 returns to block 705.

At block 725, the cluster engine 120 may rank the clusters 252 according to the scores of the clusters 252. For example, after re-scoring a set of clusters (or, alternatively, after scoring a group of clusters generated from a set of seeds), the cluster engine 125 may rank the clusters 252 from highest score to lowest score. The ranking may be used to order a display of information associated with the clusters 252 presented to the analyst. The analyst may rely upon the ranking and scores to determine which clusters 252 to analyze first. The ranking and sorting may generally be performed on-demand when an analyst is looking for a cluster to investigate. Thus, the ranking need not happen at the same time as scoring. Further, the clusters may be scored (and later ranked) using different raking strategies.

In various embodiments, multiple scores for each cluster may be determined according to methods similar to the example method 700. Accordingly, clusters may be ranked according to any of multiple scores. Additionally, in various embodiments, multiple scores may be combined and/or aggregated into a metascore that may be used to rank the clusters. Various example score and metascore determinations are described below in reference to FIGS. 10C, 11C, 12C, and 13C.

VI. Example Implementation Mechanisms/Systems

Figure 8:
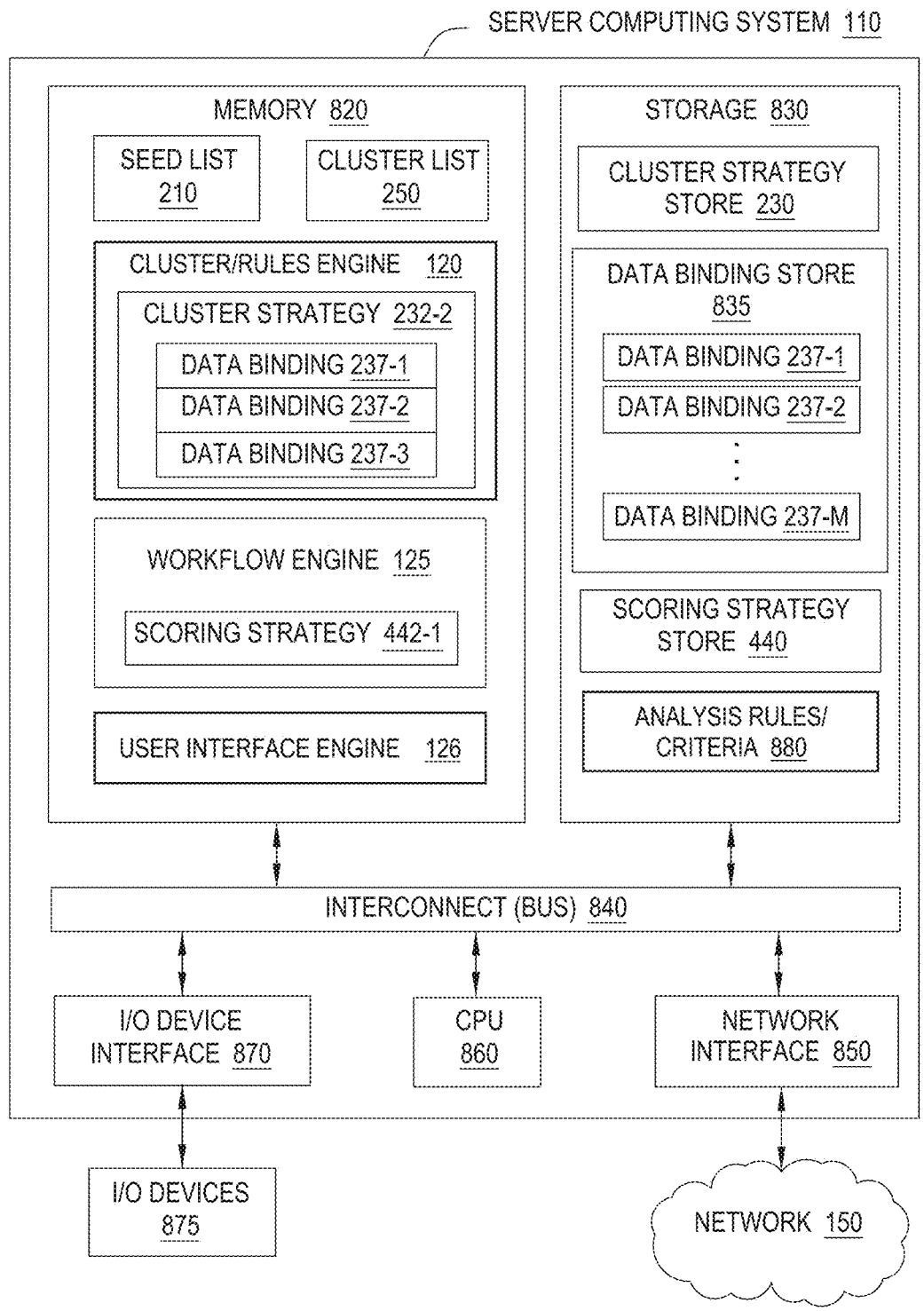
FIG. 8 illustrates components of an illustrative server computing system, according to an embodiment of the present disclosure.

FIG. 8 illustrates components of an illustrative server computing system 110, according to an embodiment. The server computing system 110 may comprise one or more computing devices that may perform a variety of tasks to implement the various operations of the data analysis system. As shown, the server computing system 110 may include, one or more central processing unit (CPU) 860, a network interface 850, a memory 820, and a storage 830, each connected to an interconnect (bus) 840. The server computing system 110 may also include an I/O device interface 870 connecting I/O devices 875 (for example, keyboard, display, mouse, and/or other input/output devices) to the computing system 110. Further, in context of this disclosure, the computing elements shown in server computing system 110 may correspond to a physical computing system (for example, a system in a data center, a computer server, a desktop computer, a laptop computer, and/or the like) and/or may be a virtual computing instance executing within a hosted computing environment.

The CPU 860 may retrieve and execute programming instructions stored in memory 820, as well as store and retrieve application data residing in memory 820. The bus 840 may be used to transmit programming instructions and application data between the CPU 860, I/O device interface 870, storage 830, network interface 850, and memory 820. Note that the CPU 860 is included to be representative of, for example, a single CPU, multiple CPUs, a single CPU having multiple processing cores, a CPU with an associate memory management unit, and the like.

The memory 820 is included to be representative of, for example, a random access memory (RAM), cache and/or other dynamic storage devices for storing information and instructions to be executed by CPU 860. Memory 820 also may be used for storing temporary variables or other intermediate information during execution of instructions to be executed by CPU 860. Such instructions, when stored in storage media accessible to CPU 860, render server computing system 110 into a special-purpose machine that is customized to perform the operations specified in the instructions.

The storage 830 may be a disk drive storage device, a read only memory (ROM), or other static, non-transitory, and/or computer-readable storage device or medium coupled to bus 840 for storing static information and instructions for CPU 860. Although shown as a single unit, the storage 830 may be a combination of fixed and/or removable storage devices, such as fixed disc drives, removable memory cards, and/or optical storage, network attached storage (NAS), and/or a storage area-network (SAN).

Programming instructions, such as the cluster engine 120, the workflow engine 125, and/or the user interface engine 126, may be stored in the memory 820 and/or storage 830 in various software modules, The modules may be stored in a mass storage device (such as storage 830) as executable software codes that are executed by the server computing system 110. These and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Illustratively, according to an embodiment, the memory 820 stores a seed list 210, a cluster engine 120, a cluster list 250, a workflow engine 125, and a user interface engine 126 (as described with reference to the various figures above). The cluster engine 120 may include a cluster strategy 232-2. The particular cluster strategy 232-2 may include data bindings 237-1, 237-2, and 237-3, with which the cluster engine 120 may access the cluster data source 160. The workflow engine 125 may include a scoring strategy 442-1.

Illustratively, according to an embodiment, the storage 830 includes a cluster strategy store 230, data bindings store 835, a scoring strategy store 440, and one or more cluster analysis rules or criteria 880. As described above, the cluster strategy store 230 may include a collection of different cluster strategies 232, such as cluster strategy 232-2. For example, the cluster strategy store 230 may be a directory that includes the cluster strategies 232-1, 232-2 . . . 232-N as distinct modules. The scoring strategy store 440 may include a collection of different scoring strategies 442, such as scoring strategy 442-2, and may also be a directory of distinct modules. The data binding store 835 may include data bindings 237-1, 237-2 . . . 237-M, which may also be stored as distinct modules within a directory.

Although shown in memory 820, the seed list 210, cluster engine 120, cluster list 250, workflow engine 125, and the user interface engine 126, may be stored in memory 820, storage 830, and/or split between memory 820 and storage 830. Likewise, copies of the cluster strategy 232-2, data binding 237-1, 237-2, and 237-3, and scoring strategy 442-2 may be stored in memory 820, storage 830, and/or split between memory 820 and storage 830.

The network 150 may be any wired network, wireless network, or combination thereof. In addition, the network 150 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

As described above in reference to FIG. 1, the server computing system 110 may be in communication with one or more data sources 160. Communication between the server computing system 110 and the data sources 160 may be via the network 150 and/or direct. In an embodiment, an optional data aggregator/formatter device and/or system may aggregate various data from multiple data sources and/or may format the data such that it may be received by the server computing system 110 in a standardized and/or readable format. For example, when multiple data sources contain and/or provide data in various formats, the data aggregator/formatter may convert all the data into a similar format. Accordingly, in an embodiment the system may receive and/or access data from, or via, a device or system such as the data aggregator/formatter.

As described above, in various embodiments the system may be accessible by an analyst (and/or other operator or user) through a web-based viewer, such as a web browser. In this embodiment, the user interface may be generated by the server computing system 110 and transmitted to the web browser of the analyst. Alternatively, data necessary for generating the user interface may be provided by the server computing system 110 to the browser, where the user interface may be generated. The analyst/user may then interact with the user interface through the web-browser. In an embodiment, the user interface of the data analysis system may be accessible through a dedicated software application. In an embodiment, the client computing device 130 may be a mobile computing device, and the user interface of the data analysis system may be accessible through such a mobile computing device (for example, a smartphone and/or tablet). In this embodiment, the server computing system 110 may generate and transmit a user interface to the mobile computing device. Alternatively, the mobile computing device may include modules for generating the user interface, and the server computing system 110 may provide user interaction data to the mobile computing device. In an embodiment, the server computing system 110 comprises a mobile computing device. Additionally, in various embodiments any of the components and/or functionality described above with reference to the server computing system 110 (including, for example, memory, storage, CPU, network interface, I/O device interface, and the like), and/or similar or corresponding components and/or functionality, may be included in the client computing device 130.

According to various embodiments, the data analysis system and other methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing devices of the data analysis system may generally be controlled and/or coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

In general, the word "module," as used herein, refers to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware devices (such as processors and CPUs) may be comprised of connected logic units, such as gates and flip-flops, and/or may be comprised of programmable units, such as programmable gate arrays or processors. The modules or computing device functionality described herein are preferably implemented as software modules, but may be represented in hardware devices. Generally, the modules described herein refer to software modules that may be combined with other modules or divided into sub-modules despite their physical organization or storage.

Server computing system 110 may implement various of the techniques and methods described herein using customized hard-wired logic, one or more ASICs or FPGAs, firmware and/or program logic which, in combination with various software modules, causes the server computing system 110 to be a special-purpose machine. According to one embodiment, the techniques herein are performed by server computing system 110 in response to CPU 860 executing one or more sequences of one or more modules and/or instructions contained in memory 820. Such instructions may be read into memory 820 from another storage medium, such as storage 830. Execution of the sequences of instructions contained in memory 820 may cause CPU 840 to perform the processes and methods described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage 830. Volatile media includes dynamic memory, such as memory 820. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 840. Transmission media may also take the form of acoustic or light waves, such as those generated during radio-wave and infra-red data communications.

Various forms of media may be involved in carrying one or more sequences of one or more instructions to CPU 860 for execution. For example, the instructions may initially be carried on a magnetic disk or solid state drive of a remote computer. The remote computer may load the instructions and/or modules into its dynamic memory and send the instructions over a telephone or cable line using a modem. A modem local to server computing system 820 may receive the data on the telephone/cable line and use a converter device including the appropriate circuitry to place the data on bus 840. Bus 840 carries the data to memory 820, from which CPU 860 retrieves and executes the instructions. The instructions received by memory 820 may optionally be stored on storage 830 either before or after execution by CPU 860.

VII. Additional Applications

While analysis of risky trading behavior has received much discussion in this disclosure, the techniques described herein may be adapted for use with a variety of data sets and in various applications. Such applications may include, for example, credit card fraud detection, financial fraud detection, tax fraud detection, beaconing malware detection, malware user-agent detection, other types of malware detection, activity trend detection, health insurance fraud detection, financial account fraud detection, detection of activity by networks of individuals, criminal activity detection, network intrusion detection, detection of phishing efforts, money laundering detection, and/or financial malfeasance detection. For example, information from data logs of online systems may be evaluated as seeds to improve cyber security. In such a case, a seed may be a suspicious IP address, a compromised user account, and the like. From the seeds, log data, DHCP logs, IP blacklists, packet captures, webapp logs, and other server and database logs may be used to create clusters of activity related to the suspicions seeds. Other examples include data quality analysis used to cluster transactions processed through a computer system (whether financial or otherwise).

VIII. Example Generalized Method of the Data Analysis System

Figure 9:
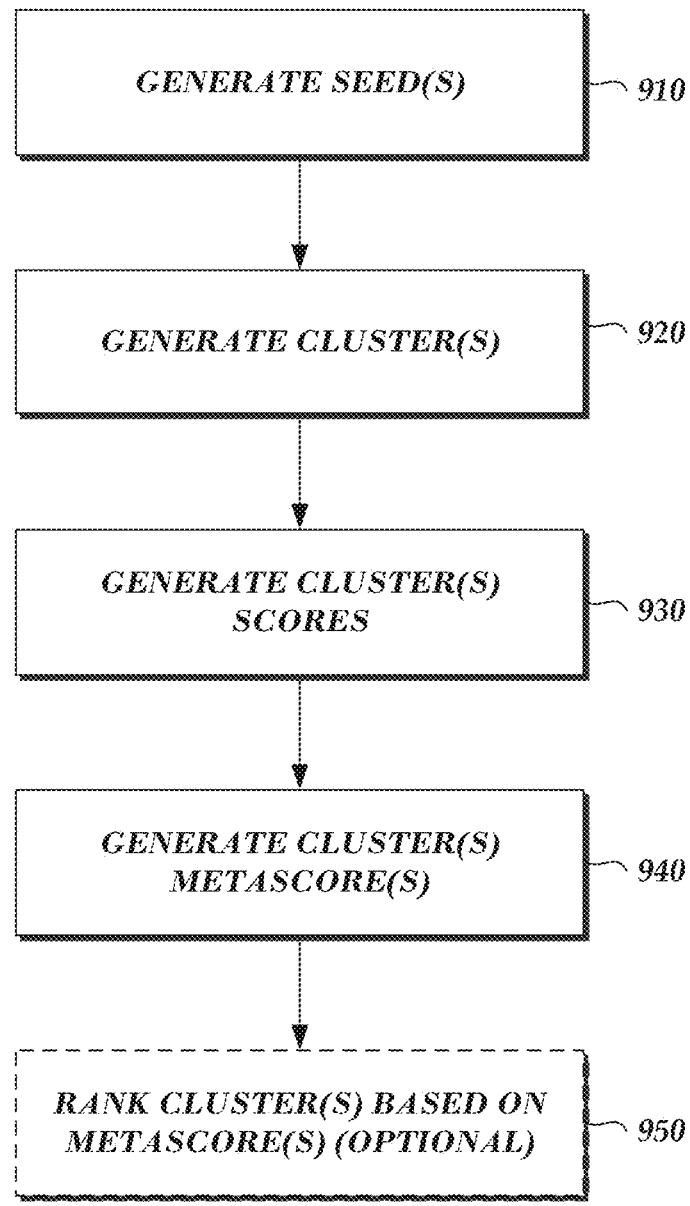
FIG. 9 is a flowchart of an example generalized method of the data analysis system, according to an embodiment of the present disclosure.

FIG. 9 is a flowchart of an example generalized method of the data analysis system, according to an embodiment of the present disclosure. In various embodiments, fewer blocks or additional blocks may be included in the process of FIG. 9, or various blocks may be performed in an order different from that shown in the figure. Further, one or more blocks in the figure may be performed by various components of the data analysis system, for example, server computing system 110 (described above in reference to FIG. 8).

As described above, and as shown in the embodiment of FIG. 9, the data analysis system may generate a seed or multiple seeds (block 910), may generate clusters based on those seed(s) (block 920), may generate a score or multiple scores for each generated cluster (block 930), may generate a metascore for each generated cluster (block 940), and may optionally rank the generated clusters based on the generated metascores (block 950). In various embodiments, the data analysis system may or may not generate multiple scores for each cluster, may or may not generate metascores for each cluster, and/or may or may not rank the clusters. In an embodiment, the system may rank clusters based on one or more scores that are not metascores.

Further, as described above, the seeds may include one or multiple data items, and may be generated based on seed generation strategies and/or rules. Similarly, the clusters may include one or multiple data items related to a seed, including the seed, and may be generated based on cluster generation strategies and/or rules (including data bindings and/or searching and filtering are performed through, for example, a generic interface to various data sources). Scores and metascores may be determined based on attributes, characteristics, and/or properties associated with data items that make up a given cluster.

Example applications of the data analysis system, including methods and systems for identifying data items, generating data clusters, and analyzing/scoring clusters, are disclosed in the various related applications listed above and previously incorporated by reference herein.

IX. Cluster Analysis

FIGS. 10A, 10B, and 14-26 described below, illustrate methods and user interfaces of the data analysis system, according to various embodiments, in which data clusters are automatically generated, analyzed, and presented to an analyst such that the analyst may quickly and efficiently evaluate the clusters. In particular, as described below the data analysis system may apply one or more analysis criteria or rules to the data clusters so as to generate human-readable "conclusions" (as described above, also referred to herein as "summaries"). The conclusions may be displayed in an analysis user interface through which the analyst may evaluate the clusters and/or access more detailed data related to the cluster. In an embodiment, a cluster type may be associated with each cluster, and may be determined according to the cluster strategy that generated the cluster. Further, the system may generate "alert scores" for the clusters which may be used to prioritize clusters displayed to the analyst.

The various methods and user interfaces described below in reference to FIGS. 10A, 10B, and 14-26 may be implemented by various aspects of the data analysis system (for example, the server computing system 110 and/or another suitable computing system) as described above. For example, clustering may be accomplished according to seed generation and clustering strategies and rules as implemented by, for example, the cluster/rules engine 120; cluster analysis may be accomplished according to analysis rules/criteria 880 as implemented by, for example, the cluster/rules engine 120; cluster scoring (for example, generation of alert scores) may be accomplished according to scoring strategies as implemented by, for example, the cluster/rules engine 120; and user interface may be generated and/or presented to the analyst by, for example, the user interface engine 126; among other aspects.

Additionally, in the methods described in reference to the flowcharts of FIGS. 10A, 10B, and 14-26 below, in various embodiments, fewer blocks or additional blocks may be included in the example methods depicted, or various blocks may be performed in an order different from that shown in the figures. Further, in various embodiments, one or more blocks in the figures may be performed by various components of the data analysis system, for example, server computing system 110 (described above in reference to FIG. 8) and/or another suitable computing system.

a. Example Method of Cluster Analysis

FIG. 10A is a flowchart for an example method of data cluster analysis, according to an embodiment of the present disclosure. In FIG. 10A, blocks 910 and 920 of the flowchart proceed generally as described in reference to the flowchart of FIG. 9. For example, at block 910 seeds are generated according to one or more seed generation strategies. Examples of seed generation strategies are described in the various related applications listed above and previously incorporated by reference herein. Examples include identifying tax returns that are potentially fraudulent, identifying communications that are potentially associated with beaconing malware, and/or identifying emails potentially associated with phishing campaigns, among others. In the context of identifying risky trading activity, one example may include identifying risky traders from a list of traders, such as an all-inclusive list of traders at the financial institution obtained from the HR department of the company. Further, at block 920 clusters are generated based on the one or more generated seeds and according to the one or more cluster generation strategies. Examples of cluster generation strategies (as mentioned above, also referred to herein as "cluster strategies," "clustering strategies," and/or "cluster generation rules") are described in the various related applications listed above and previously incorporated by reference herein. Examples include strategies for financial fraud detection, tax fraud detection, beaconing malware detection, malware user-agent detection, other types of malware detection, activity trend detection, health insurance fraud detection, financial account fraud detection, detection of activity by networks of individuals, criminal activity detection, network intrusion detection, detection of phishing efforts, money laundering detection, and/or financial malfeasance detection, among others.

A cluster of data items generated according to a given clustering strategy (and its associated seed generation strategy or strategies) may be understood as having a "cluster type" (also referred to as a "data cluster type") corresponding to that clustering strategy. For example, a particular clustering strategy may be referred to as "Tax Fraud," because the clustering strategy relates to identifying clusters of data items related to potential tax fraud. A cluster of data items generated according to that clustering strategy may therefore have a "cluster type" of "Tax Fraud." In another example, a cluster generated by an "Internal Phishing" clustering strategy (and its associated seed generation strategy or strategies) has a cluster type of "Internal Phishing." In another example, a cluster generated by a "Trader Oversight" clustering strategy has a cluster type of "Trader Oversight." The cluster type may be narrower depending on the specific application, clustering strategy, or desired scoring strategy. For example, a cluster of data items may have a cluster type of "Absent Trading", because the clustering strategy relates to specifically identifying clusters of data associated with traders that trade when they are not physically badged-in.

At block 1002 of, the system generates "alerts" for each of the clusters. An "alert" includes various types of information related to the cluster that may be useful to an analyst in evaluating the importance or criticality of the cluster in the context of a particular investigation. Generating an alert may include applying various cluster analysis rules or criteria to analyze the cluster and so as to generate human-readable cluster conclusions, as mentioned above. Generating an alert may further include generating an alert score for the cluster. Details regarding generation of alerts are described below in reference to FIG. 10B.

At block 1004 of FIG. 10A, a cluster analysis user interface is provided to the user (for example, an analyst). FIGS. 20-27, described below, include examples of cluster analysis user interfaces of the data analysis system. As described below, a user interface may include a listing of alerts, each alert corresponding to a particular generated and analyzed cluster. The alerts may be organized and grouped according to cluster types. Further, the analyst may view a user interface including detailed information related to each alert, including the human-readable conclusions, the alert scores, and various detailed data related to the clusters. For example, in a given alert the analyst may be provided with a name of the cluster, a cluster strategy by which the cluster was generated (also referred to as the cluster type), a list of generated conclusions, and/or one or more lists and/or tables of data related to the cluster. The one or more lists and/or tables of data related to the cluster may be drawn from the data items of the cluster, and may be filtered by the analyst according to time and/or type of data.

At block 1006, the system regenerates previously generated clusters. In various implementations the data items from which seeds are selected/generated and from which clusters are generated may change after a cluster is generated. In the example of tax fraud detection, additional tax return data items may be received, or additional phone number data items may be received that relate to a person in a previously generated cluster. Such information may have been included in a cluster if it had been available at the time the cluster was created. Accordingly, the system may regenerate clusters so as to include the data items and/or other information that has become available since the last time the cluster was generated. After, or in response to, a cluster being regenerated, the system reanalyzes the cluster and may, in an embodiment, generate an alert for the regenerated and reanalyzed cluster (as indicated by the arrow back to block 1002). In another embodiment, as described below in reference FIG. 15, when a given cluster is regenerated, a previously generated alert for that cluster may be updated or, alternatively, a new alert may be generated including a link to the previously generated alert.

In an embodiment, as shown at block 1006a, clusters may be regenerated on a schedule. For example, the system may be configured to regenerate clusters after a particular number of seconds, minutes, hours, or days, or at particular times every hour or day. In another embodiment, as shown at block 1006b, clusters may be regenerated as needed, such as in response to the system detecting one or more changes in data items and automatically executing a cluster regeneration process. For example, the system may be configured to automatically regenerate clusters when it detects that new data items (and/or other information) are received by the system, new data items (and/or other information) related to a cluster (and/or potentially related to a cluster) are received by the system, new data items (and/or other information) connected to a cluster or a data item in a cluster is received by the system, an analyst logs into the system, and/or an analyst views a cluster. In another embodiment, as shown at block 1006c, clusters may be regenerated on demand. For example, clusters may be regenerated when requested by an analyst (via, for example, a user interface of the system).

In any of the embodiments of blocks 1006a, 1006b, and 1006c, all clusters may be regenerated or portions of clusters may be regenerated, in any combination. For example, clusters associated with a particular clustering strategy may be generated on a particular schedule, while clusters associated with a different clustering strategy may be generated on a different schedule (and/or as needed and/or on demand). In another example, individual clusters may be regenerated, or other relationships among clusters may be used to determine which clusters are to be regenerated at a given time.

At optional block 1008, clusters are merged as described above. For example, if a regenerated cluster includes a data item also included in a different cluster, the regenerated cluster and the different cluster may optionally be merged. In the embodiment of FIG. 10A, only clusters generated according to the same clustering strategy (for example, having the same cluster type) may be merged. In this embodiment, alerts generated for clusters having different cluster types may be linked even if the clusters are not merged, as described below in reference to FIGS. 14-16. In alternative embodiments, clusters generated according to different clustering strategies (for example, having different cluster types) may be merged.

b. Example Method of Alert Generation

FIG. 10B is a flowchart of an example method of alert generation for a particular data cluster, according to an embodiment of the present disclosure. At block 1022, the system accesses data, including data items and related metadata and other information, of the data cluster. As described below, this accessed cluster data is analyzed to generate the human-readable conclusions, the alert scores, and may be included and organized in the user interface of the alert. At block 1024, the system determines the cluster type of the data cluster. As mentioned above, a data cluster generated according to a given clustering strategy (and its associated seed generation strategy or strategies) may be understood as having a "cluster type" (also referred to as a "data cluster type") corresponding to that clustering strategy.

The cluster type may be associated with the indicator, scenario, or any other analysis rules/criteria that may have influenced the generation of the cluster. For example, a desirable indicator may indicate the presence of PNL smoothing by a trader. To perform computations for this specific indicator, the system may need the trader's name or credentials, any trading accounts associated with the trader, and all the PNL data associated with those accounts or the trader. All this information may be gathered and clustered for the purpose of computing this specific indicator, and the cluster may then be tagged with a cluster type, such as "PNL Smoothing", so that the system is aware of the clustering strategy associated with that data cluster and the analysis that should be performed on that data cluster. Further discussion of indicators and scenarios is provided below.

At block 1026, having determined the cluster type of the data cluster, the system accesses one or more cluster analysis rules or criteria associated with that cluster type. As various data clusters may be generated according to different clustering strategies, and each of the clustering strategies may be associated with differing types of investigations, the analysis rules or criteria used to analyze the clusters vary according to the cluster types and their respective associated types of investigations. For example, there may be clustering strategies that generate data clusters that specifically include security badge activity data, and are associated with analysis rules or criteria that involve security badge activity data. The cluster type of a cluster allows a system to make the association between the clustering strategy and the analysis rules, criteria, indicators, and scenarios, so that the analysis rules/criteria are not being performed on data clusters that do not have the data needed to perform those analysis rules/criteria.

At block 1028, the system analyzes the data cluster based on the accessed analysis rules/criteria. The cluster data is then evaluated by the system (for example, by the cluster/rules engine 120) according to the analysis rules/criteria. Many examples of cluster analysis according to various clustering strategies are described in the various related applications listed above and previously incorporated by reference herein. In the various examples, analysis of clusters may be described in the context of cluster scoring (for example, generating of clusters scores and/or metascores). For example, in U.S. patent application Ser. No. 14/139,628, cluster data is scored and/or analyzed in various contexts including, among others:

Tax Fraud Detection, in which clusters are analyzed to determine a number of known fraudulent returns in a cluster, a number of first-time filers in the cluster, and/or a mismatch between reported incomes in the cluster, among others.

Beaconing Malware Detection, in which clusters are analyzed to determine a number of known bad domains in a cluster, an average request size in the cluster, and/or a number of requests blocked by a proxy in the cluster, among others.

Additional examples are described in U.S. patent application Ser. No. 14/473,920, filed Aug. 29, 2014, and titled "External Malware Data Item Clustering And Analysis," in which cluster data is scored and/or analyzed in various contexts including:

Internal and External Phishing, in which clusters are analyzed to determine a most common email subject of emails in the cluster, numbers of emails in the cluster sent within particular time periods, and/or number of recipients of emails in the cluster, among others.

Internal and External Threat Intel, in which clusters are analyzed to determine a number of URLs in the cluster referenced by an analyzed malware data item, a percentage of traffic in the cluster categorized as likely malicious, and/or a highest organizationally hierarchical position of a person in the cluster associated with a malicious connection, among others.

IDS (Intrusion Detection System), in which clusters are analyzed to determine a time spanned by alert notices in the cluster and/or a number of alert notices associated with particular IP addresses, among others.

Yet another example is described in in U.S. patent application Ser. No. 14/278,963, filed Apr. 5, 2014, and titled "Clustering Data Based On Indications Of Financial Malfeasance," in which cluster data is scored and/or analyzed to detect bad activity by traders (generally referred to herein as "trader oversight").

The discussion on indicators and scenarios, located below in this present disclosure, provide further examples of cluster analysis in accordance with various clustering strategies.

i. "Conclusions"

At block 1030 of FIG. 10B, the system generates one or more conclusions for the analyzed data cluster based on the cluster analysis. As described above, the generated conclusions (also referred to herein as summaries) comprise compact, human-readable phrases or sentences that provide highly relevant, and easily evaluated (by a human analyst) information regarding the data in the cluster (for example, data items and metadata). The conclusions may be useful to an analyst in evaluating the importance or criticality of the cluster in the context of a particular investigation. As with the analysis rules/criteria described above, each cluster type may be related to a set of conclusions appropriate to the type of investigation associated with the cluster type. For examples of various templates for conclusions that can be associated with various types of data clusters in the context of malware or phishing detection, see FIG. 10C and its accompanying discussion in U.S. patent application Ser. No. 14/579,752, filed Dec. 22, 2014, and titled, "Systems and User Interfaces For Dynamic and Interactive Investigation of Bad Actor Behaviors Based On Automatic Clustering Of Related Data In Various Data Structures."

ii. "Alert Score"

Turning again to the embodiment shown in FIG. 10B, at block 1032, the system generates an alert score for the analyzed data cluster based on the cluster analysis. As described above, the alert score may be the same as, similar to, and/or based on any of the scores, metascores, and/or conclusions described herein. An alert score may provide an initial indication to an analyst of a likelihood that a cluster/alert is important or critical in the context of a particular investigation (for example, a degree of correlation between characteristics of the cluster/alert and the analysis rules/criteria). As described below, the alert score is represented in the analysis user interface by an indicator, icon, color, and/or the like. An analyst may sort alerts/clusters based on the alert scores so as to enable an efficient investigation of more important alerts/clusters first.

In an embodiment, the alert score may be a metascore, and may be one of multiple values. For example, the alert score may be one of three values corresponding to, for example, a high alert, a medium alert, or a low alert. In other embodiments, the alert score may be partitioned into more or fewer values. Examples of various scores and metascores associated with various cluster strategies are described in the various related applications listed above and previously incorporated by reference herein. For example, in U.S. patent application Ser. No. 14/139,628, example cluster metascores are described in the contexts of tax fraud detection, beaconing malware detection, malware user-agent detection, and activity trend detection.

As mentioned above, in an embodiment, the alert score may be binned into one of three bins corresponding to a high alert, a medium alert, or a low alert. Each alert level may be associated with an indicator, icon, color, and/or the like. For example, a high alert may be associated with red (and/or another color), a medium alert may be associated with orange (and/or another color), and a low alert may be associated grey (and/or another color).

In an embodiment, the cluster alert score is determined based on and conveys both a determined importance/criticality (for example, a metascore comprising scores showing a high number of data items may indicate likely risky behavior) and a confidence level in the determined importance/criticality. For example:

A high alert may be indicated when:
    an importance metascore is above a particular threshold (for example, greater than 60%, or some other percent or number), AND a confidence level is above a particular threshold (for example, greater than 70%, or some other percent or number).

A medium alert may be indicated when:
    an importance metascore is below a particular threshold (for example, less than 60%, or some other percent or number), AND a confidence level is above a particular threshold (for example, greater than 70%, or some other percent or number), OR
    an importance metascore is above a particular threshold (for example, greater than 60%, or some other percent or number), AND a confidence level is below a particular threshold (for example, less than 30%, or some other percent or number).

A low alert may be indicated when:
    either an importance metascore is below a particular threshold (for example, less than 60%, or some other percent or number), OR a confidence level is below a particular threshold (for example, less than 30%, or some other percent or number).

In other embodiments, other criteria may be used to determine alert levels to provide to the end user, possibly based on additional or fewer parameters than discussed above. In some examples, alerts are associated with ranges of importance metascores and/or confidence levels, rather than only a minimum or maximum level of particular scores as in the examples above.

In an embodiment, a confidence level may be determined based on a false positive rate. The false positive rate may be based on, for example, historical information indicating how frequently other clusters having similar fraud indicators (for example, indicators used in the determination of the importance metascore) have been determined, after human analysis, to be critical or not consistent with the importance metascore. The false positive rate may also (or alternatively) be based on, for example, information provided from third-parties, such as blacklists that include a likelihood that any item on the blacklist is a false positive.

As mentioned above, in an embodiment the alert score may be based on one or more cluster scores and/or the analysis rules/criteria. In this embodiment, a high alert score may indicate a high degree of correlation between characteristics (for example, data and metadata) of the cluster and the analysis rules/criteria (that may, for example, indicate a likelihood of fraud, among other indications). Similarly, a low alert score may indicate a high degree of correlation between characteristics of the cluster and the analysis rules/criteria.

X. Enhanced Detection of Risky Trading Behavior
    a. General Enhancements

FIGS. 11-13 depict embodiments of the present disclosure that relate to enhanced detection of risky trading behavior by continuing to leverage the data clustering and analysis methods disclosed herein. The general method of using seeds to generate data clusters, and then analyzing and/or scoring those data clusters, provides the continued framework for analysts or supervisors to perform more-detailed and robust analysis and review of potential risky trading.

One end goal of scoring data clusters may be to issue conclusions or alerts. With that goal in mind, the data cluster scoring strategies are devised based on the sets of alerts that may ultimately be important to an analyst or user reviewing the alerts. For example, one alert may inform an analyst whenever a trader made a modification to a trade that significantly affects the present value of the position. The issue is that this is a reductionist approach that may make it easy to miss risky trading behavior. For example, trading in credit default swaps (CDS) used to primarily involve the exchange of ongoing payments (points running), rather than at the inception of the trade (points upfront), since counterparty used not to be considered that important. However, the nature of the CDS market has changed now so that counterparties are less likely to trust each other's' credit-worthiness. While a change to the payments may be noticed, someone engaging in risky trading activity may for example change the counterparty on the trade to one with poorer credit. Although this could have a material effect on the net present value of the trade, the change may not be flagged or caught if existing controls focus only on the price (points running) on the trade, rather than all the inputs into the present value (such as the credit-worthiness of the counterparty). The characteristics of risky behavior that an analyst should be looking for may have changed from what the triggers or controls were originally designed to catch. Thus, it is an important challenge to improve the detection of risky trading behavior in order to reduce the chances that risky trading goes undetected.

One enhancement to systems or methods for the detection of risky trading behavior may involve using a holistic approach. The system may take into account all the different activities involved in control and supervision. The system may be comprised of several mutually-reinforcing facets, and be able to handle more roles than just simply alerting an analyst or user about possible risky trading. The system may be able to handle receiving and implementing supervisory feedback obtained from reviewing the generated alerts. The system may be able to handle deep dives or investigations into risky trading behavior, and it may be able to handle the level of analysis needed to generate complex alerts. The system may be able to handle thematic reviews for measuring the effectiveness of the controls or analyses used in generating the alerts. The system may also be able to handle reporting to various interested parties—such as executives, supervisors, managers, regulators, and so forth—in order to provide the parties with overall situational awareness. The system, by embracing this holistic approach, may be a more comprehensive, multi-faceted, single-solution that can be used to suit the needs of many different people and continue to be relevant with new developments in the financial markets.

Another enhancement to systems or methods for the detection of risky trading behavior may involve using an empirical, data-driven approach. The system may utilize triggers, controls, and clustering or scoring strategies that are empirical and fact-based, rather than accreted over time through intuition. The system may utilize a single, coherent data picture. The system and its components may conduct analysis and presentation of potential risky activity using that single, coherent data picture. The system may conduct data testing and gather evidence of the effectiveness of the approach, such as testing to see whether certain controls or strategies are effective, and measuring how frequently certain indicators or triggers occur. The system may capture that evidence of effectiveness and use it in a process of continuous iterative refinement. The system may allow for gathering and obtaining feedback for the purpose of improving the system over time. The system may also promote transparency and accuracy in order to encourage accountability. A data-driven approach may be more transparent than an intuition-based approach. Because of the transparency of the data, the system may create trust and accountability within the organization. For example, if trader A knows that his supervisor can see a very accurate picture of his trading activity, and that higher-level manager including the CEO can see a consolidated view of his trading activity, then trader A may be deterred from trading malfeasance once it becomes apparent that there is nowhere for trader A to hide that malfeasance—even if trader A were to only engage in sporadic or ad hoc risky trading behavior.

b. Indicators and Scenarios

The system used for enhanced detection of risky trading behavior may perform analysis on the data clusters by incorporating advanced detection indicators or scenarios. These indicators or scenarios may be used to generate the alerts. The indicators or scenarios may be associated with specific data clustering strategies. The indicators or scenarios may be associated with specific cluster scoring strategies. The indicators or scenarios may also be associated with specific clustering and scoring strategies that are linked and meant to be performed together for the purposes of incorporating an indicator or scenario. For example, scoring an indicator may be associated with tallying up how many times a trader performs a specific type of trade. In order to perform that tallying, the data cluster may need to include all trade and trade-related data performed by that trader. The data clustering strategy may accordingly search for all trade and trade-related data associated with a trader for adding to the cluster. Thus, the indicator in this situation would be tied to both a scoring and a clustering strategy that are meant to be performed together. This may apply similarly for scenarios as well. In other words, indicators and scenarios may influence, define, or serve as components in data clustering and scoring strategies. The data underlying indicators and scenarios may be arranged so efficient parallel computation is possible, for example by ensuring that all computations for traders may proceed in parallel or that computations for the same person may be done in parallel for different time periods.

c. Descriptions of Indicators

An indicator may be a metric which can be observed in or computed from the underlying data and may indicate heightened or reduced risk. An elevated metric indicates an increased likelihood of unauthorized trading. Indicators may be used to heighten signal content of particular alert types, and may be combined with the overall risk model to look for trading activity which represents greater risk. An indicator may be used on its own or in combination with other factors to develop detection scenarios.

Some examples of indicators, examples of the data used to compute them, and descriptions of their purpose are provided below:

| Indicator | Examples of Data Used to Compute |
|---|---|
| Possible Dummy Trade | Trade data (timing of trade cancellations or amendments, timing of external trade events) |
| Unexpected Macro Asset Price or Variance Correlation/ Cointegration | PNL data, book data, trading account data, asset price data, asset variance data |
| PNL Smoothing | PNL data, asset price volatility data |
| PNL Jumps in Line With Compensation/ Budget Cycle | PNL data, compensation/budget cycle data |
| Off-market/Adverse Execution Selection | Trade data (execution price of trades), asset price and volume data (for estimating expected transaction costs) |
| Trading Away From Bucket VWAP | Trade data (for all trades in the firm for a given asset) |
| Mark Arbitrage | Counterparty data |
| Control Timing Arbitrage | Trade data (timing of trade cancellations or amendments), front and back office processes data |
| Internal Transfers With PNL | Counterparty data, trade data |

Possible Dummy Trade: Identify when a trade is cancelled or amended before any external event (e.g., cash flow, confirmation, settlement, exchange margining) that might affirm that it is real. For example, the indicator may identify when a trader books a trade as if it will settle in T+3, but the trader cancels the trade before that date. This indicator is useful because it may be difficult or impossible to know for sure whether such a trade is real, or has been booked fraudulently in an attempt to cover up malicious activity, because the settlement (which would have established this beyond doubt) did not trigger. The indicator can inform that a trade was amended or cancelled before settling, which may indicate that the trade was a dummy trade.

Unexpected Macro Asset Price or Variance Correlation/Cointegration: Test the correlation or cointegration between price or variance of macro assets in a trading book or account against the PNL or variance in the PNL. Correlation is a strong statistical test for a relationship between two variables. Cointegration is a related but slightly different statistical test. Execution of this indicator includes taking a trading book or account and looking for unexpected price correlation/cointegration between the positions held in the account against themed baskets of macro assets. Alternatively, variance correlation/cointegration may be determined by testing the relationship of variance in the PNL to the variance in the macro assets. The macro assets may include instruments that track things like oil price, dollar price, S&P500, interest rates, currencies, hard/soft commodities, equity markets, etc. A raised score would indicate a set of positions has a correlation or cointegration either in price or volatility with a macro asset that is unusual or unexpected given the nature of expected positions in the given book. For example, a US equity book may be expected to high PNL correlation in price and variance with the S&P500, however an emerging markets bond book would not. In this example, there may be potentially risky trading activity if the trader is representing that he is only trading emerging markets bonds, but his positions are correlated to the S&P500. This correlation may thus be found by this indicator. The indicator may be executed based on data spanning a short period of time and/or a long period of time, and may be quite robust to size changes in the period duration.

PNL Smoothing: If PNL appears to have an unreasonably smooth volatility profile given the price volatility of the asset class that is being traded, it may be that PNL is being unreported ('held back') and gradually released over time in order to avoid unwanted scrutiny. This may occur when a trader makes a great sum of money in a short period of time, but desires to hide the PNL from his supervisor so to not have to work or be subject to pressure to generate even more profit. This behavior may thus be identified by this indicator. The indicator may be executed based on daily PNL data, PNL data over longer periods of time (such as a week), or even PNL data associated with individual trades or groups of trades.

PNL Jumps in Line With Compensation/Budget Cycle: A big, positive PNL change that is highly correlated with the trader's compensation cycle may be an attempt from the trader to manufacture an unrealistic picture of their trading results and to benefit personally as a result. The trader may be attempting to portray himself as having a larger PNL than he actually has in order to obtain a bigger bonus, then after the compensation period is over the trader would mark down the trades to have a really big loss. The trader may be hiding trades and then releasing them over time. The trader may be making really risky bets right before the compensation cycle to try and earn a bigger bonus, which may signal undesirable risk-seeking behavior. This indicator may be able to find or identify such behaviors based on a trader's PNL data along with data providing the timing of a trader's compensation or budget cycle. The indicator may be executed on data spanning a short period of time and/or a long period of time, such as over the history of a trader's employment at a firm.

Off-market/Adverse Execution Selection: Trades which are booked away from the market may be an indication of deliberately manufacturing PNL or cash swings to offset or disguise unauthorized positions. For example, a trader may hide a long index futures position, then create an appearance of generating cash by booking a pair of trades (such as a purchase of Apple stock with a sale of Apple stock with a large spread, generating a profit), when in actuality that cash was coming from the futures position. This indicator may be able to find or identify trades that are occurring off the market. This indicator may also be able to find or identify adverse execution selection. The indicator may look at slice of a person's executions. It may calculate what the expected execution cost, or cost of doing business, should be. Then it may calculate the deviation of the actual transaction costs from the expected transaction costs. The deviation from expected transaction costs should be similar against different counterparties. If not, a trader may be conducting adverse execution selection—deliberately booking trades that are bad for the client or the firm, in order to create PNL or cash. The indicator may use the deviation in expected transaction costs from actual transactions costs to find or identify traders who may be committing adverse execution selection.

Trading Away From Bucket VWAP: Using executed trades in the same or similar products near to a particular trade, it is possible to compute a volume-weighted average price (bucket VWAP) as a benchmark of an execution price which should on average be attainable by a trader. If a trader performs a large number of trades away from this price it may be indicative of mismarking. In other words, all the trades in a firm may be aggregated for a particular product, and then divided into buckets by hour or percentage of volume-time. For example, trades in Apple stock may be divided into 10 buckets, and the average price may be calculated for each bucket. Then the indicator may compare the deviation in a trader's execution prices against the characteristics of these buckets. If a trader is frequently doing trades away from bucket VWAP, it shows that a trader is booking trades that are highly different from other trades conducted by the firm in that asset. This could be an indication of deliberately favoring a friend/counterparty (e.g., in order to get a kickback), or the fraudulent manufacture of PNL. The indicator may be able to find or identify this behavior or intent by computing data over a short period of time and/or a long period of time. For example, the indicator may be able to compare a trader's trades to a bucket VWAP over a period of a day. Or the indicator may be able to compare a trader's trades over a period of weeks, in a variety of different assets, to a bucket VWAP or similar benchmark associated with each trade or asset.

Mark Arbitrage: Internal trades between books or internal accounts which have different accounting regimes (in particular transfers to or from one book or account which is mark-to-market and one which is not) hold the risk of mark arbitrage. PNL may be parked in an entity at historical cost to avoid taking mark-to-market PNL. For example, a trader is long Apple stock but the price of the stock is dropping rapidly. Before the trader does the daily mark to market, the trader transfers the position into a fund where the assets are held at cost and not marked-to-market. The trader might be hoping that the market, and the price of Apple stock, comes back, and then he can reverse that trade. This indicator may be able to find or identify the occurrence of mark arbitrage by analyzing the internal trades between books or internal accounts, and these books or accounts may be associated with the trader or as counterparties in a trade.

Control Timing Arbitrage: If different sets of positions are used for processes which run PNL, Risk, Confirmation and Settlement (or more generally front and back office processes), then there is a potential for timing arbitrage of controls, by booking trades, holding positions long enough for certain processes to run, and then cancelling or amending them before others run. For example, a trader may book a trade, cancel it after 7 pm but before midnight (when settlement occurs), and then the trade shows up in the PNL but never goes into settlement. This may create a positive change to the PNL for the trader, which can be used the next time the trader trades. However, trades may trigger this control purely by chance from time to time, and a trade cancellation prior to settlement may be benign. There may be a desire to separate traders who are accidentally breaching this control from the traders who are consciously practicing control timing arbitrage. This indicator may count up the number of times people seemingly perform control timing arbitrage, in order to compensate for the occasional, natural occurrence of cancelled accidental trades.

Internal Transfers With PNL: Internal trades should not generally involve non-zero PNL in a mark-to-market accounting regime. Therefore internal trades which are done off-market, or internal bookings between fungible products (including ETF creation and redemptions) which create unexpected PNL should be subject to enhanced scrutiny. Since internal trading may be determined by counterparties, the indicator may reference a list of internal counterparties or books/accounts associated with internal counterparties. The indicator may determine that an internal trade has occurred if the trade was associated with an internal counterparty. The same scrutiny would apply to internal trades between accounts in different corporate entities within a single parent institution.

d. Descriptions of Scenarios

A scenario may be a specific combination of indicators which can be used to detect, confirm, or deny particular hypotheses, typically concerning the presence of potential unauthorized trading. A scenario may be used to ascertain a particular pattern. If all the elements in that pattern are observed, it may indicate that a specific risky trading incident is occurring. Thus, while an indicator may be a synthesis of inputs in a way that highlights a particular measurement which may be related to risky or unauthorized trading, a scenario may be a particular combination of data which specifically relates to a particular hypothesis of how unauthorized trading may occur.

Some examples of scenarios, examples of the data used to compute them, and descriptions of their purpose are provided below:

| Scenario | Examples of Data Used |
| --- | --- |
| Suspicious Badge Activity | Badge data (badge-in and badge-out times), trade data (times trading occurred) |
| Trading When Absent | Badge data (badge-in and badge-out times), trade data (times trading occurred) |
| Suspicious Remote Trading | Trade data (times trading occurred), User logs, System access data, badge data |

Suspicious Badge Activity: This scenario may be associated with patterns in the building's security badge data which are unusual and which coincide with activity indicating heightened potential for unauthorized trading (e.g. A person badges out at a normal time, badges back in late at night and books some trades). Such behavior might be an attempt to evade suspicion or review of supervisor. This scenario may be determined through the use trade data in conjunction with badge data, as badge data on its own is insufficient because a trader might be badging back into the building at an unusual time in order to pick up something they left in the building.

Trading When Absent: A person trades at a time when they are not physically badged in. This may indicate credential sharing or trading from a venue without adequate physical supervision (e.g. trading from home). This scenario may be determined through the use of badge data in conjunction with trade data. The timing of trading may be compared against the times that a person is physically badged in to determine if the person is trading while absent.

Suspicious Remote Trading: This scenario may occur when a trader is booking trades from home, or remotely at a location that is not the primary trading venue, in order to evade supervision. For example, a London-based trader on a non-business trip to NY may stop in the NY office and book trades. In this case, risky trading may be difficult to detect since the trading is occurring at a different location from where their supervisor is based. The scenario may be able to determine the presence of suspicious remote trading by comparing trade timing to badge data (i.e., trader was badged-out) and account/user access logs (i.e., trader was signed into their trading account).

e. Description of Embodiments

FIG. 11 is a flowchart of an example method of data clustering and analysis to provide enhanced detection of risky trading behavior, according to an embodiment of the present disclosure. This embodiment shares the common goal of detecting risky trading behavior like many of the other embodiments disclosed herein, but also shows how the use of indicators or scenarios can greatly enhance the detection of risky trading activity.

At block 1102, the system selects a seed based on a list of seeds or a seed generation strategy. Some examples of seeds involve traders in the firm, traders in the firm suspected of risky trading, traders responsible for managing an amount of money over a particular amount, suspicious trading accounts, suspicious trades, and so forth. Afterwards, the system proceeds to block 1104, where the system may determine the desired indicators or scenarios used to analyze or score the data clusters, which may be associated with specific data clustering strategies. In other words, a selected indicator or scenario may require very specific data items in order to be calculated. Thus, the kinds of data in the data cluster may be determined by the selected indicator or scenario. The data cluster may be tagged in a manner that discloses to the system any data clustering strategies, indicators, scenarios, and analysis rules/criteria that may be associated with the data cluster. Various types of trade-related data 1106 can be used by the system in order to compute the indicators or scenarios. For example, 1106-1 is counterparty data. This data may include the counterparties in trades associated with the seed. Asset performance data 1106-2 may include price data, volatility data, volume data, and so forth, for the assets in positions or trades associated with the seed. Badge activity data 1106-3 may include the building's security badge data for the seed, such as occurrences and times when the person swiped in or out of particular readers. Trade activity data 1106-4 may include data related to all the trades or positions associated with the seed. For instance, it may include trade execution times, trade prices, details of each trade such as the assets purchased/sold, exchange identifiers, and so forth. The trade activity data 1106-4 may also include the names or identifiers of counterparties in each trade. However, that does not necessarily make counterparties data 1106-1 redundant. Counterparties data 1106-1 may be a list of counterparties internal to the firm, or data associated with internal counterparties. By comparing the counterparty attribute in the trade activity data 1106-4 to the list of internal counterparties provided in counterparties data 1106-1, the system may be able to determine whether a trade was an internal trade conducted between parties internal to the firm. PNL Statements data 1106-5 may include cumulative, historical, or current PNL data associated with the seed or the seed's trading accounts. It may also include PNL statements for specific trades, groups of related trades, or trades that occurred over a time period. Third party data 1106-6 may include any other data that may be useful in computing the indicators or scenarios. It may come from data external to the firm, and may have to be purchased or obtained from an outside party. For example, third party data 1106-6 may consist of asset performance related data that was not included in asset performance data 1106-2. The firm may not keep all relevant asset performance data internally, especially for more obscure financial instruments. Thus, it may be necessary to obtain missing data from third parties.

After determining the types and sources of trade-related data needed to perform the various indicators and scenarios, at block 1108 the system gathers that trade-related data and generate one or more data clusters based on the data clustering strategies that are associated with the selected indicators or scenarios. Gathering the trade-related data may involve searching through various databases in order to collect the data, before putting the data into clusters. Alternatively, the data clusters may not always be duplicating the data that is being gathered from the various databases. The data clusters may include references to the data in the various databases. For example, the data clustering strategy may not copy over the asset performance history of Apple stock involved in a trade into the data cluster, if that data is frequently used and common to more than one data cluster. Thus, the data clustering strategy may involve searching for the asset performance history and creating a reference to the database location storing that data within the data cluster.

After the one or more data clusters are generated, at block 1110 the system analyzes and scores the data clusters using various indicators or scenarios, such as the various indicators or scenarios that have been disclosed above. The analysis and scoring may be used to generate conclusions, alerts, or reports that may make it easier for a reviewer to interpret and detect the presence of risky trading behavior. This reflects how risk alerts are practically consumed by risk analysts or supervisors. Typically, a supervisor just sees an alert on the trade (and not the underlying data). For instance, they might see that the trade is with a suspicious counterparty, the trade has been amended, and the trade is over a certain size.

The various scores, alerts, reports, conclusions, data clusters, dossiers, or data in the data clusters may be outputted to a user interface by the system at block 1112. Examples of such a user interface are provided herein, but can be seen in many of the applications referenced in this disclosure. More examples of such user interfaces can be seen in U.S. patent application Ser. No. 14/278,963, filed Apr. 5, 2014, and titled "Clustering Data Based On Indications Of Financial Malfeasance." Although a supervisor may naturally gravitate towards reviewing the dossiers (including various alerts and/or reports, as described in detail below) outputted to the user interface, the user interface may also contain the ability to get a closer look at the data in particular data clusters that were used to generate the dossiers (including the alerts and/or reports). Thus, the system may provide the option for the supervisor to conduct a deep dive or investigation of the data in the dossiers (such as honing in on a specific suspicious trade, as described below), in order to confirm an alert or report, or to just obtain a deeper understanding of any potential risky trading behavior that may be occurring.

At optional block 1114, the system may also rank the data clusters outputted to the user interface based on any score associated with the data clusters. This may be done in order to allow the system to prioritize data clusters/alerts, and to enable an analyst to first review the data clusters/alerts associated with the trader seeds that are most likely to be committing risky trading behavior as determined by the system. However, optional block 1114 need not be conducted by the system at the very end as depicted in this figure. In some embodiments, the system performs optional block 1114 after block 1110 and before block 1112. The clusters are ranked prior to outputting all the results to the user interface. In some embodiments, the system performs optional block 1114 both before and after the data clusters and/or alerts are outputted to the user interface at block 1112. This is to provide the option to the analyst or reviewer to sort the data clusters/alerts by score, if desired, at any time via the user interface.

FIG. 12A is a flowchart of an embodiment of the data clustering and analysis system, wherein a single data cluster is generated for each seed and contains all the trade-related data needed to compute the various indicators and scenarios. By only generating a single data cluster for each seed, the efficiency of the system is improved.

At block 1202, the system automatically selects a trader data item to be used as a seed. Alternatively, the trader data item may be selected by an analyst. The trader may be selected from a group of trader data items, represented as list of traders 1204. Alternatively, list of traders 1204 may actually be a list of trader names, such as the list of names of all traders internal to the firm. At block 1202, the system then uses a selected trader as a seed in a data clustering strategy to associate trading accounts and trades into the data cluster.

In either case, once a trader or trader name has been selected as a seed, at block 1206 the system generates a data cluster containing trade-related data associated with the seed. The data cluster may be generated by consulting various data clustering strategies 1208. There may be many data clustering strategies associated with many indicators or scenarios, and the data clustering strategies may be combined into one strategy. Or there may be a single data clustering strategy designed to create a data cluster with all the necessary data needed to compute all the indicators or scenarios. Or, in another embodiment, there may be many data clustering strategies associated with many indicators or scenarios and many data clusters may be initially generated, before being merged together into one data cluster. There may be a singular data cluster associated with the seed at the end of block 1206, which allows for improved efficiency due to the reality that many of the indicators or scenarios described above have overlaps in the data needed to compute them. For example, the "PNL Smoothing" Indicator may require PNL data. The "PNL Jumps in Line With Compensation/Budget Cycle" Indicator may also require PNL data, possibly in combination with compensation/budget cycle data. It may be less efficient for each indicator to be performed on its own data cluster, since that would mean two separate data clusters, each containing PNL data. This loss of efficiency may be reduced if the data clusters do not actually contain PNL data, but rather references or links to where the actual PNL data is stored. Alternatively, efficiency may be gained as the figure depicts, by having a singular data cluster that contains all the data needed to perform the indicators (in this example, it would contain at least PNL data and compensation/budget cycle data). This would require data cluster generation to only occur once for each seed.

The user may be able to select desired indicators and scenarios, which would affect the data clustering strategies used and the makeup of data within the data cluster. Afterwards, since the data cluster would have all the data needed for calculating all the indicators and scenarios, the actual analysis and scoring with all the indicators and scenarios can be done in parallel.

At block 1210, the system may access the all the configured indicators and scenarios and the analysis rules, criteria, or strategies that define them. Alternatively, the system may also just access the rules, criteria, or strategies of desired indicators and scenarios. Using those definitions, the system at block 1212 would compute the various indicators and scenarios to analyze the data cluster. Then, at block 1214 the system scores the data cluster for risky trading behavior, using data cluster scoring strategies. The scoring strategies may rely on the computer results for the indicators and scenarios. For example, there may be an overall risk score associated with risky trading that is generated by taking into account all the indicators and scenarios, along with any other relevant data. Along with scoring the data cluster, the system may also create alerts or conclusions for the data cluster that are designed to quickly communicate a summary of the analysis to an analyst or user. These results may all be sent to a user interface for easy interpretation and review.

FIG. 12B is a flowchart illustrating a different embodiment of the data clustering and analysis system, where a data cluster is generated for each desired indicator and/or scenario.

At block 1202, the system selects a trader data item, or a trader name, to use as a seed. The trader may be selected from a list of traders 1204. Afterwards, the system at block 1216 may optionally allow for selection of the desired indicators or scenarios for use in the analysis. The system may also optionally allow for making any modifications to the data clustering strategies 1220 associated with each indicator or scenario at block 1218.

At block 1222, the system may then use the data clustering strategies 1220 associated with the chosen indicators and scenarios, and generate a different data cluster for each indicator or scenario. Once the data clusters are generated at this step, the data clusters may optionally be merged prior to block 1212 so that the calculations for the indicators and scenarios do not need to be done on redundant sets of data.

If the data clusters were merged into a single data cluster, then at block 1212 the system would analyze the single data cluster for risky trading behavior using the indicators and scenarios before being scored for risky trading behavior at block 1214. However, if there is no cluster merging as shown in this figure, then the system at block 1212 would analyze each individual data cluster for risky trading behavior based on the corresponding indicator or scenario that influenced the generation of that data cluster. At block 1214, the system then scores each individual data cluster for risky trading behavior, along with generating any relevant alerts or conclusions. These results can be passed onto the user interface for easier interpretation. Both embodiments shown in FIG. 12A and FIG. 12B may be memory efficient in their own way. The embodiment shown in FIG. 12A may be memory-efficient because the data clustering is performed once for each seed. Even if there are many different data clustering strategies 1208 for each seed, with each data clustering strategy having overlaps, the system may only generate one single data cluster associated with the seed. That single data cluster may have no redundant data items while still containing all the necessary information to perform all the indicators and scenarios. The embodiment shown in FIG. 12B may be memory-efficient in a different way, because desired indicators or scenarios may be selected, and the data clustering strategy associated with the desired indicators or scenarios may be modified on-the-fly. Furthermore, generating multiple data clusters associated with various indicators and scenarios may be memory-efficient if the analysis is being performed in a parallel or distributed manner, but each data cluster may only be accessed by a single computer, processor, or thread.

FIG. 12C is a flowchart illustrating the holistic, data-driven features available in an embodiment of the data clustering and analysis, once data clusters, cluster scores, alerts, and conclusions are passed to the user interface.

At block 1224, the system combines the step of analyzing and scoring the one or more data clusters, which was previously described as two steps in the discussions of FIGS. 12A and 12B (block 1212 and 1214).

All the data cluster details, cluster scores, alerts, and conclusions are outputted to the user interface by the system in block 1226. The user may interact with the user interface at block 1228 in the system, in order to focus on specific portions of the analysis. For example, a user may be unsatisfied by the information learned about a specific data cluster via its risk score or conclusion. Instead, the user may choose to perform a deeper investigation and begin looking at the data in the data cluster itself. The user may decide to view all the details of a particularly suspicious trade via the user interface.

Through the user interface, block 1230 of the system may be used to generate a report. This feature allows alerts and reports to be generated and pushed up to supervisors or regulatory investigators to review. The reports may be summaries of the analysis and may not be as detailed as what was originally available through the user interface at block 1226 of the system. For example, the reports may not offer the ability for a supervisor to review individual trades. Alternatively, the reports may be interactive and may include functionality similar to that described herein to the various user interfaces (including the dossier user interfaces described below).

Through the user interface, block 1232 of the system may also allow for collection feedback used in future scoring or to improve the system. Various vehicles and strategies may be implemented for obtaining this user feedback. For example, the system may offer a thematic review that allows formal measurement of how effective the controls, triggers, indicators, and scenarios are. A formal proposal can then be provided containing feedback on how those controls can be threatened. Another source of this feedback may be through informal feedback, where users provide their own individual thoughts on a particular type of alert or feature. Another source of this feedback may be via supervisory feedback, where the feedback of supervisors is analyzed to see whether a supervisor is dismissing a certain alert type that may frequently be generating false-positives. The behavior that users exhibit with alerts (such as sending them to others) may provide much information on their effectiveness.

For instance, if the conclusion is that a given alert is not useful, then the alerts, scenarios, or indicators and their definitions can be updated in the system at block 1234. At block 1234, the system may allow for updating the alerts, scenarios, or indicators based on the feedback received from block 1232. A data-driven approach to updating and improving components of the system allows this system to rapidly improve in detecting risky trading behavior over time.

FIG. 13 is a diagram that maps out some example clusters that can be generated according to one embodiment of the system.

In the figure, trader data item 1302 is a trader that is being used as a seed. A data clustering strategy may be configured to generate a first data cluster 1304. Within this data cluster 1304 may be building security badge data 1308 associated with trader 1302. There may also be cumulative PNL data 1310 associated with trader 1302. However, badge data 1308 and cumulative PNL data 1310 associated with trader 1302 may not be sufficient for calculating determinative indicators or scenarios. This data may need to be compared against trade data from trades performed by trader 1302 in order to be useful. Data cluster 1304 may then also include trade no. 4554545, or trade 1312, which was performed by trader 1302 and associated with trader 1302. That data item may include information such as execution time or price of the trade. Trade 1312 may be associated with a PNL data item 1314 for the trade. Trade 1312 may also be associated with asset performance data 1316 for the trade, which may include prices, variance, and any other relevant data related to the assets involved in the duration of trade 1312.

In order to perform scoring or analysis with certain indicators or scenarios, the system may require additional information than what is contained in first data cluster 1304. The data clustering strategy could then expand the data cluster to second data cluster 1306.

Data cluster 1306 further includes counterparty data 1318, which is data related to a counterparty of trader 1302 on trade 1312. Counterparty data 1318 may be useful in its own right, for example in detecting trades being committed internally. If counterparty 1318 is actually a trader internal to the same firm as trader 1302 used as the seed, then that would signify that trade 1312 was an internal trade. Counterparty 1318 may also have trades, trading accounts, and so forth that are only associated with counterparty 1318 and not trader 1302. Those potential data items are represented as data 1320, which while not immediately relevant to data cluster 1306, can be gathered into a broader data cluster if needed.

Both counterparty 1318 and trader 1302 may also be associated as counterparties to trade 1322 (trade no. 4353434), so trade 1322 is included into data cluster 1306. The PNL data 1324 and asset performance data 1326 associated with trade 1322 may also be gathered into the cluster, if that data is necessary to be in the cluster for performing certain analyses or calculations. Trade 1322 may be related in some manner to trade 1326 (trade no. 4654565), another trade performed by trader 1302. For example, trade 1326 may belong to the same family of trades as trade 1322. Data cluster 1306 may then also include PNL data 1328 and asset performance data 1330 associated with trade 1326.

Yet another trade, trade 1332 (trade no. 4353453) may be associated with trader 1302 and gathered for inclusion into data cluster 1306. Associated with trade 1332 may be PNL data 1334 and asset performance data 1336. The individual trade PNLs and asset performance data for all the trades in cluster 1306 (trade 1312, 1322, 1326, and 1332) may have been included due to their importance in performing certain analyses or calculations, such as calculations involving a specific indicator or scenario. Trade 1332 may be associated with yet more data 1338 (not illustrated) that may be included in data cluster 1306, such as counterparty data. If data 1338 is important to the desired analysis, then data 1338 may be included into a data cluster based on a different data clustering strategy. However, data 1338 was not included into data cluster 1306, presumably because it was not important in the desired analysis.

XI. Cluster Linking, Regeneration, and Merging a. Linking of Related Alerts/Clusters FIG. 14 is a flowchart of an example method of linking related alerts or data clusters, according to an embodiment of the present disclosure. As described above, when clusters are regenerated, if two clusters of the same type have common data items, the two cluster of the same type may then be merged. However, when two clusters having different cluster types include common data items, they are not generally merged. In order to notify the analyst that two data clusters of different types have common data items, the example method of FIG. 14 may be executed by the system. Such a notification may advantageously enable an analyst, for example, to find additional connections in the context of an investigation. For example, the analyst may discover that an item of malware associated with a malware cluster is hosted at a website that is linked to by phishing emails in a phishing cluster. Or for example, the analyst may discover that two traders have been conducting risky trading behavior with the same counterparty.

Figure 22:
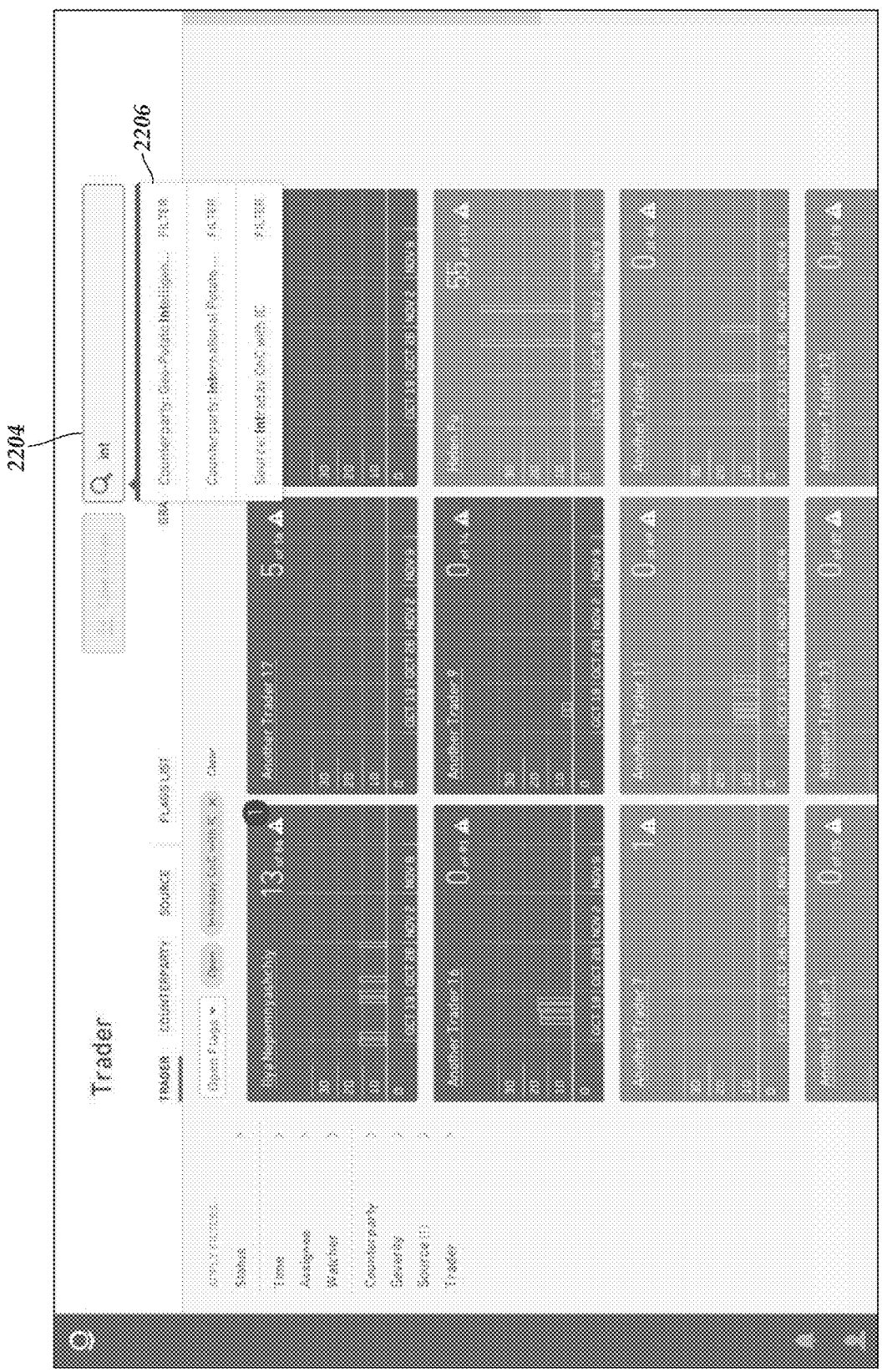

In the example method of FIG. 14, at block 1402, the system finds or determines clusters of different cluster types (for example, that were generated according to different clustering strategies) that have common data items (and/or other information). At optional block 1404, a link between the related clusters/alerts may be generated. FIG. 22 in U.S. patent application Ser. No. 14/579,752—filed Dec. 22, 2014, titled "SYSTEMS AND USER INTERFACES FOR DYNAMIC AND INTERACTIVE INVESTIGATION OF BAD ACTOR BEHAVIOR BASED ON AUTOMATIC CLUSTERING OF RELATED DATA IN VARIOUS DATA STRUCTURES", and previously incorporated by reference—illustrates an example data cluster analysis user interface 2202 in which related alerts or data clusters are linked to one another, according to an embodiment of the present disclosure. That figure has link 2404, which provides links from the current alert/cluster to two other related alerts/clusters. The analyst may then select one of the links (for example, either "Cluster ABC" or "Cluster XYZ") to view the alert pertaining to that cluster. In an embodiment, an indication of the common data items among the clusters is provided in the user interface.

Turning again to the example method of FIG. 14, at optional block 1406 the clusters/alerts may be merged. For example, rather than simply linking among related alerts (as in FIG. 22 of U.S. application Ser. No. 14/579,752), the system may combine the alerts into a single alert user interface.

Further, in the example method of FIG. 14, at optional block 1408, the analyst may be notified when two clusters/alerts are linked or related. For example, the analyst may be notified via a popup message displaying in the analysis user interface, via an email or other message, and/or via any other appropriate communications method.

b. Regenerated Clusters/Alerts

In an embodiment, when a cluster is regenerated, as described above with reference to block 1006 of FIG. 10A, an alert may be updated, the analyst may be notified, and/or a new alert may be generated. FIG. 15 is a flowchart of an example method of updating alerts in response to cluster regeneration, according to an embodiment of the present disclosure. At block 1502 of the example method shown, a cluster has been regenerated. At block 1504, the system determines whether any changes have been made to the cluster (for example, any new data items added to the cluster). If not, then at block 1506 the alert corresponding to the cluster is not updated and the method ends. If so, then at block 1508 the system determines whether the analyst has viewed and/or archived the alert corresponding to the cluster. If not, then at block 1510 the alert is updated such that the cluster analysis is rerun, and the alert data (for example, the conclusions) is regenerated, on the new cluster including the new data items. In this block, as the analyst has not previously interacted with the alert, no notifications regarding changes to the alert/cluster are provided. If the analyst has viewed and/or archived the alert, then at blocks 1512 and 1514 the alert may be updated, changes to the alert may be shown in the alert user interface, and/or a new alert may be generated and links between the new and old alerts may be generated and provided in the alert user interfaces. For example, if the analyst was to select an old alert that had been superseded due to cluster regeneration, the system may automatically forward the analyst to the new alert and display a message such as "You have been redirected to the most recent version of this alert. Return to alert 277." Selection of "Return to alert 277" may cause the old alert to be displayed, where a message may be included such as "There is a more recent version of this alert," (which may link to the new alert).

In an embodiment, when regenerated clusters of a same cluster type are merged, alerts corresponding to those previous two clusters may be merged and updates may be displayed, and/or a new alert may be generated (and linked to from the old alerts) as described above.

In an embodiment, the system may provide a data feed including timely updates (including analysis information) on any changes to any previously generated clusters, and/or any newly generated clusters.

XII. Cluster Tagging and Grouping

FIGS. 16-26, described below, illustrate methods and user interfaces of the data analysis system, according to various embodiments, in which data clusters are automatically tagged, grouped, analyzed, and presented to an analyst such that the analyst may quickly and efficiently evaluate the groups of clusters. In particular, as described below the data analysis system may apply one or more tagging criteria or rules to the data clusters so as to tag clusters of data items and then group the data clusters according to similar tags. A data cluster may be tagged with multiple tags. Groups of similarly tagged clusters may be presented analyzed and displayed in an analysis user interface through which the analyst may evaluate the groups of clusters and/or access more detailed data related to the cluster. The analyst may dynamically view clusters grouped according to different tags and/or tag types. In an embodiment, the cluster type associated with each cluster may be used as a factor to determine cluster tags and/or tag types, and may be determined according to the cluster strategy by which the cluster was generated. The analyst may filter the groups of clusters based on various criteria, and various analysis techniques may be applied to the groups of clusters and presented in the analysis user interface. As mentioned above, the term "dossier" is used herein to refer to a group of clusters (for example, clusters grouped according to similar tags) and/or the analysis user interface displaying information associated with a group of clusters.

The various methods and user interfaces described below in reference to FIGS. 16-26 may be implemented by various aspects of the data analysis system (for example, the server computing system 110 and/or another suitable computing system) as described above. For example, clusters may be tagged by, for example, the cluster/rules engine 120; analysis of cluster groups (also referred to herein as dossiers) may be accomplished according to analysis rules/criteria 880 as implemented by, for example, the cluster/rules engine 120; and user interfaces may be generated and/or presented to the analyst by, for example, the user interface engine 126; among other aspects.

Additionally, in the methods described in reference to the flowcharts of FIGS. 17-19 below, in various embodiments, fewer blocks or additional blocks may be included in the example methods depicted, or various blocks may be performed in an order different from that shown in the figures. Further, in various embodiments, one or more blocks in the figures may be performed by various components of the data analysis system, for example, server computing system 110 (described above in reference to FIG. 8) and/or another suitable computing system.

a. Example Method of Cluster Tagging, Analysis, and Grouping

FIG. 16 is a flowchart of an example method of data cluster tagging, analysis, and grouping, according to an embodiment of the present disclosure. In FIG. 16, block 910, 920, 1002, 1004, 1006, 1006*a*, 1006*b*, 1006*c*, and 1008 of the flowchart proceed generally as described in reference to the flowchart of FIG. 10A above.

For example, at block 910 seeds are generated according to one or more seed generation strategies. Examples of seed generation strategies are described in the various related applications listed above and previously incorporated by reference herein. Examples include identifying emails or chats related to bad behavior by traders, identifying tax returns that are potentially fraudulent, identifying communications that are potentially associated with beaconing malware, and/or identifying emails potentially associated with phishing campaigns, among others. Further, at block 920 clusters are generated based on the one or more generated seeds and according to the one or more cluster generation strategies. Examples of cluster generation are described in the various related applications listed above and previously incorporated by reference herein. Examples include strategies for trader oversight, financial fraud detection, tax fraud detection, beaconing malware detection, malware user-agent detection, other types of malware detection, activity trend detection, health insurance fraud detection, financial account fraud detection, detection of activity by networks of individuals, criminal activity detection, network intrusion detection, detection of phishing efforts, money laundering detection, and/or financial malfeasance detection, among others.

At block 1002, the system generates "alerts" for each of the clusters, as described above in references to FIGS. 10A and 10B. In particular, each alert includes various types of information related to the cluster that may be useful to an analyst in evaluating the importance or criticality of the cluster in the context of a particular investigation. Generating an alert may include applying various cluster analysis rules or criteria to analyze the cluster and so as to generate human-readable cluster conclusions, as mentioned above. Generating an alert may further include generating an alert score for the cluster. In an embodiment, the system may not generate human-readable cluster conclusion.

At block 1602, clusters are tagged with one or more tags related to the cluster and/or the clustering strategy. Tagging a cluster may include determining a type of the cluster, determining types of tags associated with the type of cluster, and determining tag values based on an analysis of the cluster. Details regarding cluster tagging are described below in reference to FIGS. 17-19.

At block 1604, clusters are grouped (a process that is also referred to herein as generating dossiers) according to similar tags. For example, two clusters both tagged with "trader 1" may be grouped into a single dossier. Details regarding cluster grouping are described below in reference to FIG. 19.

At block 1004, a dossier analysis user interface is provided to the user (for example, an analyst). The dossier analysis user interface is generated similar to the cluster analysis user interface described above in reference to FIG. 10A. However, the dossier analysis user interfaces provided in reference to FIG. 17 include information associated with groups of clusters (dossiers), rather than individual clusters.

In various embodiments the analyst may select criteria upon which clusters may be grouped and displayed in the user interface.

For example, in the context of investigations of trader oversight, the analyst may select to group clusters according to trader, book, desk, and/or any other type of tag associated with the clusters. In another example, in the context of cyber security (for example, malware and/or phishing detection) the analyst may select to group clusters according to person, employee, email address, computer, and/or the like. In another example, in the context of pharmaceuticals the analyst may select to group clusters according to machines (for example, alerts may be generated when there is an error on a manufacturing machine).

In an embodiment, clusters may be grouped according to cluster type and/or alert type. Advantageously, according to various embodiments, the analyst may dynamically and interactively change cluster groupings to efficiently investigate large quantities of related data items. Examples of dossier analysis user interfaces are described in further detail below in reference to FIGS. 20-27.

At blocks 1006, 1006a, 1006b, and 1006c, the system regenerates previously generated clusters as described above in reference to FIG. 10A. Advantageously, clusters are automatically tagged, and groups of clusters are automatically and efficiently generated, as clusters are regenerated based on new data items received by the system.

Additionally, at block 1008 clusters are optionally merged as described above in reference to FIG. 10A. However, in an embodiment, while clusters may be merged as described above, clusters may not be merged based on similar tags. Rather, clusters with similar (or the same) tags are maintained as separate clusters. Advantageously, not merging clusters based on tags enable rapid and efficient re-tagging of clusters as the clusters change, and tagging of clusters with multiple tags of one or more types of tags.

b. Example Method of Cluster Tagging

FIG. 17 is a flowchart of an example method of cluster tagging, according to an embodiment of the present disclosure. At block 1702, the system accesses data, including data items and related metadata and other information, of the data cluster. At block 1704, the system determines the cluster type of the data cluster. As mentioned above, a data cluster generated according to a given clustering strategy (and its associated seed generation strategy or strategies) may be understood as having a "cluster type" (also referred to as a "data cluster type") corresponding to that clustering strategy.

At block 1706, having determined the cluster type of the data cluster, the system accesses one or more cluster tagging rules or criteria associated with that cluster type. As various data clusters may be generated according to different clustering strategies, and each of the clustering strategies may be associated with differing types of investigations, the tagging rules or criteria used to analyze the clusters vary according to the cluster types and their respective associated types of investigations.

At block 1708, the system analyzes the data cluster based on the accessed tagging rules/criteria. The cluster data is then evaluated by the system (for example, by the cluster/rules engine 120) according to the tagging rules/criteria. Evaluation of the cluster for tagging proceeds similar to the process of cluster analysis for alert generation as described above, and may vary according to a context of the investigation. Tags are determined based on data items, and associated metadata, in the cluster. Further, clusters may be tagged based on the cluster type and/or one or more items of information related to the previously generated alerts. For example, a cluster may be tagged according to an alert score associated with the cluster, and/or one or more reasons for the alert score. In an embodiment, cluster tags include both a tag type and a tag value, as described below in reference to FIG. 19. At block 1710, the determined tags are associated with the cluster.

FIG. 18 shows examples of cluster tag types. As shown, various tag types may be associated with one or more cluster types (or clustering strategies). Additionally, a value may be associated with each tag type based on the analysis of the cluster, as described above and below. For example, in the context of trader oversight, clusters may be tagged based on trader, book, and/or desk. In the context of phishing detection, clusters may be tagged based on user, email address, computer, and/or IP address. In the context of tax fraud detection, clusters may be tagged based on computer, IP address, and/or physical address. These tag types are given as examples, and any other tags and/or tag types may be applied to clusters in various contexts.

Values associated with each tag type may be determined based on the analysis of the cluster, as described above. For example, in the context of trader oversight, a given cluster may include data items representing two identified traders: trader 1 and trader 2. Accordingly, the cluster would be tagged as follows: "trader: trader 1" and "trader: trader 2". Additionally, the cluster may indicate trades associated with trading book 10, and that the traders are associated with desk 23. Accordingly, the cluster would also be tagged as follows: "book: book 10" and "desk: desk 23".

As also shown in FIG. 18 and described above, a cluster may be tagged according to a cluster type (clustering strategy), a clustering sub-strategy, an alert type, and alert score, and/or the like. For example, a cluster may be tagged according to its type such as "Internal Phishing", "Trader Oversight", "Tax Fraud Detection", and/or the like. Further, in various embodiments, various clustering strategies may be associated with one another, and/or a clustering strategy may include one or more sub-strategies and/or alert criteria. Such aspects may also be used as a basis for tagging a cluster. For example, the clustering strategy "trader oversight" may be related to one or more other clustering strategies and/or sub-strategies that also cluster data items to detect bad behavior by traders, such as strategies to detect out-of-hours trades and/or deviations in orders (for example, deviations in actual traders from client orders). Clusters may also be tagged according to such sub-strategies. Additionally, clusters may be tagged according to alert types and/or alert scores.

In various embodiments, a given tag type may be applied to a cluster multiple times, or not at all, based on the cluster analysis.

In an embodiment, a cluster tag may comprise an item of metadata associated with the cluster, and stored in a data store along with the data items and/or the cluster data.

c. Example Method of Cluster Grouping/Dossier List Generation

FIG. 19 is a flowchart of an example method of dossier list generation, according to an embodiment of the present disclosure. As described above, the system groups clusters according to tags associated with the clusters to generate dossiers. Dossiers are displayed in dossier analysis user interfaces of the system to enable an analyst to efficiently and rapidly analyze large quantities of related data items. Clusters may be dynamically grouped and re-grouped, filtered, and/or otherwise analyzed via the dossier analysis user interfaces.

At block 1902, the system receives an indication of a tag type by which to group the clusters. For example, and as described in references to FIGS. 20-26 below, the analyst may select to group clusters according to one or more tags types, such as trader, book, user, computer, IP address, or the like.

At optional block 1904, the system receives an indication of one or more filters to apply to the clusters. For example, the analyst may select to filter the clusters according to one or more other tag types and/or tag values, data items of the groups of clusters, and/or various other criteria. At optional block 1906, the system filters the clusters according to the indicated filters.

At blocks 1908 and 1910, the optionally filtered clusters are grouped according to the indicated tag type. Clusters having a same value of the tag type are grouped together. For example, if the clusters are grouped by "trader", two clusters both tagged with "trader: trader 1" will be grouped together. In another example, if the clusters are grouped by "cluster strategy", two clusters both tagged with "cluster strategy: out-of-hours trades" will be grouped together. In some embodiments, clusters having similar tag values may be grouped together. For example, the system may employ a fuzzy matching algorithm to determine tag values that are sufficiently close to each other that the respective associated clusters may be grouped together (to account for, for example, typos and/or other errors in the tags).

As described below, the system automatically and dynamically updates the cluster groupings in response to user inputs. For example, in response to any changes to the indicated tag type, or filters to apply to the clusters, the system may automatically re-filter and/or re-group the clusters and update a user interface.

d. Example Dossier User Interfaces

FIGS. 20-27 illustrate example dossier analysis user interfaces of the data analysis system, according to embodiments of the present disclosure. In various embodiments, aspects of the user interfaces may be rearranged from what is shown and described below, and/or particular aspects may or may not be included. However, the embodiments described below in reference to FIGS. 20-26 provide example dossier analysis user interfaces of the system.

Figure 20:
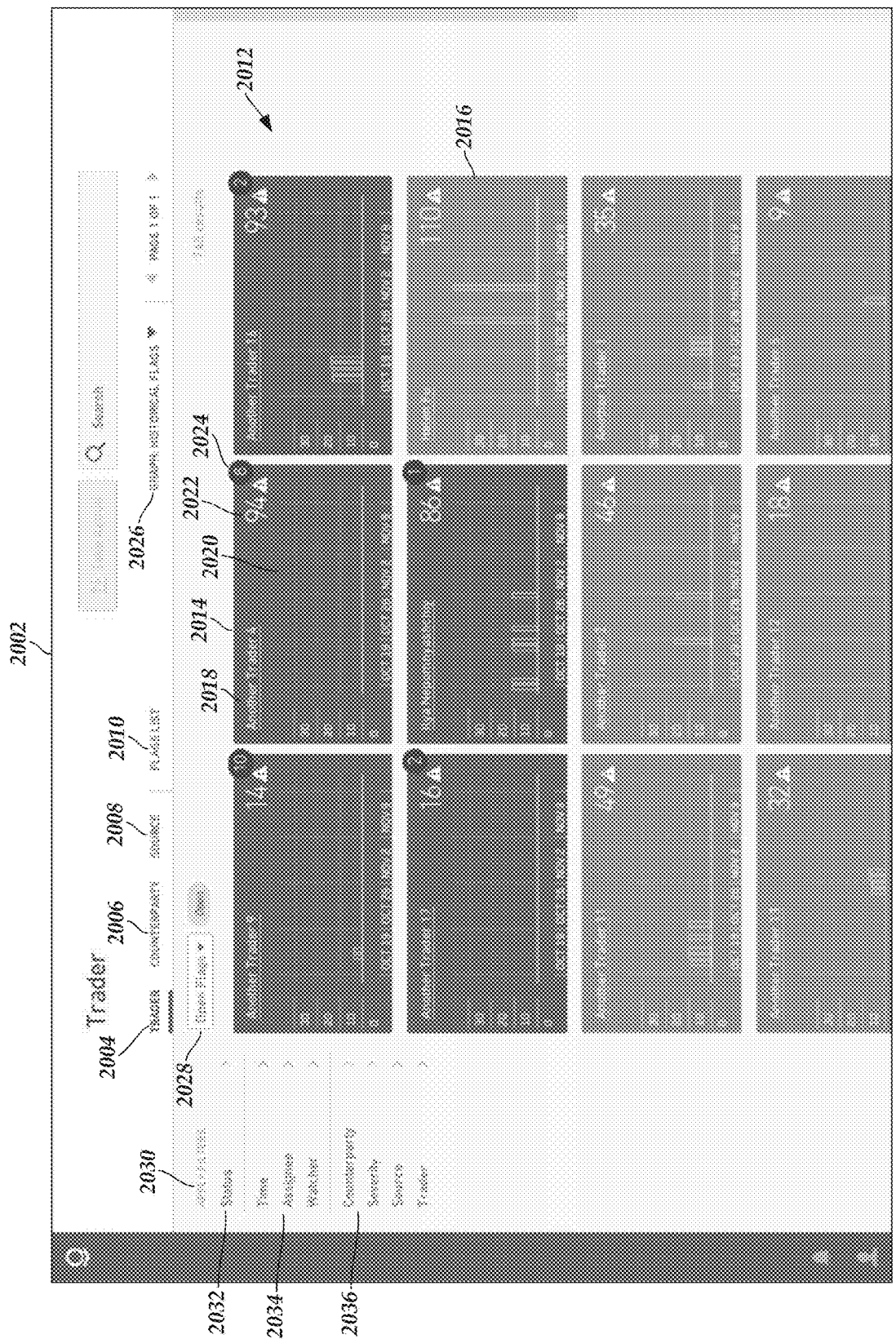

FIG. 20 illustrates a user interface 2002 of the system in which various dossiers, or groups of clusters, are interactively displayed to the user. The user interface 2002 includes a display portion 2012 with multiple user-selectable colored tiles (for example, tiles 2014 and 2016), each tile representing a dossier (or group of clusters). The user interface 2002 also includes various user controls for causing the system to re-group the clusters, filter the clusters, apply statuses to the dossiers, and/or the like. While the user interface 2002 is configured for display of dossiers related to trader oversight, the user interface 2002 may be configured for any other application, as described above.

The user interface 2002 includes user-selectable controls 2004, 2006, and 2008 for grouping the clusters according to different tag types. For example, the user has selected 2004, "trader", as the tag type upon which to group the clusters. Accordingly, the system has grouped the clusters according to values associated with trader tags on each of the clusters. Each of the tiles of display portion 2012 therefore represents a dossier associated with each particular trader. For example, tile 2016 represents a dossier associated with trader "Helen Fu". Tile 2014, on the other hand, represents a dossier associated with trader "Another Trader 4". Each dossier includes all grouped clusters, and associated data items and alerts, associated with each trader. Additionally, each tile shows various information associated with each respective dossier to enable an analyst to quickly triage and analyze the dossier. The user may select a tile to view additional detailed information associated the respective dossier, as described below in reference to FIG. 24.

In an embodiment, selection of control 2006 causes the clusters to be grouped according to a "counterparty" tag, while selection of control 2008 causes the clusters to be grouped according to a "source" tag (for example, a clustering strategy, clustering sub-strategy, and/or alert type).

The user interface 2002 additionally includes a user selectable control 2010, "flag list", while the user may select to cause the system to display a list of alerts, as described below in reference to FIG. 25.

As mentioned above, each of the tiles of the display portion 2012 includes various details associated with the respective dossiers. For example, in reference to tile 2014, the following items of information are determined and displayed by the system: a tag value 2018, an information chart 2020, a number of alerts 2022 associated with the dossier, and a number of critical alerts 2024 associated with the dossier. The information chart 2020 of the user interface 2002 is a time-based bar chart showing a number of alerts (associated with the dossier) over a particular period of time, however the information chart is configurable and may display any information associated with the dossier. For example, the analyst may use the dropdown 2026 to change the information chart to any desired chart. The indication of the number of alerts 2022 provides the analyst with information about a number of individual alerts, or clusters, associated with the dossier. Additionally, the indications of the number of critical alerts 2024 provides the analyst with information about an importance of the dossier. In an embodiment, critical alerts include any alerts in the dossier that are high alerts (according to the alert score, as described above). In another embodiment, critical alerts include any alerts in the dossier that are medium alerts (according to the alert score, as described above). Additionally, each of the tiles of the user interface 2002 is colored according to a highest alert score associated with the dossier. For example, dossier 2014 includes eight critical alerts, and is therefore colored red, while dossier 2016 includes no critical alerts, and is therefore colored orange. In an embodiment, any tag values known by the system, but that do not include any clusters/alerts satisfying a current filtering criteria (as described below), may be displayed in the display portion as tiles. As also show, the tiles are arranged with the most critical dossiers appearing at the top of the display.

The example user interface 2002 additionally includes various user-selectable elements for filtering clusters, as mentioned in reference to FIG. 19 above. For example, a list of filter criteria 2030 shows various types of filters that may be applied to the clusters. The types of filters include "status" (as indicated at 2032), types associated with times and/or analysts assigned to clusters/alerts (as indicated at 2034), and types associated with any cluster tags (as indicated at 2036). The user may select one or more of the filter types, which causes the system to display a popup with various specific values by which to filter the clusters. In an embodiment, the "status" filter type refers to the cluster types (or alert types).

Figure 21:
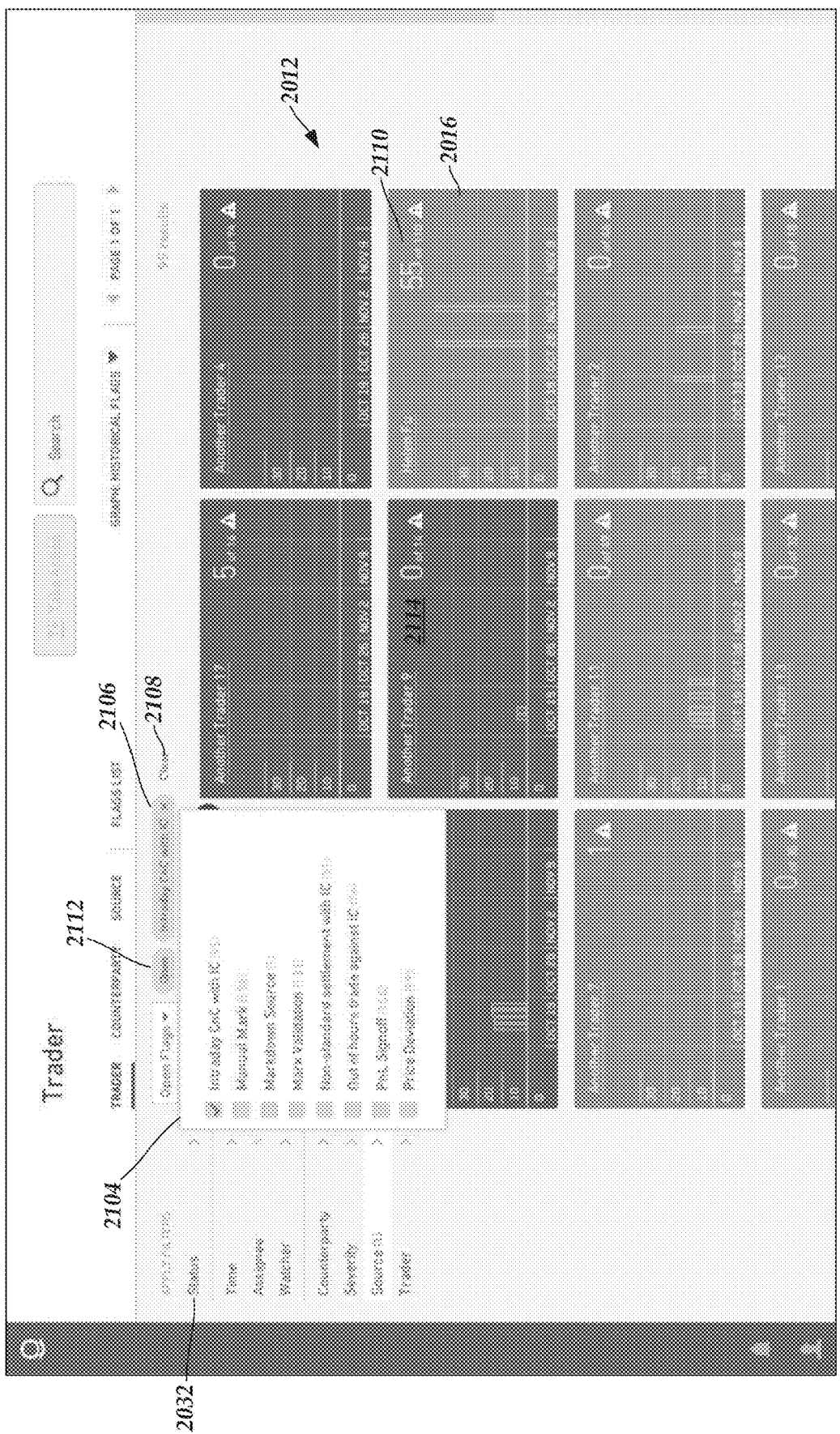

For example, FIG. 21 shows the example user interface 2002 in which the user has selected the "status" filter type 2032. A popup 2104 includes the various values of statuses (or cluster/alert types) associated with the various clusters/alerts, each selectable by the analyst. The popup 2104 also includes, for each of the filter values, an indication, in parentheses, of a number of associated clusters/alerts. As shown the analyst has selected the "Intradate CnC with IC" status value by which to filter the clusters. Accordingly, the system dynamically applies the filter criteria to the clusters, filtering out any clusters that do not meet the criteria, and updates the display of dossiers in the display portion 2012. For example, as shown in the display portion 2012, the number of alerts associated with most of the dossiers has changed in response to the filtering. Tile 2016, for example, now shows 55 associated alerts, rather than 110 as shown in FIG. 20. Tile 2114 shows zero alerts, however (as mentioned above) in an embodiment the tile is still displayed in the display area 2012. Each tile also includes an indication of a total number of alerts in the respective dossiers without any filters applied. For example, tile 2016 indicates "55 of 110" alerts. As also shown in the example user interface of FIG. 21, above the tiles an indication is given of each filter currently applied to the clusters. Accordingly, as shown at indicator 2106, the "Intraday CnC with IC" cluster type filter is applied. Additionally a "state" filter 2112 ("open") is applied to the clusters (cluster states are described in further detail below in reference to FIG. 23). The analyst may select the "clear" button 2108 to clear all filters applied to the clusters.

Turning to the example user interface of FIG. 22, another method of applying filtering criteria to the clusters is shown. In particular, search box 2204 may be used to apply filters to the clusters. The user may type all or part of any applicable filter criteria into the search box 2204, which causes the system to automatically generate a list 2206 of any matching filter criteria. The user may then select to apply the filter to the clusters similar to the application of filters described above.

Returning to FIG. 20, dropdown box 2028 may be used to apply a preselected, or saved, set of filters. As shown, the analyst has selected the "Open Flags" filter set, which includes a filter to any clusters/alerts with the current state of "open". In various embodiments, a saved filter may include multiple filter criteria. In an embodiment, after applying a set of filters to the clusters, the analyst may save the particular set of filters so as to enable efficient application of the set of filters in the future by a single selection from dropdown 2028. In an embodiment, an analyst may specify a default filter set to be applied each time the analyst logs in to the system. For example, a particular analyst may be responsible for overseeing activities of four traders. Accordingly, the analyst may create and save (and optionally set as default) a set of filters to only display clusters/alerts associated with those four traders.

In an embodiment, filters are disjunctively applied (for example, logical OR) across same filter types, and conjunctively applied (for example, logical AND) across different filter types. Thus, for example, if the analyst selects to filter the cluster/alerts to "trader: trader 1", "trader: trader 2", and "severity: high", the filter criteria is applied to the clusters as "trader:(trader 1 OR trader 2) AND severity: high".

Multiple types of filters may be saved together, and the system may include multiple preset sets of filters that are especially and frequently useful to the analyst in a particular investigation. An example preset filter may be titled "Critical Open Flags to Triage", which may include the following filters: state: Open AND alert score: Medium OR Critical).

Figure 23:
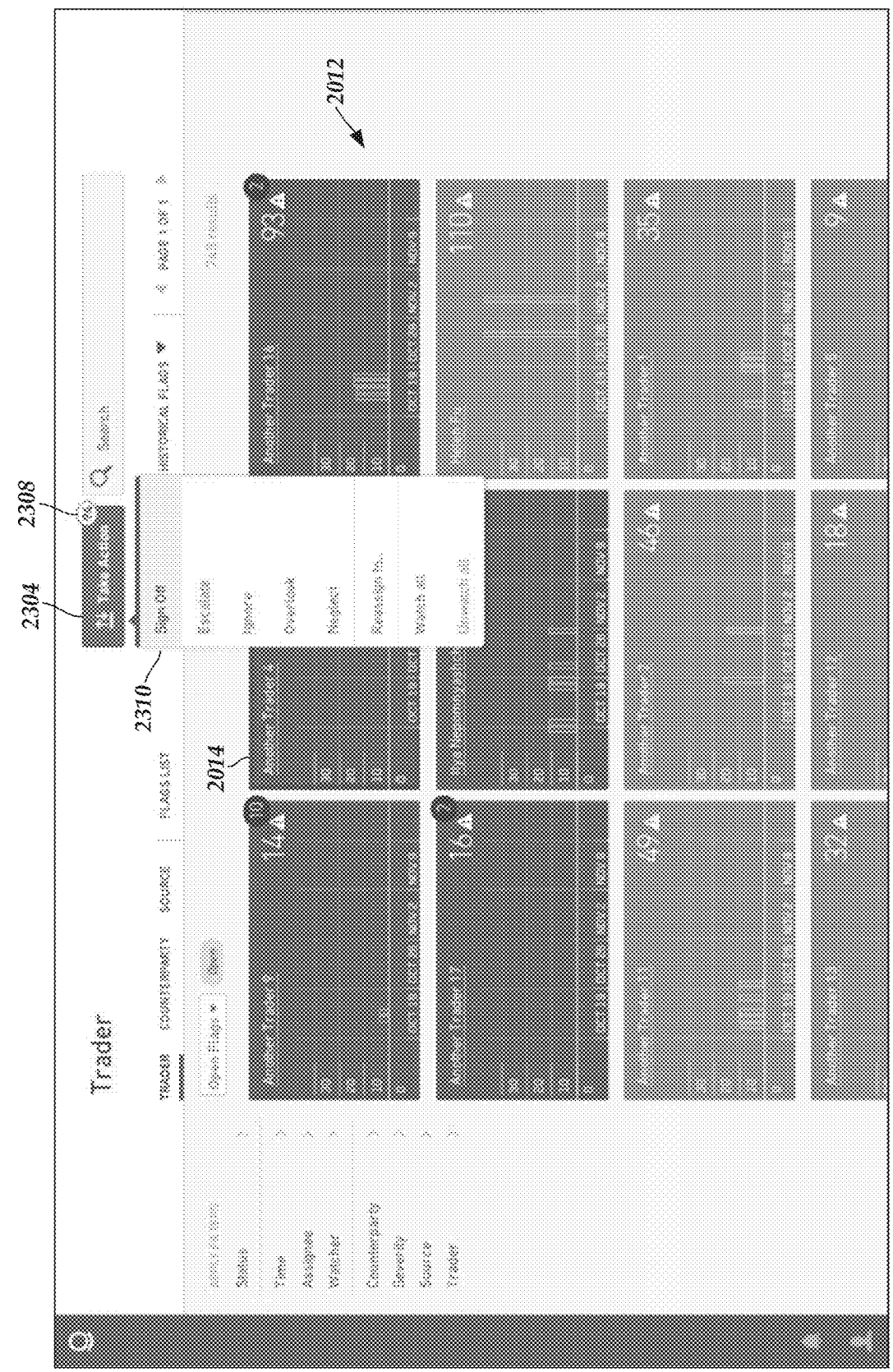

FIG. 23 shows the example user interface of FIG. 20 in which the analyst is applying "states" to the dossiers (and thereby the clusters associated with the dossiers). Advantageously, in various embodiments, the system enables the analyst to apply any "state" to a group of clusters, or multiple groups of clusters, efficiently and simultaneously. States may comprise another tag type that may be applied to clusters, and by which clusters may be filtered. Assigning states to clusters is similar to the process of marking alerts as archived (as described in discussions of FIGS. 18 and 19 in U.S. patent application Ser. No. 14/579,752, filed Dec. 22, 2014, titled "SYSTEMS AND USER INTERFACES FOR DYNAMIC AND INTERACTIVE INVESTIGATION OF BAD ACTOR BEHAVIOR BASED ON AUTOMATIC CLUSTERING OF RELATED DATA IN VARIOUS DATA STRUCTURES", and previously incorporated by reference) but is more flexible and customizable, and may be used by the analyst to assign groups of clusters to particular analysts, mark certain groups of clusters as important or not, watch groups of clusters, and/or the like.

FIG. 23 shows selection of a "Take Action" button 2304. Selection of button 2304 allows the analyst to apply any number of states of one or more selected dossiers (and thereby the clusters associated with the dossiers). For example, the user has selected tile 2014, the "Another Trader 4" dossier, which comprises a group of 94 clusters (as currently filtered). Multiple dossiers may be selected by the analyst, and only those clusters that satisfy any given search criteria and associated with selected dossiers are selected for applying the states. A number of clusters to which the state is being applied is shown at indicator 2308. Examples of states that may be applied include "Sign Off", "Escalate", "Ignore", "Overlook", "Neglect", "Reassign to", "Watch all", and "Unwatch all". The states "Sign Off", "Escalate", "Ignore", "Overlook", and "Neglect" may be used to designate clusters for further review, or to mark clusters as unimportant, according to the various states. In some embodiments, clusters marked as "Sign Off", "Ignore", "Overlook", or "Neglect" may be removed from the user interface, while clusters marked as "Escalate" may be indicated by highlighting in the user interface. The states "Reassign to" may cause the system to provide a popup by which the analyst may assign and/or reassign the clusters to a particular analyst (or multiple analysts) for review. Additionally, upon assigning the clusters, the analyst may include a note that may be provided to the assigned analyst(s) when they are notified of the assignment. The states "Watch all" and "Unwatch all" may be used by the analyst to receive (or stop receiving) notifications of changes to particular dossiers/clusters. Notifications regarding assignments and/or watching are described below in reference to FIG. 26. Advantageously, according to various embodiments, the analyst may easily and efficiently apply states to multiple clusters via the dossier analysis user interface. For example, a particular dossier (including multiple clusters) may be determined to be unimportant (or otherwise not representing risky activity) and may thereby by quickly dismissed by the analyst. In some embodiments, the above-described states "Reassign to", "Watch all", and "Unwatch all" may not be considered states, but rather may be stored and tracked separately from the states and in conjunction with the notifications workflows described below in reference to FIG. 26.

In an embodiment, the tiles of FIG. 20 advantageously each show a similar time-based chart (or other type of chart) having common axes and/or common scales on the axes, enabling efficient comparison of the dossiers by the analyst.

Figure 24:

FIG. 24 illustrates an example dossier analysis user interface of the data analysis system that may be displayed when a particular dossier is selected by the analyst. For example, the analyst may view the user interface of FIG. 24 after selection of the "Another Trader 9" tile of the user interface of FIG. 20. As shown in FIG. 24, and indicated by title 2402, the information provided relates to the "Another Trader 9" dossier. In an embodiment, any filters applied to the clusters in the user interface of FIG. 20 are automatically propagated to the user interface of FIG. 24, as indicated at filters 2410. The filters may be applied to any one or more of charts, alerts, and/or other data shown in the user interface of FIG. 24. In some embodiments different filters may be applied to the different aspects of the user interface of FIG. 24. Additionally, the user may apply and/or remove any filters, and/or apply states, in the user interface of FIG. 24 similar to the user interface of FIG. 20.

The example user interface of FIG. 24 includes various tabs 2404, 2406, and 2408 for viewing information related to the dossier. Currently the "flags" tab 2404 is selected, which displays information associated with the various clusters/alerts of the dossier. For example, a list of alerts 2414 is shown. These alerts may be similar to the list of alerts provided as an example in FIG. 11 of U.S. patent application Ser. No. 14/579,752, filed Dec. 22, 2014, titled "SYSTEMS AND USER INTERFACES FOR DYNAMIC AND INTERACTIVE INVESTIGATION OF BAD ACTOR BEHAVIOR BASED ON AUTOMATIC CLUSTERING OF RELATED DATA IN VARIOUS DATA STRUCTURES", and previously incorporated by reference. The alerts may be sorted in various ways by selection of a sorting element 2416. In an embodiment, the analyst may select one or more of the alerts to apply a state and/or view details via a user interface, similar to user interface example provided in that of FIG. 12 of U.S. patent application Ser. No. 14/579,752, filed Dec. 22, 2014, titled "SYSTEMS AND USER INTERFACES FOR DYNAMIC AND INTERACTIVE INVESTIGATION OF BAD ACTOR BEHAVIOR BASED ON AUTOMATIC CLUSTERING OF RELATED DATA IN VARIOUS DATA STRUCTURES", and previously incorporated by reference. Additionally, a time-based chart 2412 is shown which is similar or the same as the chart shown in the tiles of the user interface of FIG. 20. In the user interface of FIG. 24, the analyst may select any data to view in the chart 2412 via, for example, the dropdown 2418 and the list of previous charts 2420. In various embodiments, any type of data may be plotted in the chart 2412. For example, in one embodiment a risk score associated with the trader may be plotted over time. The risk score may be determined based on all or some of the data in the dossier. Alternatively, the risk score may be determined based on other data accessed from other data sources. The risk score may be determined based on a risk model. The system may be customized to display any charts of any type, and including any data, that are useful for the analyst in analyzing the dossier.

Tabs 2406 and 2408 may be selected by the analyst to view other information related to the dossier in the user interface. For example, "timeline" may display a more detailed chart, and/or may display a chart with data drawn from another data source outside of the clusters of the dossier. "Related" may display other dossiers and/or clusters/alerts associated with the current dossier, and may provide a direct link to those dossiers/clusters (similar to the links described in reference to 1404 of FIG. 14). For example, if two traders are associated with a cluster (for example, by a tag and/or data item associated with the cluster), and the user is viewing the dossier of one of the traders, the other trader (along with a like to that trader's dossier) may be displayed in the related tab.

In other embodiments, the user interface of FIG. 24 may include more or fewer tabs, each of which may be customized and specific to the type of investigation being performed by the analyst and/or the cluster types associated with the dossier.

Figure 25:
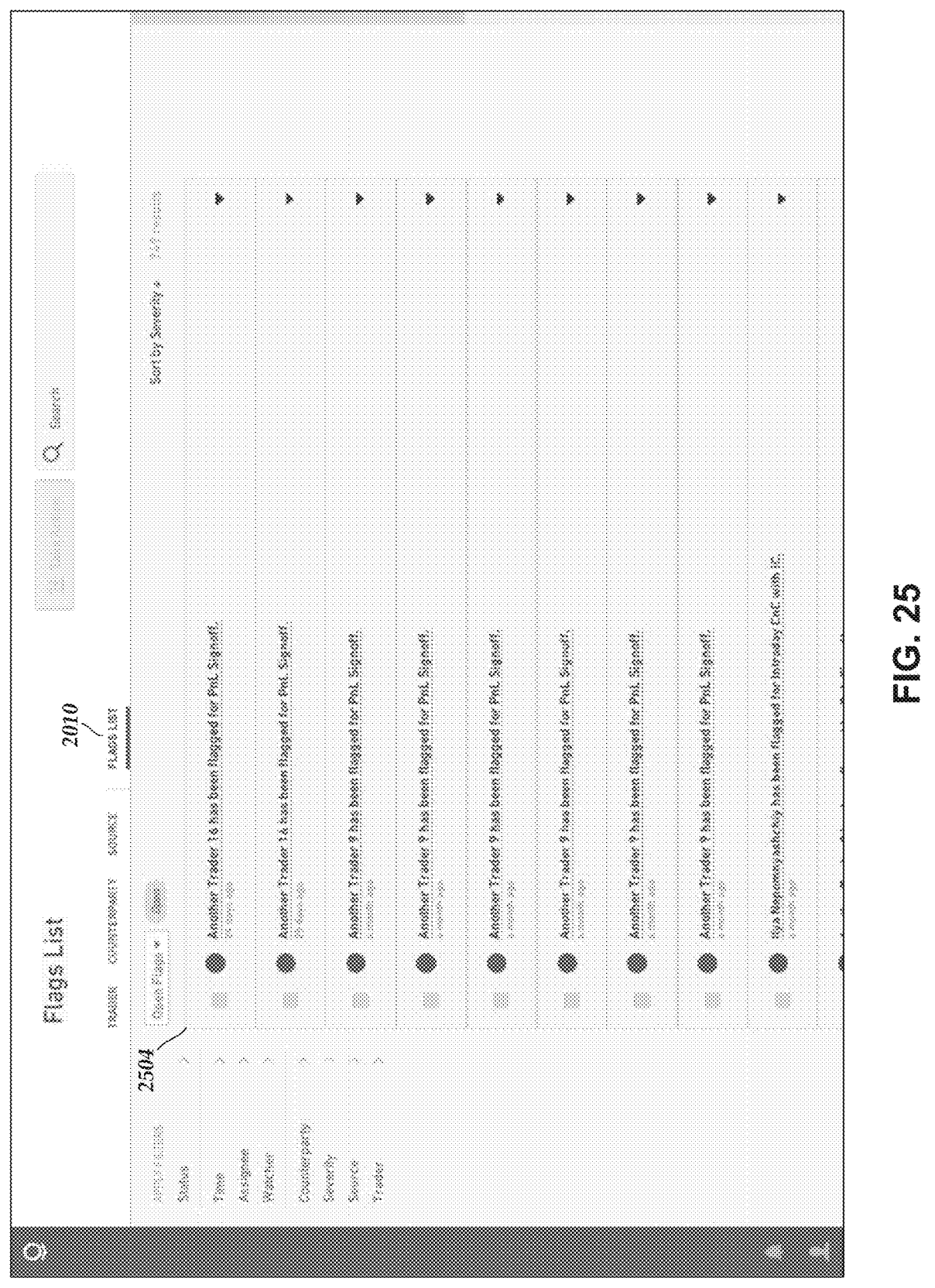

FIG. 25 illustrates an example user interface in which the user has selected the "flags list" button of FIG. 20. In this user interface a sortable list of alerts 3304 is shown, not grouped by cluster tags. The user interface of FIG. 25 is similar to that of FIG. 25 described above.

Figure 26:
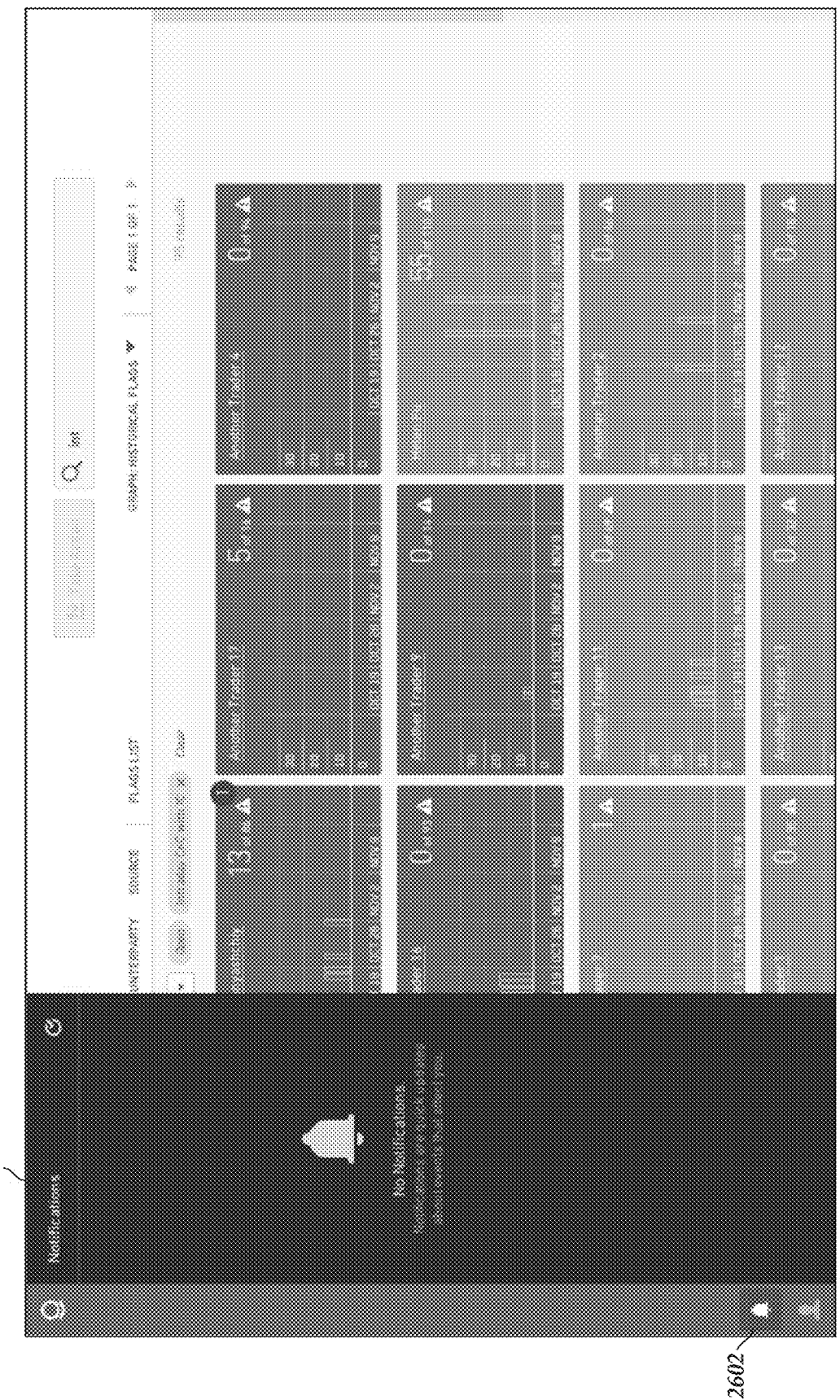

FIG. 26 illustrates an example user interface similar to that of FIG. 20, but in which the user has selected a notifications button 2602. Selection of the notifications button 2602 causes a notifications bar 2604 to be displayed. While no notifications are shown in the user interface of FIG. 26, various notifications may be provided to the analyst via the notifications bar 2604, as described above. For example, any changes to watched dossiers and/or cluster may cause notifications to be displayed in the notifications bar 2604. Similarly, when the analyst is assigned a dossier (and/or one or more clusters/alerts) the analyst may be notified via the notifications bar 2604. For example, a notification regarding a watched dossier may include "You have a new critical alert #234234 related to Trader 1. (Just now)". In another example, a notification related to an assignment/escalation may include "Analyst 2 has escalated alert #58967 to you. (15 seconds ago)".

Notifications may also provide information to the analyst that is not directly related to any particular dossier or cluster. For example, a notification may be provided regarding unavailability of a data source, such as "Data source 1 will be down for maintenance on Sep. 12, 2014 from 0300-0500PST. (10 minutes ago)".

Advantageously, in various embodiments, the notifications bar 2604 helps the analyst avoid having to triage many alerts and/or dossiers that may not be of particular importance. Rather, the notifications bring particular alerts and/or dossiers to the attention of the analyst that are of particular importance. In some embodiments, any changes and/or comments on watched alerts/dossier may be provided in the notifications bar. Additionally, the analyst may check off alerts to remove them from the notification bar, and/or may click links included in the alerts to go directly to user interfaces displaying, for example, the relevant dossier, alert, and/or other information related to the notification.

Referring again to FIG. 20, in an embodiment, hovering a mouse cursor (or other selection indicator) over one of the tiles may cause a popup to be displayed with information associated with the particular dossier (for example, various items of information shown in the user interface of FIG. 24 and/or related human-readable conclusions).

In an embodiment, tags associated with alerts (in, for example, the alert display of FIG. 25 and/or the alert list 2414 of FIG. 24) may be shown in the user interface. Selection of such tags may cause the dossier associated with that tag to be automatically shown in the user interface.

In an embodiment, the system may enable export of all information related to an alert and/or a dossier to a format (such as a CSV) and/or to a displayable interactive graph comprising node and edges (for example, a graph display similar to the graph of FIG. 3C described above). The interactive graph representation may allow the analyst to review the attributes of the related data items and/or perform queries for additional related data items.

In an embodiment, the dossier analysis user interfaces (for example, the user interface of FIG. 20) may include a button to access a dashboard displaying various items of information related to the analyst. For example, the dashboard may include a display of a number of alerts the analyst has reviewed over time. Examples of such a dashboard are described in U.S. Provisional Patent Application No. 62/135,448, filed Mar. 19, 2015, and titled "System For Providing Dynamic Linked Panels In User Interface," which was previously incorporated by reference.

Figure 27:

FIG. 27 illustrates an example user interface for dossier analysis which displays alerts by alert type, rather than providing a combined list of alerts. At the top of the interface is a hierarchical arrangement 2702. Hierarchical arrangement 2702 may allow the user to quickly understand where the current data cluster they are reviewing lies within a hierarchy of data clusters based on specific data items or their attributes within the data clusters. Or hierarchical arrangement 2702 may allow the user to quickly understand the relationship of the trader associated with the current data cluster to any reviewers, supervisors, or risk managers. For example, hierarchical arrangement 2702 in the figure shows that the user is current viewing "Harrison Harber's Dossier", which may have been tasked to "Jim Smith" for review. "Jim Smith" may fall under "Jesse Smith" in the hierarchy, who subsequently is under "Jacky Smith" in the hierarchy. A user who is reviewing "Harrison Harber's Dossier" can quickly understand the chain of supervision just by glancing at hierarchical arrangement 2702.

Graph 2704 may represent a graph of a data item or attribute within the current data cluster. Graph 2704 may be a graph over a period of time. In the figure, Graph 2704 may illustrate the trend of the trader's risk score over the course of a year as it changes from week to week. Alternatively, graph 2704 may illustrate the PNL or account value of the trader as it fluctuates over time. Alternatively, graph 2704 may illustrate the frequency or amount of trades that the trader has performed over the course of the year, as it changes from week to week. Under graph 2704 is more information related to the trader display 2706. Trader display 2706 may display the current trader associated with the data cluster. It may also display the department that the trader belongs to, the supervisor in charge of the trader (which can also be seen in hierarchical arrangement 2702 to be "Jim Smith"), and the email or contact information for the trader. Risk score 2708 displays a risk score that may be calculated with a cluster scoring strategy. The value of risk score 2708 may correspond to one of the data points in graph 2704. For example, Harrison Harber's trading activity at the end of December may have had a risk score of 16.8. Trade amount 2710 displays the number of trades that may be associated with the trader in the data cluster. Trade amount 2710 may display the number of trades that the trader has performed within a certain time period. The value of trade amount 2710 may correspond to one of the data points in graph 2704. For example, Harrison Harber's trading activity at the end of December may have amounted to 923 trades. Alternatively, the values of risk score 2708 and trade amount 2710 may instead correspond to all of the data points in graph 2704. For example, the value of risk score 2708 may be an average of the risk scores in the data points shown in graph 2704. The value of trade amount 2710 may be a total number of trades that Harrison Harber performed over the period illustrated by the graph 2704, and may be obtained by adding all the values in the data points on graph 2704 together. The graph 2704, and scores 2708 and 2710, may, in other embodiments, include any other data and/or scores related to the displayed dossier as described above in reference to the various figures.

The user interface also has a navigation bar 2712. Navigation bar 2712 may show all the different sections or tabs within the dossier. In the figure, navigation bar 2712 shows three sections: "Overview", "Trading and PNL", and "Trade Lifecycle." By clicking each tab available in the navigation bar 2712, a user may be able to go from section to section. Each section may display a different array of information in the space directly below navigation bar 2712. Alternatively, each section may display a different array of information in the space directly above navigation bar 2712.

Alerts in this interface may be grouped and presented by alert type, rather than as a single list of alerts. This interface illustrates three alert types "DoA Breach", "Block Leave Violation", and "Another Alert Type." Clicking an alert type may present the user more information on alerts within that alert type. For example, alert group 2714 can be clicked on to expand and view all alerts that fall under the alert type of "DoA Breach." Alert group 2714 also shows that five trades were considered under the "DoA Breach" alert type. Once alert group 2714 is expanded, information about the alerts in that group are presented to the user. Each alert may have an alert type or a date associate with the alert. There may be an alert summary, such as alert summary 2716. Alert summary 2716 provides the user with options to view the alert in more detail, view a chart or visualization associated with the alert, or view communications related to the alert. After the user reviews the information presented through alert summary 2716, the user may then click on alert action dropdown 2718. By clicking on alert action dropdown 2718, the user may then be presented with options or actions to take regarding that specific alert. For example, the user may be able to flag the alert for later, mark the alert as a false-positive, provide feedback on the alert, or send the alert to their supervisor.

At the bottom of the interface is the risk indicators over all time 2720, which may be a table of the results or computations involved in the various indicators, scenarios, or any other analysis rules/criteria, over the period of time contained within the data cluster. For example, the data cluster may represent the trades of Harrison Harber from the period of March to the end of December. There may be many indicators that were performed on this data cluster, and indicator list 2722 provides a sample of a few: "Internal Trades", "Late Booked Trades", and "Lightning Events." For example, "Internal Trades" may represent an indicator that Harrison Harber traded with an internal account. The table rows may each represent a week, in which case it may be seen that Harrison Harber performed internal trades during seven of the weeks in the period of March to December. Similar visulations are provided for "Late Booked Trades" and "Lightning Events." By viewing this table under risk indicators over all time 2720, the user may be able to quickly see trends or patterns within the trader's behavior. For example, the user may be able to see that the trader performed internal trades over a large period of time within the second half of the year. Or the user may be able to see that the trader typically performs internal trades at the same time another risk indicator was flagged, such as late booked trades. This may tip the user off to some kind of significance between the internal trades and late booked trades.

e. Permissions

In various embodiments permissions (also referred to as Access Control Lists) may be applied to various aspects of the system to control access of data. In particular, some data in the system may be permissions so as to not be visible or accessible, in whole or in part, to particular persons and/or groups of persons. For example, the system may apply permissions to particular data item attributes, individual data items, data item clusters, groups of clusters, particular user interfaces, types of data, and/or the like. Permissions may further be dependent on an identity of the analyst, a group to which the analyst belongs, a type of investigation, and/or the like.

In operation, the system may implement permissions by analysis of data prior to filtering and tagging and grouping of clusters. For example, when an analyst is not allowed to view data related to a particular data cluster, that data cluster may be removed from the set of data that is filtered, grouped, and presented to the user in the user interfaces of the system.

f. Additional Aspects

In various embodiments, a single master instance of each data item is stored by the system. The master instance of each data item includes all metadata and other information associated with the data item, as well as a unique data item identifier. When generating clusters and groups of clusters, in some embodiments, the master instances of the data items are referenced by their data item identifiers rather than making copies of the data items in each cluster. This advantageously enables memory savings and the data items do not have to be copied multiple times. Additionally, any updates to a master data item may be rapidly propagated to all references of the data item in each cluster, thus reducing processing requirements.

In various embodiments, the system and dossier analysis user interface described above are extensible. Thus, for example, additional types of tags may be added to the system based on new types of investigations, new groupings may be added to the user interface based on the new tags, each user interface may be customized based on the type of investigation, other types of related information may be brought into the dossier information user interfaces, other tabs may be added to the dossier information user interfaces, other states may be added based on changes and updates to workflows, and/or the like. Accordingly, the system need not be redeveloped for each not applications, but may be easily extended and adapted.

Additionally, the system is developed such that data items may be accessed from any type of data base or data store similarly via software code that adapts to particular database formats. Thus new data may be brought into the system quickly and efficiently without redevelopment.

Additional Embodiments

Embodiments of the present disclosure have been described that relate to automatic generation of memory-efficient clustered data structures and, more specifically, to automatic selection of an initial data item of interest, adding of the initial data item to the memory-efficient clustered data structure, determining and adding one or more related data items to the cluster, analyzing the cluster based on one or more rules or criteria, automatically tagging and grouping those clustered data structures, and providing an interactive user interface to an analyst. As described above, in various embodiments, a generated cluster or group of clusters may include far fewer data items as compared to a huge collection of data items that may or may not be related to one another. This may be because, for example, data items included in a cluster may only include those data items that are related to one another and which may be relevant to a particular investigation. Further, data items in a cluster may comprise simple references to a master instance of the data item, further saving memory requirements. Accordingly, in various embodiments, processing of generated clusters may be highly efficient because, for example, a given risky trading investigation by an analyst may only require storage in memory of a single group of cluster data structures. Further, a number of data items in a cluster may be several orders of magnitude smaller than in the huge collection of data items that may or may not be related to one another because only data items related to each other are included in the clusters.

Additionally, the automated analysis, tagging, grouping, and scoring of groups of clusters (as mentioned above) may enable highly efficient evaluation of the various data clusters by a human analyst. For example, the interactive user interface us generated so as to enable an analyst to quickly view critical groups of data clusters, and then in response to analyst inputs, view and interact with the generated information (including, for example, re-grouping and/or filtering) associated with the clusters. In response to user inputs the user interface may be updated to display raw data associated with each of the generated groups of clusters if the analyst desires to dive deeper into data associated with a given cluster.

While the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

The term "continuous" as used herein, is a broad term encompassing its plain an ordinary meaning and, as used in reference to various types of activity (for example, scanning, monitoring, logging, and the like), includes without limitation substantially continuous activity and/or activity that may include periodic or intermittent pauses or breaks, but which accomplish the intended purposes described (for example, continuous scanning may include buffering and/or storage of data that is thereafter processed, for example, in batch and/or the like).

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being redefined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
   one or more hardware computer processors configured to execute a plurality of computer executable instructions to cause the computer system to:
   access a data cluster;
   analyze a plurality of external event data items in the data cluster;
   determine that a quantity of the plurality of external event data items satisfies a threshold;
   in response to determining that the quantity of the plurality of external event data items satisfies a threshold, generate an alert;
   assign the generated alert to an alert type of a plurality of alert types;
   generate user interface data useable for rendering an interactive user interface on a computing device, the interactive user interface including selectable indications of one or more of the plurality of alert types and selectable indications of a plurality of alerts, each alert of said plurality of alerts being assigned to an alert type, wherein the plurality of alerts comprises the generated alert;
   receive, via the interactive user interface, a user selection to sort the plurality of alerts based on one or more criteria, wherein the criteria includes the alert type to which each alert is assigned;
   determine the alert type to which each alert is assigned; and
   automatically move each alert to a group in a position on the interactive user interface proximal to the alert type to which it is assigned based on the determined alert type to which each alert is assigned.

2. The computer system of claim 1, wherein the plurality of computer executable instructions further cause the computer system to:
   display, via the interactive user interface, one or more selectable action elements associated with the plurality of alerts;
   receive, via the user interface, a user selection of an action element; and
   perform an action, in response to said user selection, on the alert associated with the selected action element.

3. The computer system of claim 1, wherein the plurality of computer executable instructions further cause the computer system to apply a trading risk indicator to the data cluster, wherein applying the trading risk indicator includes analyzing a plurality of trade data items in the data cluster.

4. The computer system of claim 3, wherein the data cluster is further associated with data cluster analysis rules and/or data cluster scoring rules that comprise the trading risk indicator, wherein the trading risk indicator is observable or computable from the plurality of data items in the data cluster.

5. The computer system of claim 4, wherein the plurality of computer executable instructions further cause the computer system to generate a summary report based on the data cluster analysis rules and/or the data cluster scoring rules.

6. The computer system of claim 5, wherein the plurality of computer executable instructions further cause the computer system to receive feedback from the user through the interactive user interface, the feedback containing a suggestion for improving the summary report generated based on the data cluster analysis rules and/or the data cluster scoring rules.

7. The computer system of claim 6, wherein the plurality of computer executable instructions further cause the computer system to update the data cluster analysis rules and/or the data cluster scoring rules based on the feedback received from the user for improving the generated summary report.

8. The computer system of claim 3, wherein the trading risk indicator is a possible dummy trade indicator for identifying when a trade is cancelled or amended before an external event that might affirm the trade is real, and wherein applying the trading risk indicator further comprises:
   analyzing the plurality of trade data items to identify cancelled or amended trades;

determining a cancellation or amendment time associated with each cancelled or amended trade;
analyzing the plurality of external event data items to identify an external event associated with each cancelled or amended trade; and
determining an external event time associated with the external event associated with each cancelled or amended trade;
wherein the alert is generated based at least in part on determining that the cancellation or amendment time is prior to the external event time.

9. The computer system of claim 3, wherein the trading risk indicator is part of a trading when absent scenario for detecting whether a trader's trading activity coincides with unusual patterns in security badge data, and wherein applying the trading risk indicator further comprises:
analyzing the plurality of trade data items to identify trades performed by the trader;
determining an execution time associated with each trade performed by the trader;
analyzing the plurality of external event data items to identify time windows the trader is not in a building based on security badge usage data for the building; and
determining a subset of external event data items, wherein each external event data item of the subset of external event data items is associated with a respective execution time of one of the trades performed by the trader and a time window for which the trader is not in the building.

10. The computer system of claim 9, wherein the security badge usage data comprises at least one of:
time windows the trader is in the building;
time windows the trader is not in the building;
times the trader used a security badge to enter the building; and
times the trader used a security badge to leave the building.

11. The computer system of claim 3, wherein the trading risk indicator is part of a suspicious badge activity scenario for detecting whether a trader's trading activity coincides with unusual patterns in security badge data, and applying the trading risk indicator further comprises:
analyzing the plurality of trade data items to identify trades performed by the trader;
determining an execution time associated with each trade performed by the trader;
analyzing the plurality of external event data items to identify time windows the trader is not in a building from security badge usage data for the building;
determining unusual time windows from the time windows the trader is in the building based on unusual security badge usage patterns; and
determining the subset of external event data items, wherein each external event data item of the subset of external data items is associated with a respective execution time of one of the trades performed by the trader and an unusual time window for which the trader is in the building.

12. The computer system of claim 1, wherein the plurality of computer executable instructions further cause the computer system to apply a trading risk indicator to the data cluster, wherein applying the trading risk indicator includes analyzing a plurality of trade data items in the data cluster and analyzing a plurality of profit and loss (PNL) data items in the data cluster.

13. The computer system of claim 12, wherein the plurality of computer executable instructions further cause the computer system to generate the alert based on at least applying the trading risk indicator to the data cluster.

14. The computer system of claim 12, wherein the trading risk indicator is a PNL smoothing indicator for detecting whether a trader's PNL has an unreasonably smooth volatility profile given price volatility of asset classes traded and reflected in the PNL, and wherein applying the trading risk indicator to the data cluster further comprises:
analyzing the plurality of PNL data items to identify the asset classes traded by the trader and reflected in the trader's PNL over a time period;
analyzing the plurality of trade data items to determine volatility of each of the asset classes traded by the trader and reflected in the trader's PNL over the time period;
determining volatility of the trader's PNL over the time period;
determining a volatility discrepancy between the trader's PNL and the asset classes by comparing the volatility of the trader's PNL over the time period to the volatility of each of the asset classes traded by the trader and reflected in the trader's PNL over the time period; and
generating the alert based at least in part on determining the volatility discrepancy between the trader's PNL and the asset classes is greater than a threshold of volatility discrepancy between the trader's PNL and the asset classes.

15. The computer system of claim 12, wherein the data cluster further includes a plurality of account data items including information associated with trading accounts associated with trades of a trader, wherein the trading risk indicator comprises an internal transfer with non-zero PNL indicator for identifying trades performed by a trader that are internal trades between internal trading books or internal trading accounts and also associated with a non-zero PNL, and wherein applying the trading risk indicator further comprises:
analyzing the plurality of trade data items to identify the trades of the trader;
analyzing the plurality of account data items to identify trading accounts associated with the trades of the trader;
determining which trades of the trader has an internal counterparty using the identified trading accounts associated with each trade of the trader;
for each trade determined to have an internal counterparty, determining whether that trade has a non-zero PNL using the plurality of trade data items; and
generating the alert based at least in part on determining that a trade has both an internal counterparty and a non-zero PNL.

16. The computer system of claim 12, wherein the data cluster further includes a plurality of account data items including information associated with trading accounts associated with trades of a trader, wherein the trading risk indicator comprises a mark arbitrage indicator for identifying a subset of trades performed by the trader that are internal trades between internal counterparties that have different accounting regions, wherein the internal counterparties comprise internal trading books or internal trading accounts; and wherein applying the trading risk indicator further comprises:
analyzing the plurality of trade data items to identify the trades of the trader;

analyzing the plurality of account data items to identify trading accounts associated with the trades of the trader;

determining which trades of the trader have internal counterparties using the identified trading accounts associated with each trade of the trader;

for each trade determined to have internal counterparties, determining whether the internal counterparties have different accounting regimes using the plurality of account data items; and generating the alert based at least in part on determining that a trade has internal counterparties with different account regimes.

17. The computer system of claim 12, wherein the data cluster further includes a plurality of external event data items including information associated with a compensation cycle for a trader, wherein the trading risk indicator comprises a PNL jump in line with compensation cycle indicator for identifying big, positive PNL changes highly correlated to timing of a compensation cycle, and wherein applying the trading risk indicator further comprises:

analyzing the plurality of PNL data items to identify a big, positive change to the trader's PNL;

determining a time associated with the big, positive change to the trader's PNL;

analyzing the plurality of external event data items to identify a compensation cycle;

determining a time associated with a change in the compensation cycle; and generating the alert based at least in part on determining that the time associated with the big, positive change to the trader's PNL is within a threshold time period right before the time associated with a change in the compensation cycle.

18. The computer system of claim 12, wherein the trading risk indicator comprises an adverse execution selection indicator for identifying trades booked away from a market in order to create PNL or cash, and wherein applying the trading risk indicator further comprises:

analyzing the plurality of trade data items to identify trades of a trader;

determining an actual execution cost associated with each trade of the trader;

determining an expected execution cost associated with each trade of the trader; and generating the alert based at least in part on determining a deviation between the expected execution cost and the actual execution cost of each trade of the trader is above a threshold.

19. The computer system of claim 12, wherein the trading risk indicator comprises a trading away from bucket volume weighted average price (VWAP) indicator for identifying trades that are executed at a price which should on average be attainable by a trader, and wherein applying the trading risk indicator further comprises:

analyzing the plurality of trade data items to identify all trades by the trader over a time period;

determining a traded product associated with a trade by the trader over the time period;

determining an execution price associated with a trade by the trader over the time period;

analyzing the plurality of trade data items to identify trades in a firm over the time period associated with the traded product or a similarly traded product, wherein the similarly traded product has a higher than average correlation to the traded product;

determining an execution price associated with each trade in the firm over the time period associated with the traded product or a similarly traded product;

determining a VWAP of the execution prices associated with the trades in a firm over the time period associated with the traded product or the similarly traded product; and generating the alert based at least in part on determining that the execution price associated with a trade by the trader over the time period deviates from the VWAP by a threshold.

20. A method comprising:

accessing a data cluster;

analyzing a plurality of external event data items in the data cluster;

determining that a quantity of the plurality of external event data items satisfies a threshold;

in response to determining that the quantity of the plurality of external event data items satisfies a threshold, generating an alert;

assigning the generated alert to an alert type of a plurality of alert types;

generating user interface data useable for rendering an interactive user interface on a computing device, the interactive user interface including selectable indications of one or more of the plurality of alert types and selectable indications of a plurality of alerts, each alert of said plurality of alerts being assigned to an alert type, wherein the plurality of alerts comprises the generated alert;

receiving, via the interactive user interface, a user selection to sort the plurality of alerts based on one or more criteria, wherein the criteria includes the alert type to which each alert is assigned;

determining the alert type to which each alert is assigned; and automatically moving each alert to a group in a position on the interactive user interface proximal to the alert type to which it is assigned based on the determined alert type to which each alert is assigned.

* * * * *